United States Patent [19]

Koga et al.

[11] Patent Number: 5,023,733

[45] Date of Patent: Jun. 11, 1991

[54] HEAD POSITIONING CONTROL FOR A SPINDLE MOTOR DISK DRIVE

[75] Inventors: Yoshiro Koga; Akihiro Gomi; Takashi Miyasaka; Yasunaga Miyazawa; Kenichi Endo; Junichiro Shinozaki; Kaneo Yoda; Takashi Ichikawa; Hitoshi Miyasaka; Chiharu Kaburagi, all of Suwa, Japan

[73] Assignee: Seiko Epson Corporation, Tokyo, Japan

[21] Appl. No.: 481,755

[22] Filed: Feb. 15, 1990

Related U.S. Application Data

[63] Continuation of Ser. No. 107,722, Oct. 7, 1987, abandoned, which is a continuation of Ser. No. 93,201, Aug. 14, 1987, abandoned.

[30] Foreign Application Priority Data

| Dec. 16, 1985 | [JP] | Japan | 60-282189 |
| Dec. 19, 1985 | [JP] | Japan | 60-286431 |
| Feb. 21, 1986 | [JP] | Japan | 61-36778 |
| Feb. 25, 1986 | [JP] | Japan | 61-39732 |
| Apr. 2, 1986 | [JP] | Japan | 61-75903 |
| Apr. 28, 1986 | [JP] | Japan | 61-99816 |
| May 7, 1986 | [JP] | Japan | 61-104161 |
| Jun. 30, 1986 | [JP] | Japan | 61-153006 |
| Oct. 7, 1986 | [JP] | Japan | 61-238269 |
| Oct. 7, 1986 | [JP] | Japan | 61-238270 |
| Oct. 8, 1986 | [JP] | Japan | 61-239602 |
| Oct. 8, 1986 | [JP] | Japan | 61-239603 |
| Oct. 8, 1986 | [JP] | Japan | 61-239604 |
| Oct. 21, 1986 | [JP] | Japan | 61-250066 |
| Nov. 25, 1986 | [JP] | Japan | 61-280319 |
| Nov. 25, 1986 | [JP] | Japan | 61-280320 |
| Dec. 15, 1986 | [JP] | Japan | PCT/JP86/00632 |

[51] Int. Cl.⁵ .............................................. G11B 5/55
[52] U.S. Cl. ........................... 360/77.04; 360/98.07; 360/99.08; 360/97.02; 360/106
[58] Field of Search .............. 360/99.08, 99.04, 98.07, 360/97.01, 97.02, 77.01, 77.02, 77.03, 77.04, 77.07, 77.08, 78.12, 78.05, 104, 105, 106

[56] References Cited

U.S. PATENT DOCUMENTS

| 3,047,869 | 7/1962 | Marcum et al. | 360/98.07 |
| 4,062,049 | 12/1977 | Dirks | 360/78.12 |
| 4,136,365 | 1/1979 | Chick et al. | 360/78.05 |
| 4,194,225 | 3/1980 | Hasler | 360/97.02 |
| 4,282,554 | 8/1981 | Ho et al. | 360/97.02 |
| 4,331,991 | 5/1982 | Morehouse et al. | 360/106 |
| 4,339,777 | 7/1982 | Gruczelak | 360/97.02 |
| 4,371,960 | 2/1983 | Kroiss | 360/77.04 |
| 4,491,888 | 1/1985 | Brown et al. | 360/98.07 |
| 4,524,397 | 6/1985 | Chalmers et al. | 360/77.03 |
| 4,544,972 | 10/1985 | Kogure et al. | 360/105 |
| 4,639,863 | 1/1987 | Harrison et al. | 360/97.01 |
| 4,656,545 | 4/1987 | Kakuta | 360/98.07 |
| 4,677,509 | 6/1987 | Nishida et al. | 360/98.07 |
| 4,782,404 | 11/1988 | Baba | 360/77.07 |

OTHER PUBLICATIONS

IBM Technical Disclosure Bulletin, vol. 17, No. 6, Nov. 1974, Correction of Data Track Misregistration in Servo Controlled Disk Files, A. Paton, pp. 1781–1783.

Primary Examiner—Aristotelis M. Psitos
Assistant Examiner—David L. Robertson
Attorney, Agent, or Firm—Blum Kaplan

[57] ABSTRACT

A disk drive includes media for recording data, disk heads for recording data and reproducing data on the disks. The heads are supported on arms. A head actuator drives the arms moving the head to a predetermined data recording track on the disk. A spindle motor rotates the disk at a predetermined rotating speed. The spindle motor includes a rotor magnet disposed within a stator coil. The disk head and actuator motor are mounted on a pivot on opposed sides of each other. To control head positioning, first positioning data for positioning the disk heads and second positioning data are provided on each data surface. This data is detected by a data head. Second positioning data may be positioned on tracks not used for containing data. The head position is compensated by the stored second positioning information superimposed on the first positioning data.

57 Claims, 32 Drawing Sheets

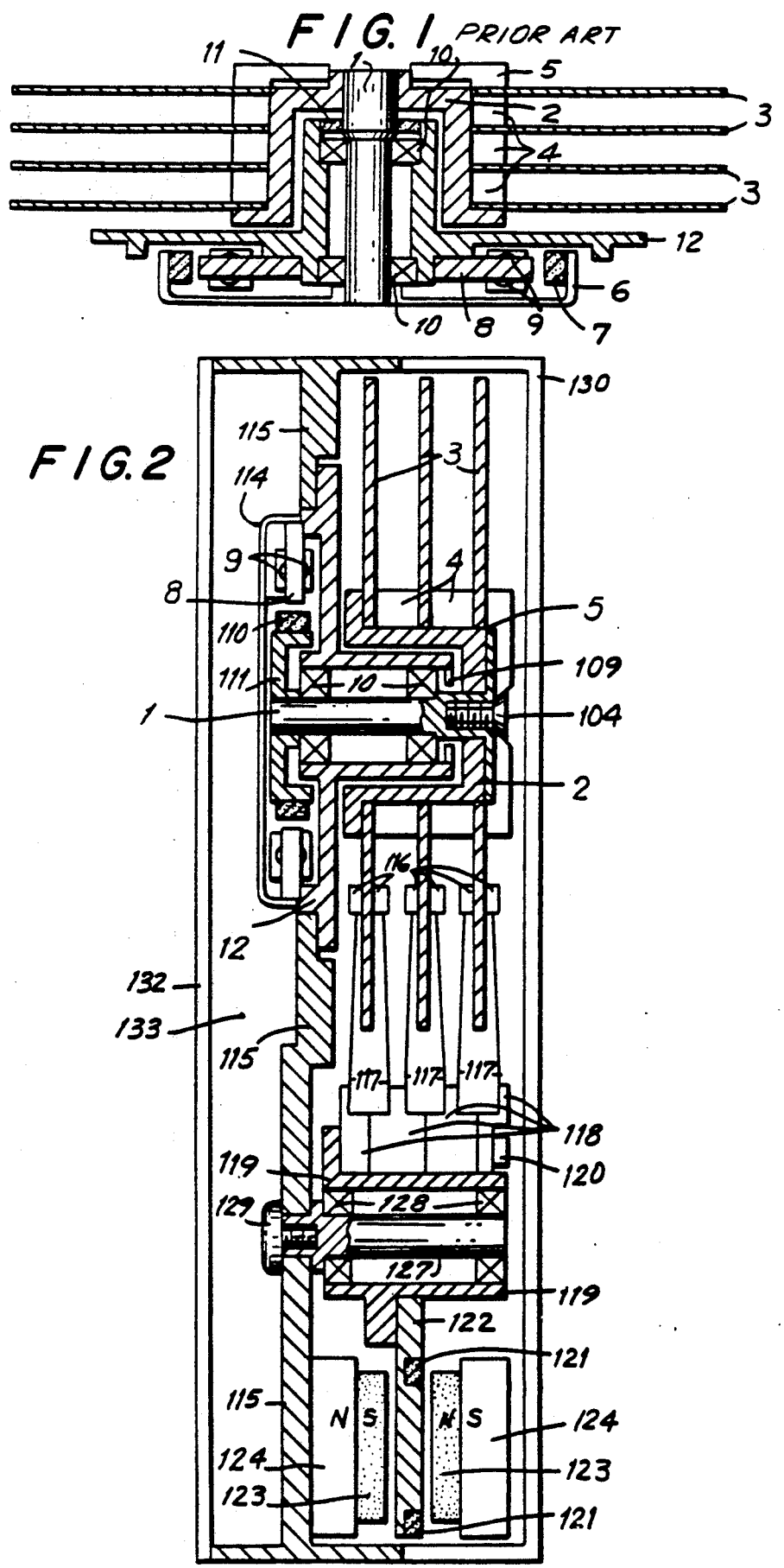

HEAD POSITIONING CONTROL FOR A SPINDLE MOTOR DISK DRIVE

This is a continuation of Application Ser. No. 07/107,222 filed on Oct. 7, 1987, now abandoned which was a continuation of application Ser. No. 07/093,201 filed Aug. 14, 1987 now abandoned.

BACKGROUND OF THE INVENTION

1. Technical Field

The present invention relates to a magnetic recording device comprising a plurality of magnetic disks (hereinafter referred to as disks), a spindle motor for rotatably driving the disks, an assembly of magnetic heads (hereinafter referred to as heads) for writing and reading data on the disk surfaces, an actuator of the head, and control means for positioning the heads on the disk surfaces accurately.

2. Background Art

The prior magnetic recording devices utilized a large storage capacity and operated at a high access time. A plurality of disks having a diameter of approximately 5.25 to 10 inches are mounted in the prior art device. Further, the spindle motors for rotating the disks at a desired speed may be an in-hub motor which is stored in a hub coupled to the disks, or as in a large-sized device, the power may be transmitted by an external motor through belts. A voice coil motor may be utilized as a head actuator for effecting high speed access. The positioning of the head is effected by utilizing the servo surface and the like.

It is impossible to manufacture the above prior art device in a small size. More particularly, in the hub motor device it is necessary to provide a low stiffness spindle motor which is cost inefficient. In a belt driven motor the spindle motor requires frequent maintenance checks to insure transmission of the power through the belt, therefore, such magnetic recording devices become large-sized and thick in order to effect a large capacity and a high speed access. Furthermore, if such a magnetic recording device is thin, the mounting area of the circuit substrate is reduced by the areas of the spindle motor and the head actuator, thereby making it impossible to mount the data separator and the disk controller on the circuit substrate while at the same time providing a small thin magnetic disk device in which the interface for the host computer is provided for a large capacity and high speed access.

FIG. 1 is a sectional view of the main part of the spindle motor utilized in the prior art magnetic recording device. A hub 2 is secured at one end of a shaft 1. A plurality of disks 3 are mounted on the hub 2 by a disk clamp plate 5 separated by disk spacers 4. A rotor yoke 6 is secured at the other end of the shaft 1. A rotor magnet 7 is secured to rotor yoke 6. A stator core 8 is disposed at a distance from the inner side of the rotor magnet 7. Stator coils 9 are wound around the stator core 8. Shaft 1 is supported at a bearing 10 and is sealed against dust by a seal 11.

Bearing 10, the seal 11 and the stator core are provided in a housing 12. The rotor magnet 7 is magnetically divided and magnetized in a plurality of polarities in the radial direction. The positioning of the rotor magnet 7 is detected by a magnetic sensor (not shown). The current is sequentially supplied to the stator coils 9 which are wound around the stator core 8 having a plurality of slots dividing the core into a plurality of phases, thereby generating the rotating power to rotate the shaft 1 and the magnetic disks 3.

The above prior art device has been satisfactory. However, the rotor yoke by necessity is very thick in the magnetic recording device, thus, such a device is not suitable for a small, thin magnetic recording device. Further, since the stator coils are disposed so as to be covered with the rotor yoke, if the number of mounted magnetic disks is increased, the necessary spin-up torque of the spindle motor is increased, and the current supplied to the stator coil is increased. Deviation from the track may thus be caused, and as a result, a portion of the stator coil increases more in temperature, compared with the other portions, and the temperature is not uniform within the magnetic recording device.

Still further, the magnetic recording device has a transducer system comprising disks on which data are recorded and the heads for writing and reading the data in the disk. The heads are secured at the mechanical portion of the system for the movement and the positioning, as hereinafter explained in detail. A plurality of concentric recording areas (hereinafter tracks) are provided on the disks. The data are written and read from the disks by the heads as the heads move relative to the tracks. Therefore, it is necessary to position the head on the tracks accurately in order to write and read the data efficiently and accurately. The more the track density is increased and the narrower the track width becomes, the more accurately the head should be positioned. Therefore, a servo system wherein the head is positioned on the track accurately upon generating the positioning signal of the positioning data recorded on the disk, is widely utilized.

In general, there are several types of servo systems, but in view of the advantages of the excellent positioning accuracy and the short positioning time and so on, the servo system has been widely employed wherein one surface of a disk is utilized for recording only positioning data for controlling the position and the remaining surfaces are utilized for recording the data only. The control surface on which only the positioning data is recorded is hereinafter referred to as a servo surface (a disk surface for the data). These two disks are secured to the spindle motor for rotating. In this system, the magnetic recording device has a head (servo head) positioned relative to the servo surface and a plurality of heads (data heads) positioned relative to the data surfaces. These heads are provided on respective supporting arms, the supporting arms being movable in the radial direction of the disks. The driving motor such as VCM (voice coil motor) is secured at the positioning means. Upon detecting the positioning signal received from the servo head, the VCM is controlled so as to make the difference between the position of the servo head and the position of the destination track as small as possible. The data head is positioned at the destination data track secondarily through the positioning means.

The above method has been satisfactory. It is possible to accurately position the servo head relative to the servo track. However, it is not possible to always accurately position the data head relative to the destination data track.

More particularly, the difference between the relative position of the servo head and the servo track and the difference between the relative position of the data head and the destination data track are caused because the supporting arms between the servo head and the data head, the positioning means and the spindle motor are affected during each operation over time, and because the base frame at which the positioning means, the spindle motor or both are secured is affected due to the variance in the temperature, as well as the difference in the swelling amounts between the piled disks due to the difference in the temperature between the disks. As a result, even if the servo head is positioned accurately at the destination servo track, the data head cannot be positioned at the destination data track accurately.

To solve this problem, Japanese Patent Laid-Open Application No. 51-81603 describes a method of positioning the data head on the destination data track which is widely used. The data head is positioned in accordance with a first positioning signal received from the servo head, superimposing a compensation value, calculated in accordance with a second positioning signal received from the data head, on the first positioning signal, and positioning the data head on the destination track accurately.

However, a further problem may be caused by the above method. More particularly, if the above method is not effected, the head may be positioned by only the first positioning signal received from the servo head. But since the data head may be positioned by the first positioning signal generated from the servo head and adjusting the data head slightly by the second positioning signal, the above method requires more time to adjust the head slightly by the second positioning signal. Furthermore, when the second positioning data is recorded on the data track, for example, on one portion of all of the data tracks, during the time of switching the positioning control by the first positioning data to the positioning control superimposed on the second positioning data, the second positioning data must be recorded by the data head. In fact a waiting time during which the second positioning data on the data surface is rotatingly positioned to the data head is required. For example, when the second positioning data is recorded on only one portion of the data track, the average waiting time is equal to the time for rotating the disk by a half rotation. Further, when a plurality of positioning data are recorded on all the data tracks, the above mentioned waiting time becomes shorter, but such a case does not lead to the essential improvement.

FIG. 20 illustrates the relation between the time for positioning the data head and the change of the location of the data head relative to the destination data track. In FIG. 20, the solid line 828 shows the relationship between the change in position and the time for compensating the head by the second positioning data. The broken line 831 illustrates the track position of the data head in response to the first positioning data. After the data head moves to the track position of a destination data track, the data head requires the four types of operating time for positioning it, that is, the operating time comprising a settling time 832 for converging at the destination position as shown in the broken line 831 with the vibrating transient response (the conversion of the transient response is called settling), the waiting time 833 until receiving the second positioning data the time 834 for moving the head at the data track in accordance with compensated value, and the time 835 for settling the head after positioning the data head on the data track.

If the above improvement is not performed, the data head is completely positioned at the end of the settling time 832. As a result, the above improvement requires a long time for positioning the head in its entirety. Accordingly, it is desirable to provide an improved magnetic recording device which overcomes the shortcomings of the prior art devices described above.

SUMMARY OF THE INVENTION

Generally speaking, in accordance with the invention, a magnetic recording device is provided. The magnetic recording device includes a movable head mounted at one end of the movable arm. A VCM (voice coil motor) including movable coils is integrally formed with each of the arms as a head actuator and extends in the reverse direction of the arm relative to the rotating shaft. Magnets are secured opposite to the movable coils and spaced apart for a distance slightly in the axial direction. The rotor magnet of the spindle motor is disposed in the inner side of the stator coils.

The invention may also include a magnetic disk having a servo disk surface for recording the first positioning data as a control signal for positioning the data head driven by the VCM at the destination track, and at least one disk surface for data wherein the data area and the second positioning data are recorded on the data tracks. A servo head is provided relative to the servo disk surface. At least one data head is provided for reading and writing the data relative to the data disk surface and reading the second positioning data. A control circuit detects a signal relative to the difference between the first positioning data and the second positioning data, stores the signal as a compensation value, and superimposes the compensation value on the first positioning signal at the time of positioning the data head.

The invention may also include a head actuator for positioning the head relative to the disk. The spindle motor includes a rotor magnet disposed in the inner side of the stator coils.

Accordingly, it is an object of the present invention to provide an improved magnetic recording device.

Another object of the present invention is to provide a thin and small-sized magnetic recording device having two or four disks of the diameter of 5.25 inch or below which provides large storage capacity and a high access speed.

A further object of the present invention is to provide a magnetic recording device which ca position the head relative to the disk accurately and has a control circuit for detecting and transferring the data at high velocity.

Still other objects and advantages of the invention will in part be obvious and will in part be apparent from the specification and drawings.

The invention accordingly comprises the features of construction, combination of elements, and arrangement of parts which will be exemplified in the construction hereinafter set forth and the scope of the invention will be indicated in the claims.

BRIEF DESCRIPTION OF THE DRAWINGS

For a fuller understanding of the invention, reference is had to the following description taken in connection with the accompanying drawings, which:

FIG. 1 is a sectional view of a prior art spindle motor;

FIG. 2 is a sectional view of a magnetic recording device constructed in accordance with the present invention;

DESCRIPTION OF THE PREFERRED EMBODIMENT

Figure 3:
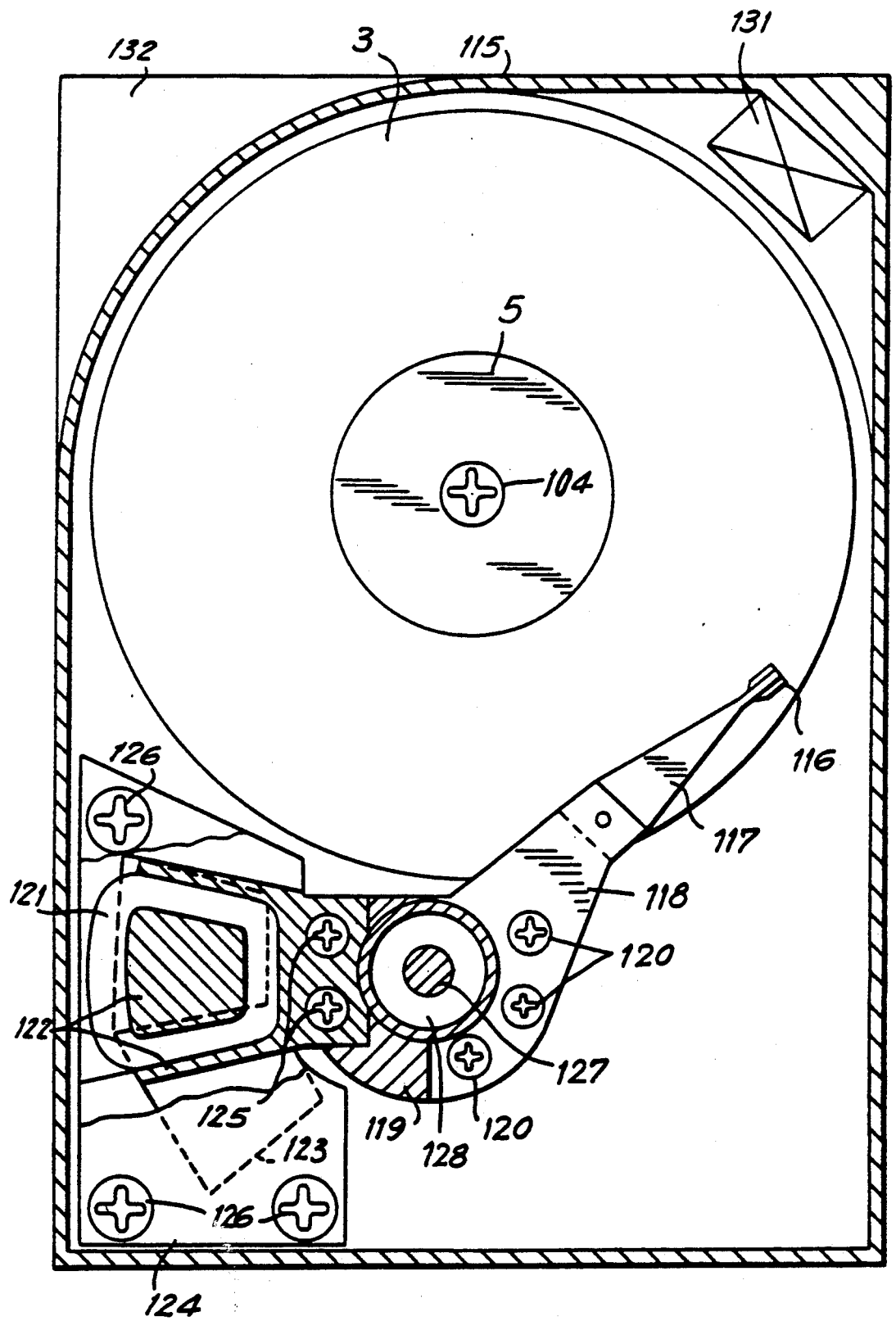
FIG. 3 is a top plan view of the magnetic recording device of FIG. 2.

Reference is made to FIGS. 2 and 3, in which the recording media in the form of data disks 3 spaced by spacer 4 are secured at a spindle hub 2 by pressing a disk clamp plate 5 against a spindle 1, utilizing a fixing screw 104. Spindle 1 secured at the spindle hub 2 is axially supported on a motor frame 107 by axial support bearings 10 located at a bottom and intermediate position of spindle 1, respectively. The entry of any dust is prevented by a seal 11. A rotor yoke 111 is mounted on the opposite end of spindle 1 as spindle hub 2.

A rotor magnet 110 is fixed on the outside surface of rotor yoke 111. A stator core 8 having a plurality of slots is mounted on a motor frame 12. Stator coils 9 formed as a plurality of divisional coil phases, are mounted on stator core 8 so as to be positioned facing the outer surface of rotor magnet 110. Upon sequentially applying current to stator coils 9 electromagnetic torque is generated between the stator coils 9 and the rotor magnet 110, thereby allowing the disk 3 to rotate at a predetermined speed.

The spindle motor is covered with a motor cover 114. The spindle motor is secured at the base frame 115 by the motor frame 12. Further, heads 116, which effect recording the data on the disk 3, are secured through a head suspension 117 to arms 118 in the radial direction. Arms 118 are secured at one end of a pivot hub 119 by arm securing screws 120. On the opposite side of the pivot hub 119, a bobbin 122 including a movable coil 121 is secured by bobbin securing screws 125.

The magnetic circuit comprises a yoke 124 which is secured at a base frame 115 by yoke securing screws 126 and securing magnets 123 which are secured at the yoke 124 and magnetized in the axial direction. The electromagnetic operation between this magnetic circuit and the current applied to a movable coil 121 positioned between the securing magnets allows the pivot hub 119 to rotate and position movably the head 116 at the predetermined data record track.

The head actuator comprises members 121-124. The pivot hub 119 is movably supported by a pivot bearing 128 around the pivot shaft 127. The pivot shaft 127 is secured to the base frame 115 by the pivot securing screw 129. Further, the space surrounding the disks 101 and the heads 116 is clear space without dust due to the base frame 115 and the cover 130. Even if there is any dust, the dust is caught by a filter 131 (FIG. 3), thereby maintaining the clear atmosphere. Furthermore, a circuit substrate 132 is provided under a base frame 115 so as to provide the circuit members within circuit covering space 133.

In particular, when the thin and small-sized magnetic recording device, referred to as a half height device having an outer diameter of below 5.25 inches is utilized, the space 133 covering the circuit members is restricted by the head actuator including the spindle motor and the head.

In FIG. 2, the rotor magnet 110 of the spindle motor is provided inside of the stator coil 9, thereby forming a thin and compact rotating portion of the spindle motor rotating portion. The heads 116 are provided in the radial direction relative to the rotating center of the arm 118, that is, relative to the pivot shaft 127, thereby diminishing the movable area thereof. A flat movable coil 121 is disposed spaced apart from the securing magnets in the axial direction, thereby providing a thin head actuator portion.

Such a thin magnetic recording device enables circuit covering space 133 on the circuit substrate 132 to be sufficiently small and provides support for spindle 1 by the sufficiently large bearing 10 in accordance with the inner diameter of disks 101, maintaining the stiffness of spindle 1. The inertia of the rotating portion is reduced by making the rotor magnet 110 and the rotor yoke 111 smaller. Furthermore, the start and stop time for bringing the disk 3 in contact with the head 116 is reduced, thereby reducing the danger of head crash.

Movable coil 121 has no core and the inductance is small. Further, the heads 116 are provided in the radial direction and the moment of inertia of the movable parts are small, thereby shortening the access time of the head to the predetermined data recording track enabling the high access time. Furthermore, since the arms 118 and the movable coil 121 are disposed in a manner well-balanced with respect to the rotating center, such a construction may not be moved easily when subjected to any vibration and damage from the outside. Further, the structure extending from the pivot shaft 127 to the pivot bearing 128 has high stiffness, improving the head follow-up action.

In a plurality of disks 3, on at least one of the surfaces (the servo surface), the positioning data of the assembly of heads 116 is recorded in advance. When accessing the head 116 to the predetermined track, the follow-up action may be improved utilizing the differential signal of the positioning signal, that is, the speed signal, thereby not only enabling rapid access, but also increasing the record track density providing a large disk capacity. Furthermore, on the data surface of the recording surface, the position compensating servo data where the positioning data of more than one track is previously recorded thereby it is possible to compensate for deviation from the track caused by the incline between each head and track in accordance with the change of the circumstances and to provide a high track density and a large capacity. The servo surface of the disk working in conjunction with the servo head is one embodiment of a first positioning unit. However, another embodiment of a first positioning unit may be an optical or magnetic encoder mounted on the head actuator. Still another embodiment of the first positioning unit may include a step motor.

Such a compact and thin magnetic recording device requires a high access time and a large capacity since it acts as the external memory device of the host computer and requires the circuit to connect to the host computer directly. If the mechanical portion is made thin as shown in the present invention, even in the thin and compact type magnetic recording device, it is possible to mount the circuitry such as the disk controller and the data separator as a high density circuit. Therefore, the magnetic recording device according to the present invention may be utilized in connection with a thin, compact recording device of the host computer such as the magnetic recording device having the size of 5.25 inch-half height or 3.5 inch-half height.

Figure 4:
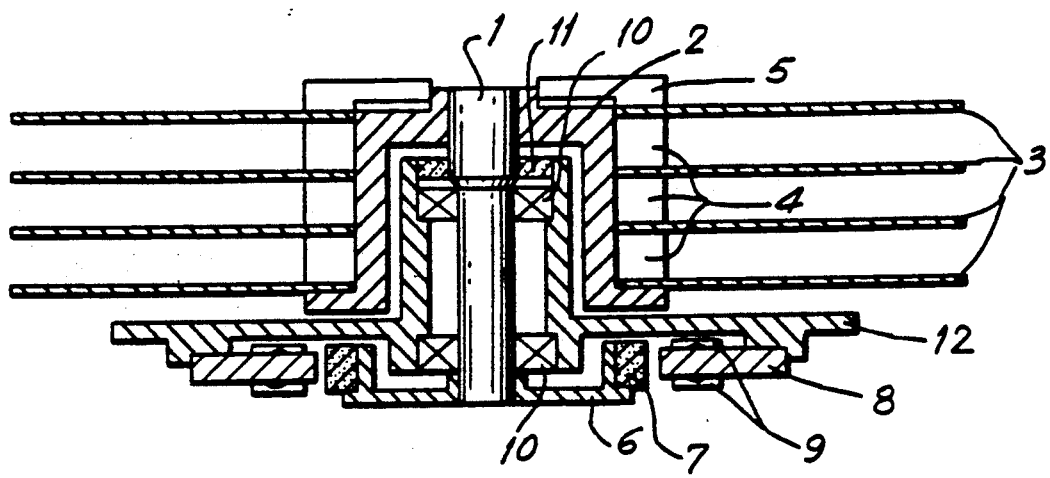
FIG. 4 is a sectional view of one embodiment of the spindle motor according to the present invention.

Reference is now made to FIG. 4 in which a sectional view of the main part of the spindle motor is provided. A hub 2 is secured to one end of a shaft 1. A plurality of disks 3 are mounted on the hub 2 through disk spacers 4 by a disk clamp plate 5. A rotor yoke 6 is secured at the other end of the shaft 1. A rotor magnet 7 is fixed at the outer circumferential surface of rotor yoke 6. A stator core 8 having a plurality of slots is disposed outside of the rotor magnet 7 at a distance therefrom. A stator coil 9 is wound around the stator core 8. The shaft 1 is supported by a bearing 10, and dust is sealed out by a seal 11. The bearing 10, the seal 11 and the stator core 8 are disposed in the housing 12.

The rotor magnet 7 is magnetized in the radial direction so as to be divided in a plurality of polarities. The positioning of rotor magnet 7 is detected by a magnetic sensor (not shown). Upon sequentially applying the current to a plurality of the stator coils 9, the rotating drive power is generated, thereby causing the shaft 1 and the disks 3 to rotate. The rotor magnet 7 is made of magnets such as a high effective ferrite magnet and rare earth magnet, to obtain the sufficient magnetic flux. If the rotor magnet 7 is provided inside of the stator core 8, the torque property is not much deteriorated. Further, the space permissible for coiling of the stator coil 9 and the sectional area of the magnetic path of the stator core 8 is adaptable for a thin and compact type magnetic recording device. Further, since the surface area of the stator core 8 is increased, it provides the benefit of preventing our heating of stator coil 9 which occurs, preventing the damage which may be caused by fire during the rotating lock. Therefore, even if a large current is applied, the reliability of the magnetic recording device is maintained.

Figure 5:
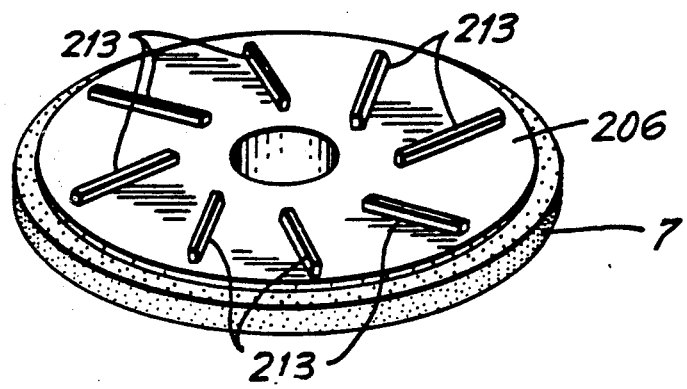
FIG. 5 is a perspective view of the rotor according to one embodiment of the fan structure.

Furthermore, as shown in FIG. 5, ventilation wings 213 may be provided on rotor yoke 206 to which the rotor magnet 7 is secured to control the rising of the temperature in the area from the rotor yoke 206 to the stator coil 9. This controls the rise in temperature of the disks 3 resulting from the heat of stator coil 9, and keeps the temperature uniform in the area, thereby making it possible to decrease the deviation from the track at the time of assembling the disk to the magnetic recording device. Further, since the diameter of the rotating portion is made small, the mounting space allotted for the circuit portion under the spindle motor is increased. Furthermore, the inertia moment is made small at a rotating portion in the spindle motor itself, therefore, the warming-up and stop time of the disk rotation is decreased, thereby improving the reliability of the magnetic recording device.

Figure 6:
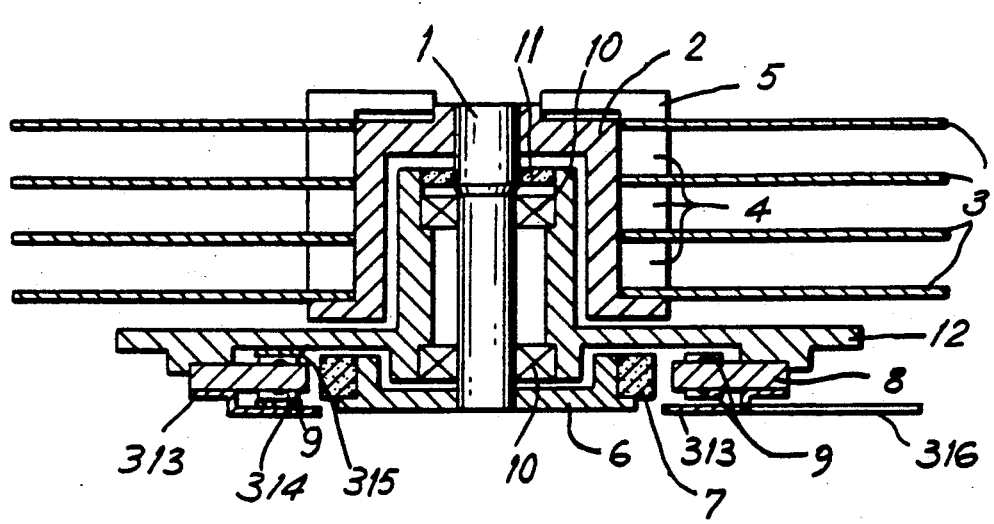
FIG. 6 is a sectional view of a second embodiment of spindle motor according to the present invention.

FIG. 6 illustrates a second embodiment according to the present invention and is a sectional view of the main part of the spindle motor. A hub 2 is secured to one end of a shaft 1 by a disk clamp plate 5 through disk spacers 4. A cup-shaped rotor yoke 6 is secured at the other end of the shaft 1. A ring-shaped rotor magnet 7 is secured outside of the rotor yoke 6. A stator coil 9 is disposed outside of the rotor magnet 7 at a distance. The stator coil 9 is wound around a stator core 8.

Shaft 1, stator core 8, the bearing 10 and the seal 11 are provided in a housing 12. Shaft 1 is supported by a bearing 10. The atmosphere surrounding the disks 3 is protected against dust by a seal 11 provided for preventing the dust. Further, a stator cover 13 is provided under the stator coil 9 and an annular motor circuit board 14 is provided facing the stator coil 9 on the stator cover 13. The magnetic sensor for detecting the position of the rotor magnet 7, and drawing wires of the stator coil 9 are provided on the motor circuit board 14. Through the signal line 16, the motor circuit board 14 is connected to the external motor drive controlling circuit. A sealed plate portion 15 of the housing 12 is provided intermediate stator coil 9 and disks 3, thereby preventing the switching noise of the stator coil 9 from affecting magnetic disks 3.

Figure 7:
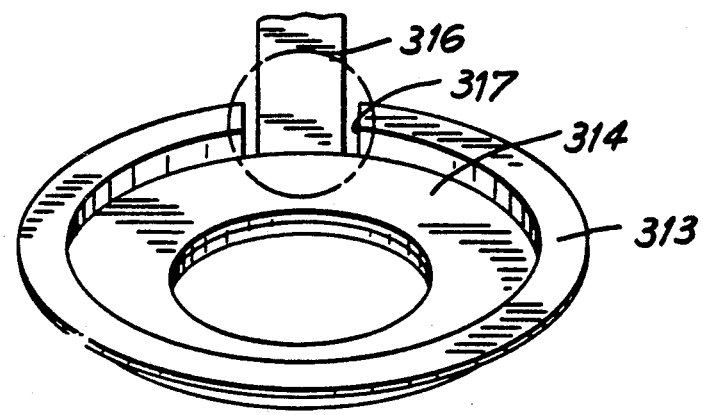
FIG. 7 is a schematic view of the stator cover of the spindle motor FIG. 6.

FIG. 7 is a perspective view of the stator cover assembly. Motor circuit board 14 is mounted on a cup-shaped stator cover 13 and the motor substrate 14 is connected to the external motor drive controlling circuit through the signal line 316. The signal line 16 is drawn from a recess 17 provided at the peripheral part of the stator cover 13. The signal line 16 may be made of a lead or a flexible cable integrally formed with the motor circuit board 14. In the flexible cable, even if there is no recess 17, the insulating action of the stator core 8 and the stator cover 13 may be effected only by an insulating seal and the like. However, if there is provided a recess 17 and further, the signal line 16 is fixed at the recess 17 with resin or the like, the danger of damage to the signal line 16 is reduced.

If the magnetic recording device has such a spindle motor construction as shown in FIG. 6, the rotating diameter of the rotor yoke 6 becomes smaller by approximately a half, compared with that of the prior art rotor yoke. Further, since the rotor portion including the rotor yoke 6 and the rotor magnet 7 is provided inside of the stator portion including the stator core 8 and the stator coil 9, the outside diameter of the stator core 8 is made larger and the heating area of the stator coil 9 is approximately doubled. In the prior art devices, the thickness of the motor is determined by the thickness of the stator and the rotor yoke, but in the present invention, the thickness of the motor is determined by the thickness of the stator and the stator cover. As a result, such an arrangement is available for a compact and thin type magnetic recording device with improved heating efficiency and the signal line is supplied from the periphery of the stator, therefore there is no danger of the connecting interference between the rotor and the signal line. Since the rotor is positioned inside and the stator is positioned outside as separate parts respectively, it is easy to control and assemble respective parts, therefore such a magnetic recording device is reliable and is easy for assembly and part exchange.

Figure 8:
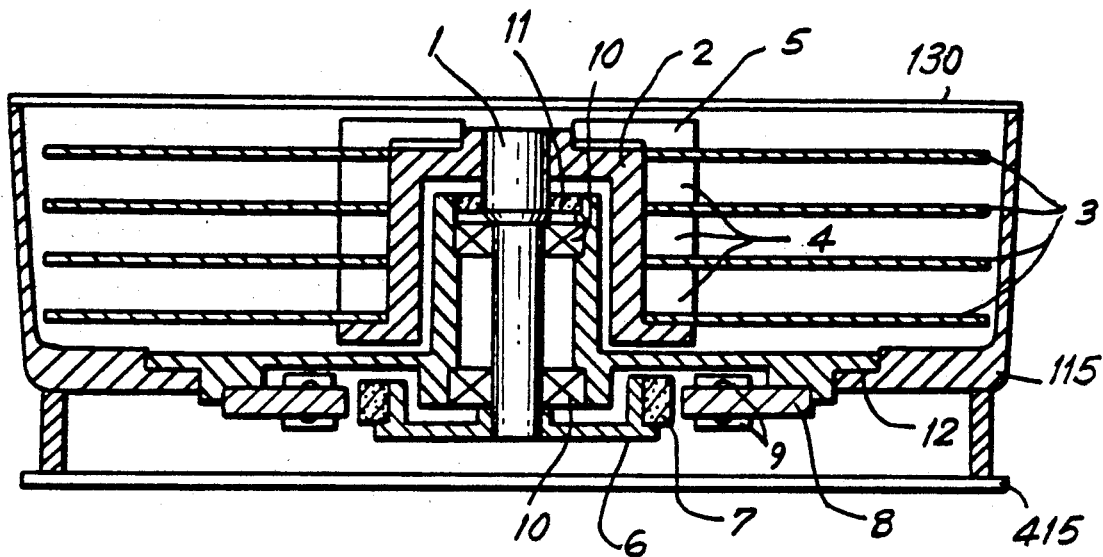
FIG. 8 is a sectional view of a third embodiment of the spindle motor according to the present invention.

Reference is now made to FIG. 8 which is a sectional view of the main parts of the spindle motor on the magnetic recording device, according to the embodiment of the present invention. A hub 2 is secured at one end of a shaft 1. A plurality of disks 3 are mounted on the hub 2 by the disk clamp plate 5 through a disk spacer 4. A rotor yoke 6 is secured to the other end of a shaft 1. Rotor magnets 7 which are collected in a ring shape or a curve shape and magnetized in a plurality of polar divisions are secured at the outside of the rotor yoke 6 in the radial direction. Stator coils 9 wound around a stator core 8 are provided outside of the rotor magnet 7 at a distance. Stator core 8 is secured to housing 12. A bearing 10 supports the shaft 1 and a seal 11 is provided for preventing dust damage.

Figure 9:
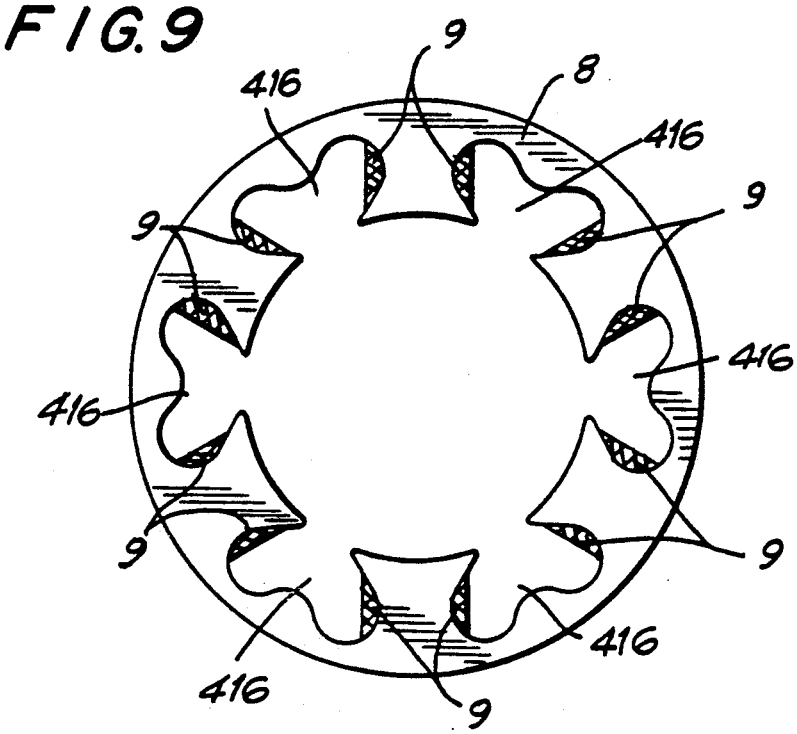
FIG. 9 is a sectional view of the stator according to the spindle motor of FIG. 8.

The housing 12 is secured at a base frame 13 of the magnetic recording device. The inside of the base frame 13 is sealed by a cover 130. Further, a motor circuit board 415 is disposed so that the circuit parts of the magnetic disk device are provided under the spindle motor. As shown in FIG. 9, which is a cross-sectional view, the stator core 8 provided outside of the rotor magnet 17 has a plurality of slots 16. The stator coils 9 are wound divisionally in a plurality of phases (not shown). Upon detecting the rotating position of the rotor magnet 7 by a magnetic sensor and applying the current to each phase of the stator coils 9 in turn, the rotating driving power is generated, thereby causing the disks 3 to rotate.

When the magnetic disk device has a spindle motor construction as shown in FIG. 8, the rotating diameter of the rotor yoke is decreased by approximately half, compared with those of the prior art devices. Further since there is no connecting interference of the stator coil 9 and the rotor yoke 6, the space between the rotor yoke 6 and the circuit substrate 15 is made larger. Furthermore, since the stator core 8 is provided outside of the rotor magnet 7, the heating area of the stator coil and the stator core can be increased approximately two times that of the prior art devices, and the common bearing and the seal can be utilized. The height of the spindle motor in the shaft direction is decreased by at least a thickness of rotor yoke 406, compared with those of the prior art devices. Further, the stator core is made thinner due to the increase of the heating area and the absence of interference between the rotor yoke and the stator coil. The mounting space of the motor circuit board can be obtained under the spindle motor.

Furthermore, since the rotor parts and the stator core parts are assembled individually, yield is improved and at a low cost. In view of the large mounting portion of the circuit, even if a circuit board (approximately 100 mm × 150 mm) such as that of a 3.5 inch magnetic recording device is utilized, there is enough mounting space for an interface circuit such as SCSI and the like including a controller of the magnetic recording device. A high capacity and intelligent circuit is thus available in a small space. When utilizing the in-hub motor, the magnetic recording device having an inner diameter of 40 mm or less has a low reliability, in particular, for the magnetic recording device of a half height or less. So, the motor of the present invention is more advantageous as compared with the in-hub motor. However, it is desirable to utilize disks having an inner diameter of 40 mm or less. Such use is obtainable with a recording device constructed in accordance with the invention.

Figure 10:
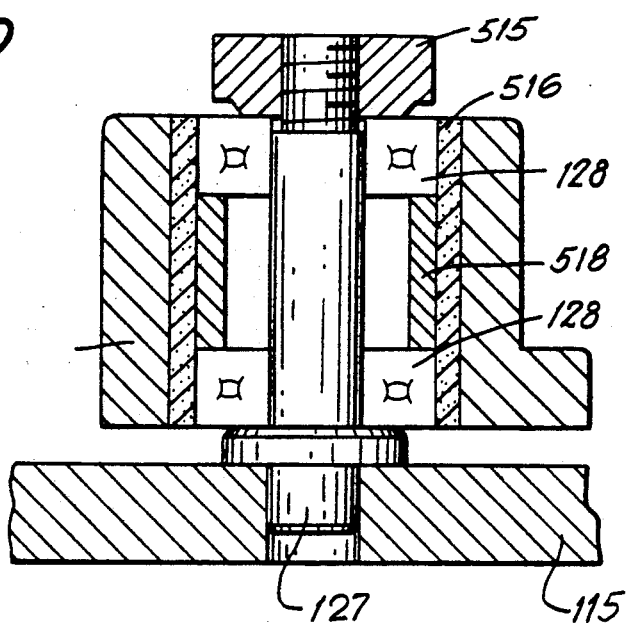
FIG. 10 is a sectional view of the rotating shaft structure according to the recording device of FIG. 2.

Reference is now made to FIG. 10 which illustrates in detail the embodiment of a bearing 128 described in FIG. 2. A shaft receiver 127 is secured to a base frame 115. The bearings 128 are secured to the sleeve 516 made of materials which have substantially the same heat expansion rate as that of the shaft 127 by an adhesion, a shrinkage fit and so on. The inner ring of the bearing 128 is secured to the shaft 127 in the same way as the outer ring. The inner ring of the upper bearing 128 as viewed in FIG. 10 is secured to the shaft with the pre-load pressure means 515 adding the predetermined pre-load pressure. Sleeve 518 is provided in the rotatable moving rotary arm 109 on which the magnetic heads are mounted. In FIG. 10, the pre-load pressure is added to the inner ring. The same effects can be obtained when the pre-load pressure is added to the outer ring. Further, when the constant pre-load pressure is added, if the shaft and sleeve having the substantial same expansion rate are adapted, it is possible to decrease the variety of the pre-load pressure more when compared with the prior structure.

Figure 11:
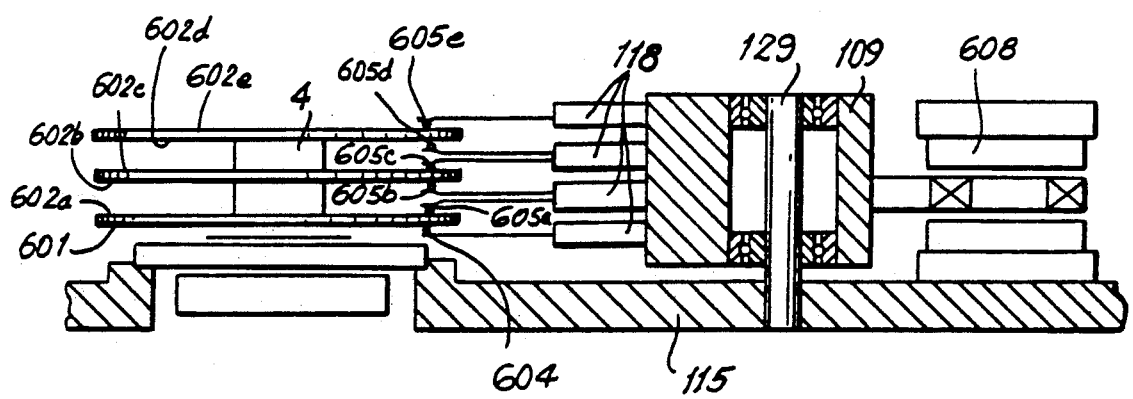
FIG. 11 is a schematic view of the head mechanism of the recording device of FIG. 2.

Reference is now made to the head control circuit according to the present invention. As seen in FIG. 11, the disks are rotatably mounted on a spindle motor 4. The lowest surface of the recording surfaces is a servo surface 601 and the remaining surfaces are data surfaces 602 (602a–602e) and correspond to a servo head 604 and data heads 605 (605a–605e), respectively. These heads are separately secured at supporting arms 118. Further, the supporting arms are mounted on the head positioning member 109. When a voice coil motor (VCM) 608, that is, the motor for driving the heads moves rotatably around a shaft 129, the servo head and the data heads mounted on the head positioning member equally moves in the radial direction.

Figure 12:
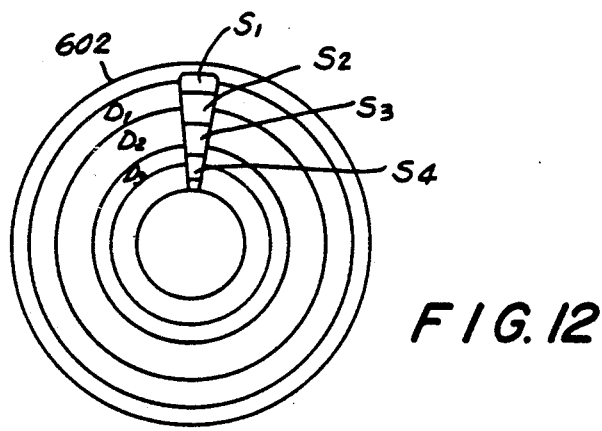
FIG. 12 is a top plan view of one arrangement of the data track and the servo track on the data surface according to the recording device of FIG. 2.

As aforementioned, the first positioning data on the servo surface is reproduced by the servo head 604. The data recorded on the data surfaces 602 and the second positioning data are reproduced by the data heads 605. FIG. 12 shows the data recorded on a data surface 602 and is an external view of one embodiment of the second positioning information. A plurality of data tracks $D_1$–$D_3$ and the servo zones $S_1$–$S_4$ are disposed on the data surface 602. The borders of the respective adjacent servo zones correspond to the center of the radial direction of the data track. In the embodiment, only one servo zone is positioned on the data track, but even if two or more servo zones are present, there is no problem.

Figure 13:
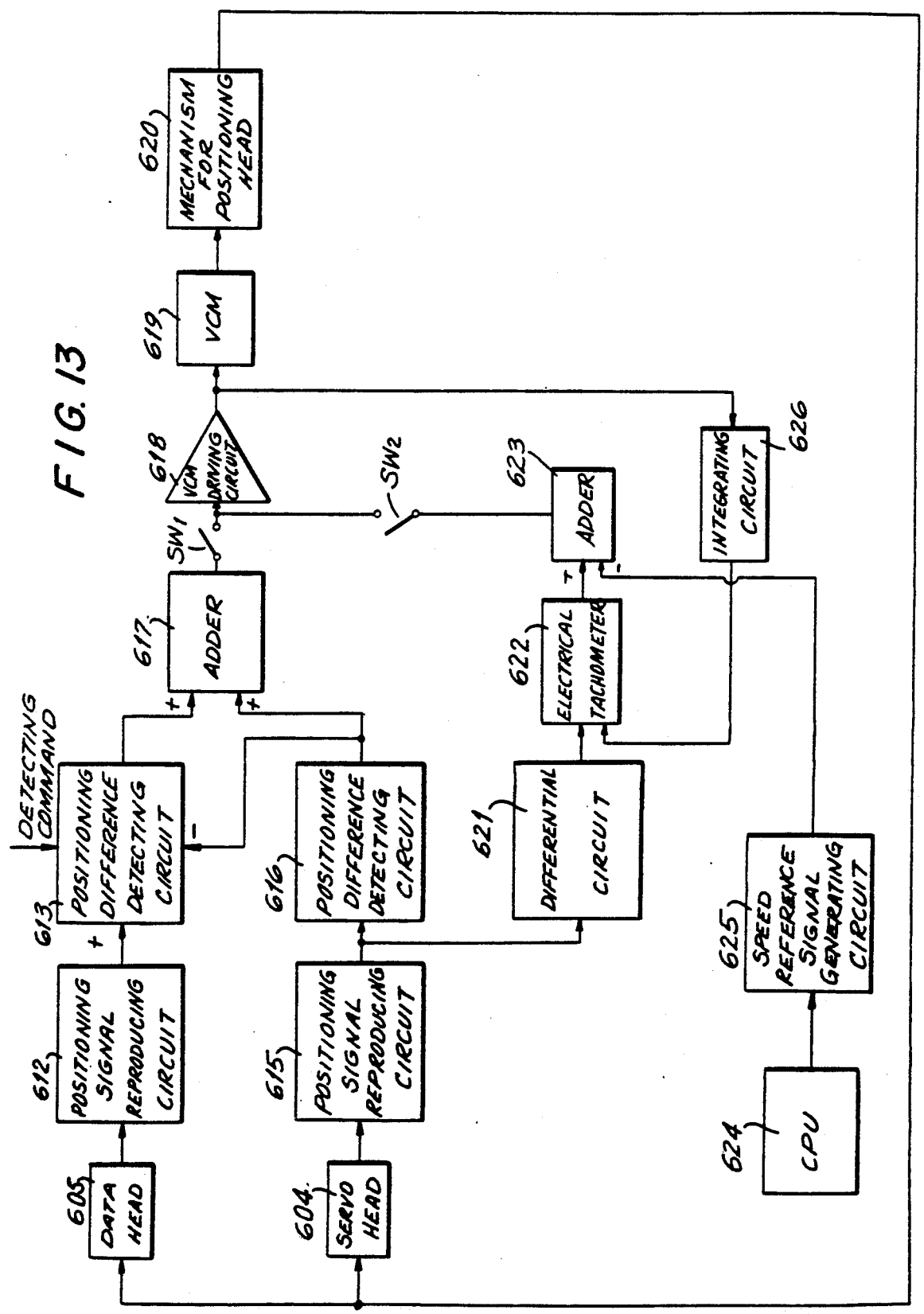
FIG. 13 is a block diagram of a control circuit for the recording device of FIG. 2.

Reference is now made to FIG. 13, a block diagram of a control circuit constructed according to the magnetic recording device of the present invention. The circuit operates as both a position control circuit and speed control circuit as will be described below.

A servo head 614 detects a first positioning information recorded on the servo surface 601. A positioning signal reproducing circuit 615 separates the necessary positioning signals from the detected servo signal and passes the signals through an AGC so that the difference of the positioning detection cannot be affected by variations in the signal amplitude. The positioning difference between the servo head 604 and the servo track 601 is determined by these signals by the positioning difference detecting circuit 616.

Similarly, the second positioning signal is detected by the data head 605, is passed through the positioning signal reproducing circuit 612 and is supplied to the positioning difference signal detecting circuit 613. Positioning difference signal detecting circuit 613 performs hold function. When the detecting command is given, the difference between the positioning difference obtained from the data surface 602 and the positioning difference from the positioning difference detecting circuit 616 on the servo surface 601 is supplied to the positioning difference signal detecting circuit 613 and the positioning difference signal detecting circuit 613 detects a further positioning difference upon the output of the detecting command. The positioning difference is held until the supply of the next detecting command. This positioning difference indicates the difference between the distance of the data head 605 and the destination data track and the distance of the servo head 604 and the servo tracks, and becomes a compensating value for the first positioning difference signal obtained from the servo head 604.

The first positioning information recorded on the servo surface 601 and the second positioning information on the data surface 602 are supplied to the calculating device (adder) 617 which outputs a compensated positioning difference signal.

The positioning data obtained from the servo surface 601 goes through another process after passing the positioning signal reproducing circuit 615. The positioning data is input to a differential circuit 621 which outputs a positioning signal. The positioning signal differentiated by the differential circuit 621 becomes a speed signal and is supplied to an electrical tachometer 622.

A driving current supplied from a VCM driving circuit 618 to the VCM 619 in response to the output of adder 617 is detected, and the detected current is supplied to the integrating circuit 626. The signal obtained by the integral at integrating circuit 626 is supplied to electrical tachometer 622. Electrical tachometer 622 outputs speed signals with a fine S/N ratio in a broad frequency range by inputting the two kinds of speed signals.

During seeking by the head, a CPU 624 outputs the value (specifically, the value proportioned to the square root of the number of the remaining tracks) corresponding to the number of remaining tracks. This value is input to a speed reference signal generating circuit 625 which outputs a changed value output as the speed reference signal and is utilized as the reference speed for moving the head. The output of the tachometer 622 and the speed reference signal are supplied to an adder 623 and the difference therebetween is output as a speed difference signal.

As aforementioned, the compensated positioning difference signal is output by adder 617 and the speed difference signal is output by adder 623. During seeking, the movement is controlled except the last step for the positioning control. Therefore, SW1 is opened and only SW2 is closed. Only the speed difference signal is applied by the adder 623 to a VCM driving circuit 618 to drive VCM 619, thereby causing positioning member 620 to move servo head 614 and data head 605. However, when the number of the remaining tracks which to be traversed is one track or less, the speed control circuit is switched to the positioning control circuit by switches SW1, SW2. The data head is positioned accurately on the destination data track by the positioning control circuit. Therefore, when the SW2 is opened and the SW1 is closed, the positioning difference signal compensated by the second positioning signal held in advance is supplied to driving circuit 618, thereby accurately positioning the data head 605 on the destination data track for a short time by controlling VCM 619 only once.

Figure 14:
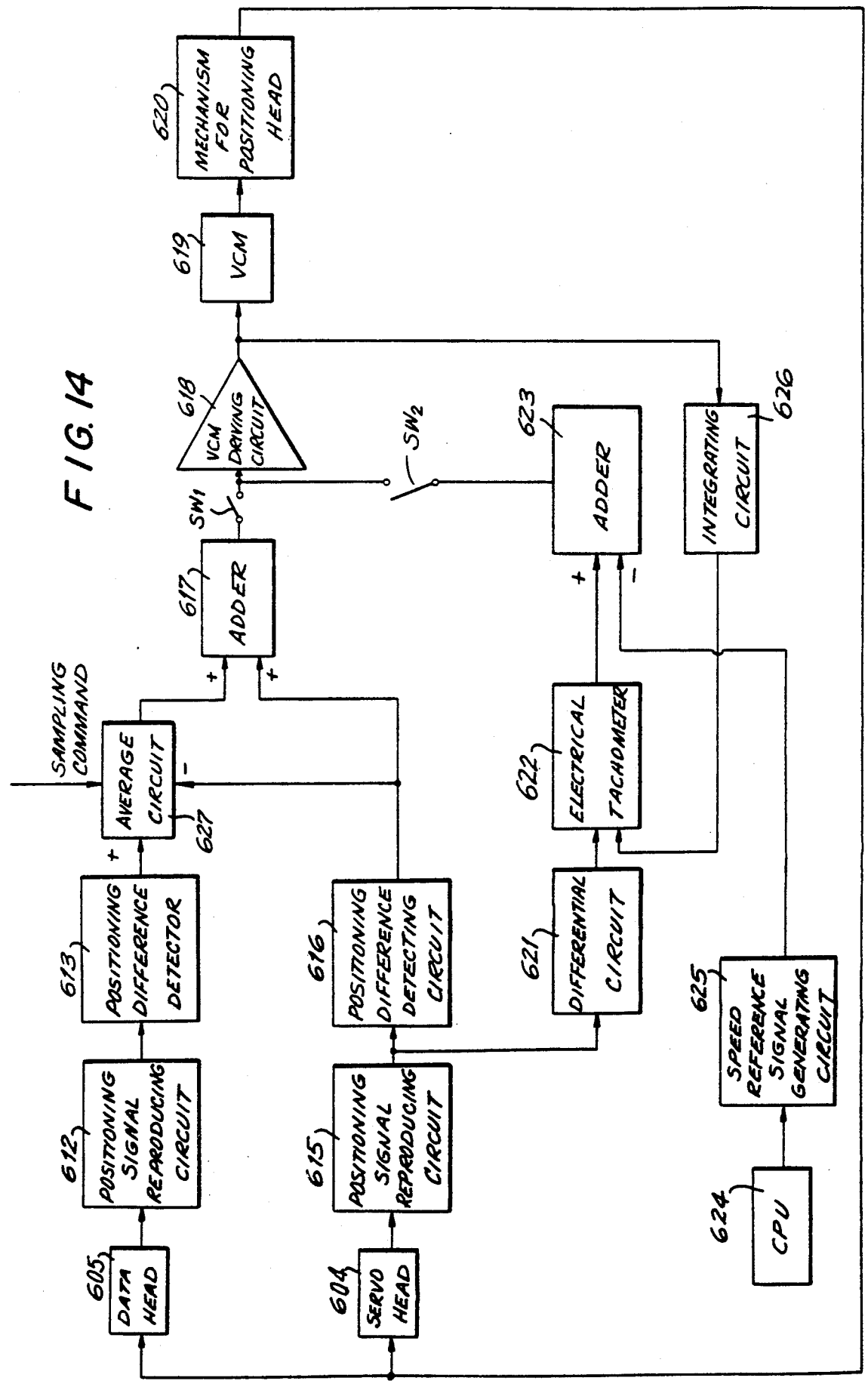
FIG. 14 is a block diagram of a control circuit for the recording device of FIG. 6.

FIG. 14 shows a schematic view of the control circuit according to the second embodiment of the present invention. The basic operation is substantially the same as that of the first embodiment, the primary difference being the processing of the second positioning information supplied from the data head. Namely, the positioning information supplied from the data head 605 is operated on by the positioning signal reproducing circuit 612 and the positioning difference signal detecting circuit 613, and is supplied to an average circuit 627. Whenever the average circuit 627 receives the sampling command pulse, the average circuit 627 also receives positioning difference signals. The data (the positioning difference signals) between the new first data and the latter 16th data are held in the average circuit 627 and the previous data before the 17th data are omitted. The average value of the data through the 16th data from the first data is calculated and is output as a compensated value which is held until the input of the next sampling command pulse is reviewed. By calculating the average value of 16 positioning error signals, a positioning compensating signal exhibiting little variation which may be caused by the irregular positioning slant in the radial direction of the disk and vibration can be supplied to the adder 617 enhancing the compensating accuracy. The circuit construction and operation other than the above is the same as that of the embodiment in FIG. 13.

Figure 15:
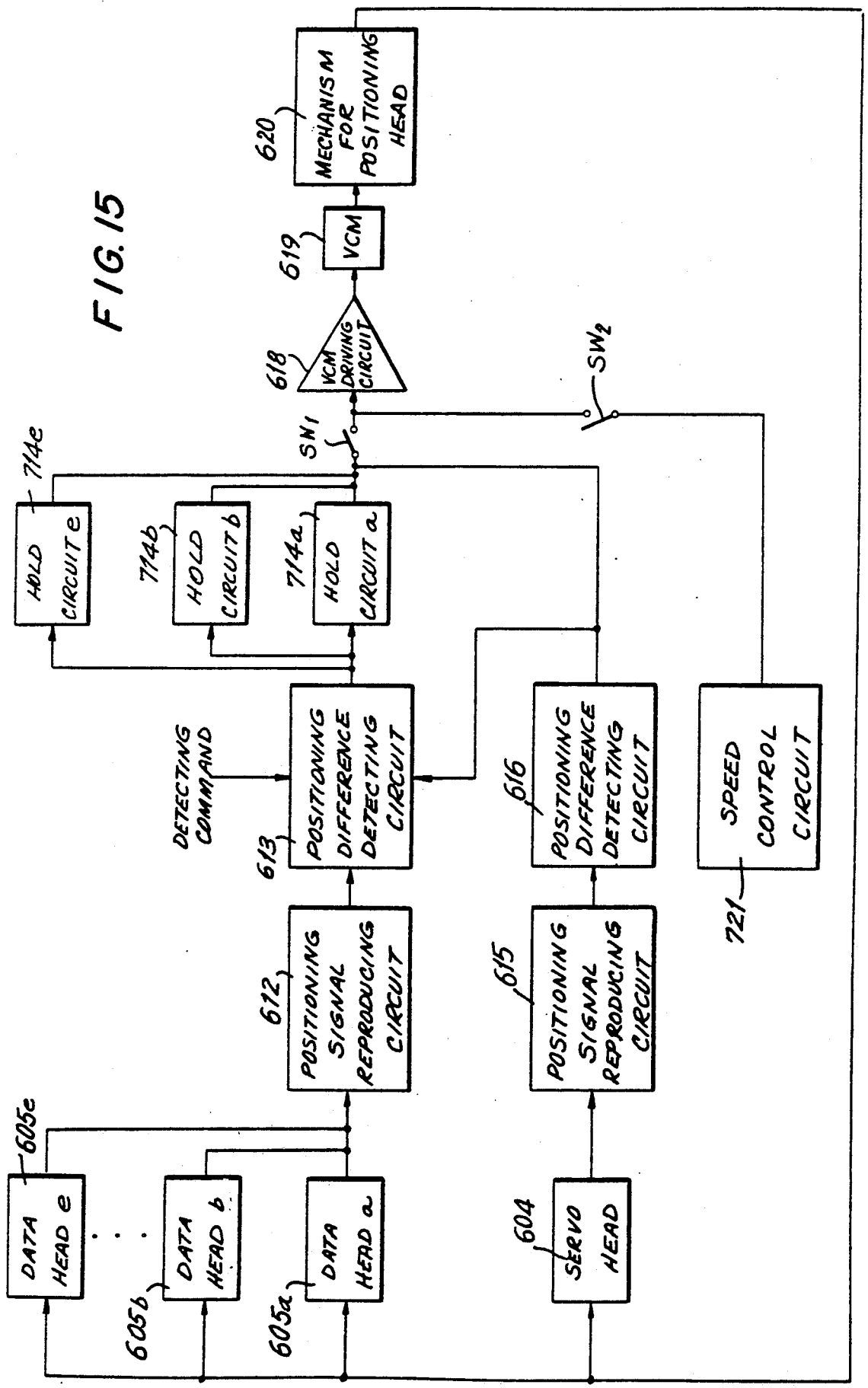
FIG. 15 is a block diagram of a second embodiment of the control circuit for the recording device of FIG. 2.

Reference is now made to FIG. 15 which a block diagram of the positioning control circuit of the magnetic recording device according to another embodiment of the present invention is provided. The operation is described below. A first positioning information recorded on the servo surface is detected by a servo head 604. The positioning signal reproducing circuit 615 separates the necessary positioning signal from the servo signal after passing the input through an AGC so that an error in the positioning detecting may not be caused by variations in the signal amplitude. The positioning difference between the servo head and the servo track is detected in the positioning difference detecting circuit 616.

The positioning information supplied from the data heads 605a-605e is dealt with in the same manner. The magnetic recording device in FIG. 11 has five data heads. In FIG. 15, the second positioning information is reproduced from the corresponding data surface of the five data heads 605a-605e, respectively while the data is not recorded and not reproduced in each head itself, the obtained positioning difference signals in the positioning difference detecting circuit 613 after having been operated on by the positioning signal reproducing circuit 612. Further, the difference between the first positioning difference signal supplied from the first positioning data of the servo surface 601 and the second positioning difference signal becomes a compensated value which is indicated by the difference between the positioning difference of the servo data and the destination data track and the positioning difference of the servo head and the servo track. The compensated value is held in the hold circuits 714a-714e corresponding to the respective data heads 605a-605e until the next compensated value is supplied. When the control circuit switches to select the corresponding head 605, the compensated value is supplied from the head 605.

The above description is explained with reference to the embodiment of FIGS. 11, 15. For example, if the data head 605a is not in the condition of recording and reproducing, and further the data head 605e is selected, the second positioning data detected from the data surface is held in the hold circuit 714a corresponding to the data head 605a, after processing the data signal in reproducing circuit 712 and the positioning difference detecting circuit 605a. If the data head 605a is selected, the compensated value is output at the next step. But if at this time the data head 605a is selected, only the hold circuit 714e is output and the hold circuit 605a remains held and is not output. Then, when the head is switched to select the data head 605a, the compensated value is output from the hold circuit 605a.

As aforementioned, whenever the data head is switched, the compensated value corresponding to the switched head is output. The compensated value is superimposed on the output signal generated from the positioning difference detecting circuit 616 of the servo surface 717, and becomes the compensated difference signal. During controlling the positioning of the switch SWI is closed, so that the compensated difference signal is applied to the VCM driving circuit 718. Upon driving of VCM 719, the data head under the condition of recording and reproducing the recorded data is positioned accurately on the destination data track.

As aforementioned, the second positioning information is reproduced corresponding to each data head 605 and is held in the hold circuit 714 corresponding to each head 605 as a compensated positioning difference signal. After that, whenever the head 605 is switched from one to the other, the compensated amount according to next head is output. Therefore, it is possible to minimize the positioning difference of the destination data track according to each head. In addition, the speed control circuit 721 is used at the time of moving the heads 605 between the tracks, but not used for positioning the changing heads 605. Therefore, at the time of switching the heads 605, the positioning of the heads are controlled under the condition that switch SW1 is closed and switch SW2 is opened. At the time of the movement between the tracks, the speed is controlled under the condition that switch SW2 is closed and the SW1 is opened. Further, when the positioning is controlled at the final stage, the SW1 is closed and the SW2 is opened.

Figure 16:
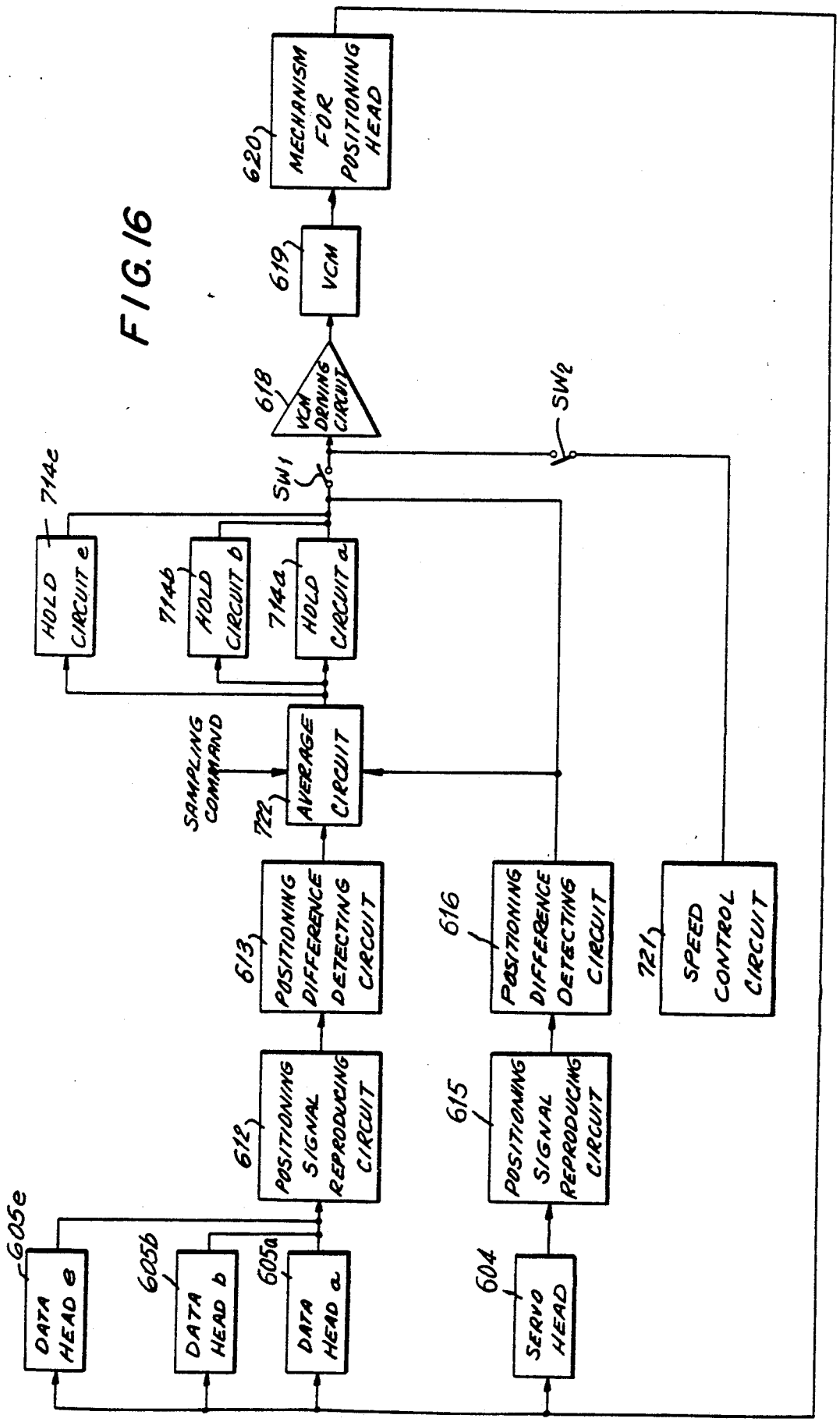
FIG. 16 is a block diagram of another embodiment of the control circuit for the recording device of FIG. 6.

Reference is now made to FIG. 16 in which another embodiment of the control circuit is provided. The basic operation is the same as that of the control circuit of FIG. 13, the primary difference being the processing of the second position information received from the data head 605. By way of example, the process for positioning data head 605a is explained below. The position information is input to the average circuit 722 as the compensated positioning difference through the positioning signal detection circuit 612 and the positioning difference detecting circuit 613. Whenever the sampling command is input, the average circuit 722 outputs the compensated positioning difference signal. The last 16 positioning error signals are held in the average circuit 722 and the average of this data is calculated and the average value is output to the hold circuit 714a corresponding to the data head 605a. By averaging the 16 positioning difference signals, it is possible to output the positioning compensated signal wherein the irregular positioning differences and difference caused by the vibration in the radial direction of the disk is minimized. Therefore, the compensated accuracy is increased. The other construction and operation is the same as that of the embodiment of FIG. 15.

In addition, in the above explanation, the compensated values are calculated according to all of the data heads 605 in advance and upon switching the heads 605, the positioning of all of the data heads 605 is compensated. However, it is not necessary to always calculate the compensated values of all of the data heads 605 for compensating them, but the necessary data head 605 may be calculated and compensated.

Figure 17:
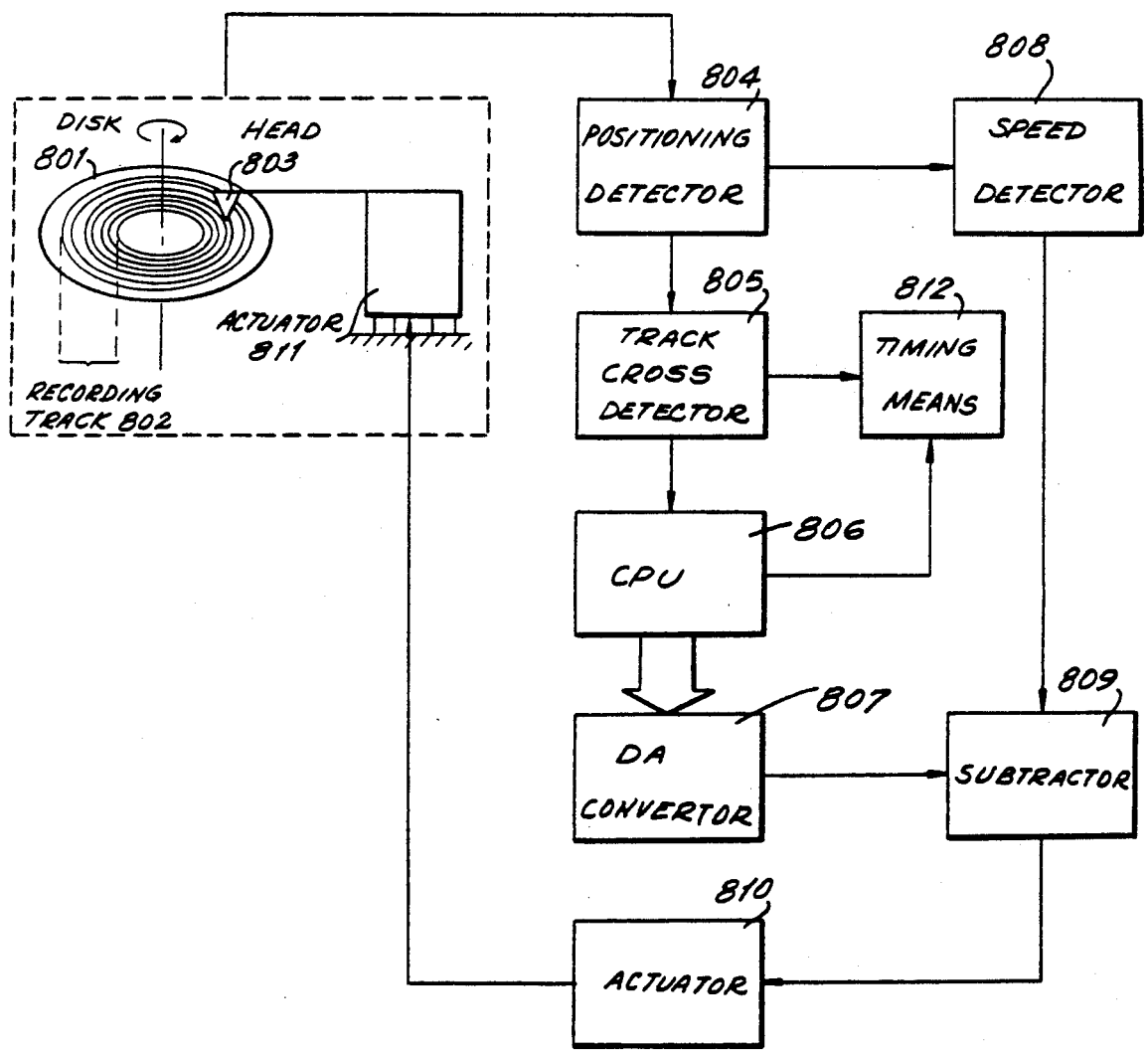
FIG. 17 is a block diagram of the head speed control system constructed in accordance with the invention.

Reference is now made to FIG. 17 in which one embodiment of the head speed control system is shown. The position of the head 803 on the disk 801 is detected by positioning detector 804 such as a face servo data or encoder or the like well known in the prior art. When the head 803 is positioned on the recording track, the output of the positioning detector 804 indicates a predetermined voltage (for example, zero voltage). When the head 803 is moved from one recording track to another recording track, by using the above mentioned characteristics, whenever upon the output of the positioning detector 804, the head crosses the recording track, a pulse is output from the track cross detector 805. Track cross detector 805 includes a comparator and a few logic circuits. CPU 806 calculates the number of tracks remaining to be crossed until the desired track is reached. Whenever CPU 806 receives one output pulse of the track cross detector 805, CPU 806 reduces the number of remaining recording tracks to the desired track one by one until the destination recording track is reached by the head 803.

A destination speed signal calculated by CPU 807 in accordance with the number of remaining recording tracks, taken from data stored in a ROM, is output to a DA convertor 807. DA convertor 807 converts the destination speed signal of the CPU 806 to an analog value. A speed detector 808 detects the moving speed of the head 803. The outputs of the DA convertor 807 and the speed detector 808 are subtracted by a subtracting circuit 809 to calculate the difference between the destination speed and the actual speed of the head 803. The difference is output to the actuator driving circuit 810 and the head 803 is moved by the actuator 811. In such a way, head 803 is moved in accordance with the destination speed previously stored in the ROM.

In such a construction, the output voltage of the speed detector 808 is different from the voltage corresponding to the actual speed of the head due to differences in the changing gain of the positioning detector 804 and the speed detector 808. Since the destination speed signal output from the DA convertor 807 is data stored in the ROM, the actual speed of the head 803 for one destination speed is changed in accordance with the varying outside circumstances such as the temperature and the supplied voltage, the tolerance of electronic elements and the like. This alters the access time for moving the head which is an important performance characteristic in the rotating disk type recording device.

Furthermore, when the detected difference of the speed detector is within the range of ±10%, in order to achieve the access time described in the specification, the destination speed must be maintained in the device having the largest gain of changing speed with voltage, which is determined by both the positioning detector and the speed detector. At this time, in the device having the smallest changing gain, the head is moved at the higher speed by 20%, compared with the former. Such a condition causes excess vibration of the head when reaching the head position of the destination recording track and, in extreme case, the head is stopped at another recording track after passing the destination recording track. To eliminate this condition, it is necessary to control the gain of changing speed for each device to absorb the irregular electronic elements and omit the error of the speed detector Further, it is necessary to design the device so as not to change the changing gain in face of the changes in outside circumstances such as the temperature and the supplied voltage. Such requirements tend to lead to a high cost. To eliminate the above problems, in FIG. 17, the timing means 812 is included.

Figure 18:
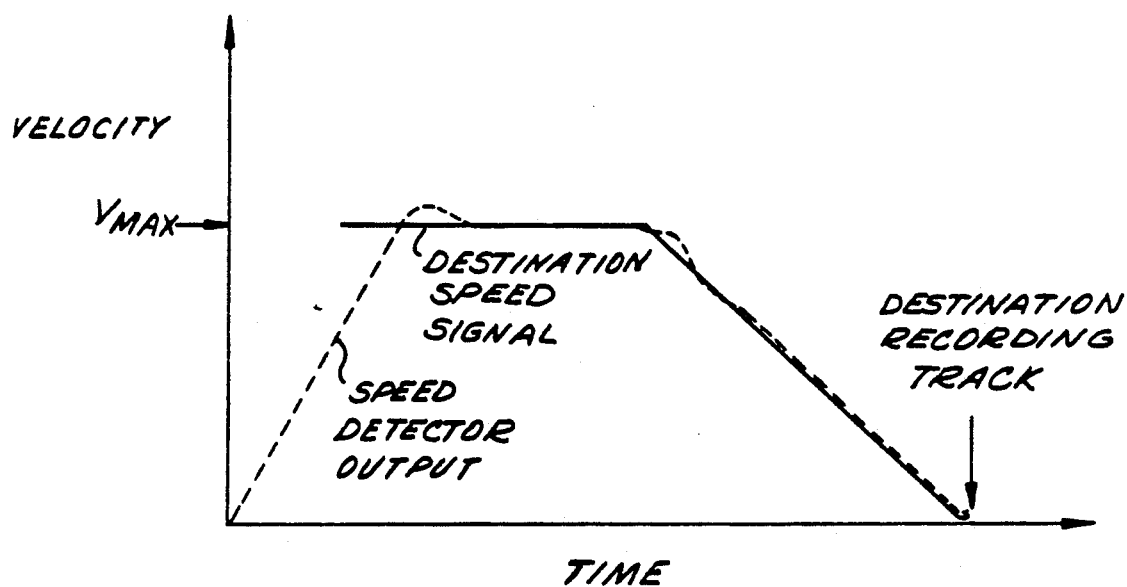
FIGS. 18 and 19 graphically depict the relationship between position and time for compensating the velocity of the head according to one embodiment of the head speed control system of FIG. 17.
Figure 19:
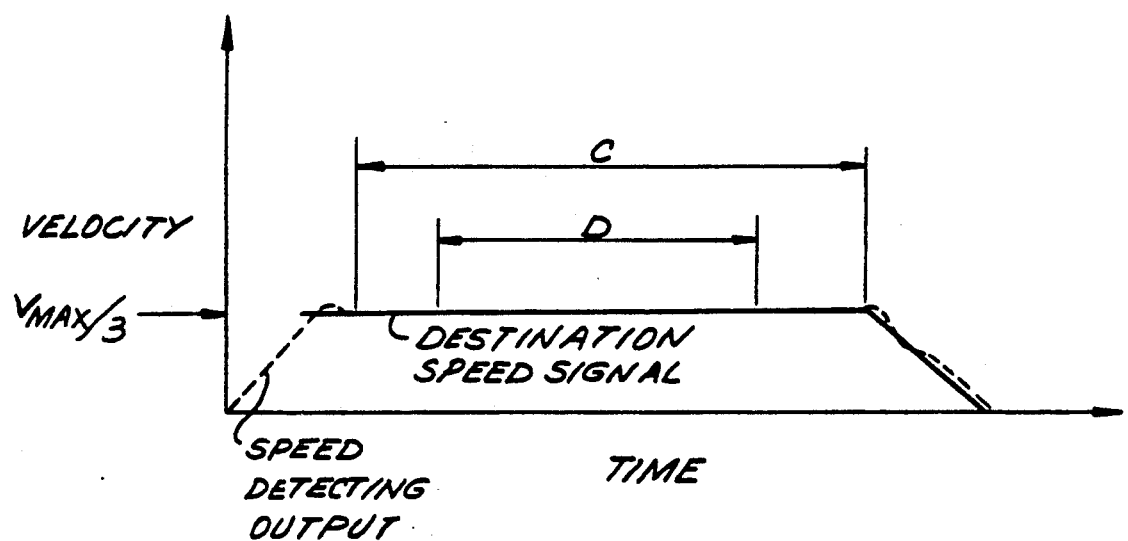
Figure 20:
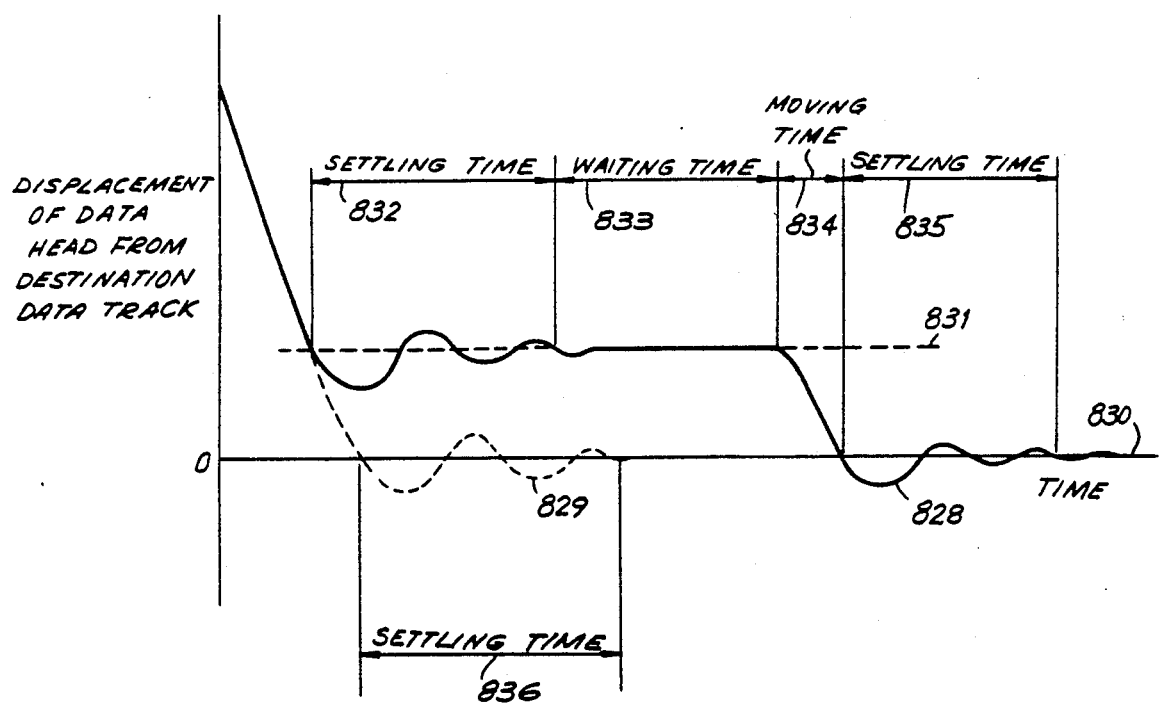
FIG. 20 graphically depicts the relationship between position and time for compensating the velocity of the head according to one embodiment of the head speed control system of the prior art.

Reference is now made to FIG. 18 in which the relation between the destination speed signal and the output of a speed detector 808 relative to time, when the head 803 is moved by the construction of FIG. 17 is provided. When the destination speed signal stored in the ROM is that shown in the solid line of FIG. 18, the output voltage of the speed detector 808 follows the destination speed signal represented as the dotted line. In the embodiment, the gain difference in the positioning detector 804 and the speed detector 808 is compensated as follows. First, as shown in the solid line of FIG. 19, the CPU outputs the destination speed signal corresponding to $\frac{1}{3}$ of the maximum speed $V_{max}$. Then, the head 803 is moved so that the speed detector 808 outputs as shown in the dotted line of FIG. 19. At this time, in a certain interval D within the uniform speed interval C, the CPU calculates the number N of the recording tracks which the head 803 has crossed and the time T thereof by the output pulses of the track cross detecting circuit 805 and the timing circuit 812. When the pitch of the recording track is P, during the uniform speed interval D, the actual speed V of the head is below:

$$V = PN/T$$

Since during the interval D, the destination speed is $V_{max}/3$, the actual speed of the head 803 is expressed below:

$$V = (V_{max}/3) \times 3\, PN / (T \times V_{max})$$

Therefore, if the signal multiplied $T \times V_{max}/3\, PN$ by the destination speed signal stored in ROM is output to the DA convertor of the actuator 811, it is possible to reconcile the original predetermined value with the above mentioned gain difference Additionally, in the embodiment, the above process of calculating gain difference and determining the compensated coefficient is conducted once at the time of starting of the rotating disk type recording device and further, is conducted once per approximately one hour for compensating the change of the gain difference according to the temperature variations and the like. The compensated coefficient calculated in such a way, is multiplied by the destination speed value before the CPU outputs the destination speed signal received from the ROM. When the speed of the head is high and the time between a recording track and the next recording track is short, the time is not enough for the above operation. Therefore, the destination speed signal is renewed every other track.

Another embodiment of the present invention contemplates a magnetic recording device comprising a servo disk surface for recording the first positioning data which is used as the control signal for positioning the data head to the destination data track; a data disk surface for recording the data and the second positioning data; a servo head disposed in correspondence with the servo disk surface; a data head disposed in correspondence with the data disk surface; and a control means for controlling the first and the second positioning data wherein the second positioning data is a magnetic inversion burst type chain and is recorded in a plurality of portions around the track besides the data track. The device is characterized by at least one of the tracks for recording the second positioning data being disposed on each data disk surface, the proper positioning being conducted relative to the track for recording the second positioning data on the basis of the positioning signal detected from the first positioning data, seeing the second positioning data, the positioning difference between the data head and the data track being detected in each data head to be stored, and the positioning of each head being conducted by superimposing the stored data on the positioning signal detected from the first positioning data.

Figure 21A:
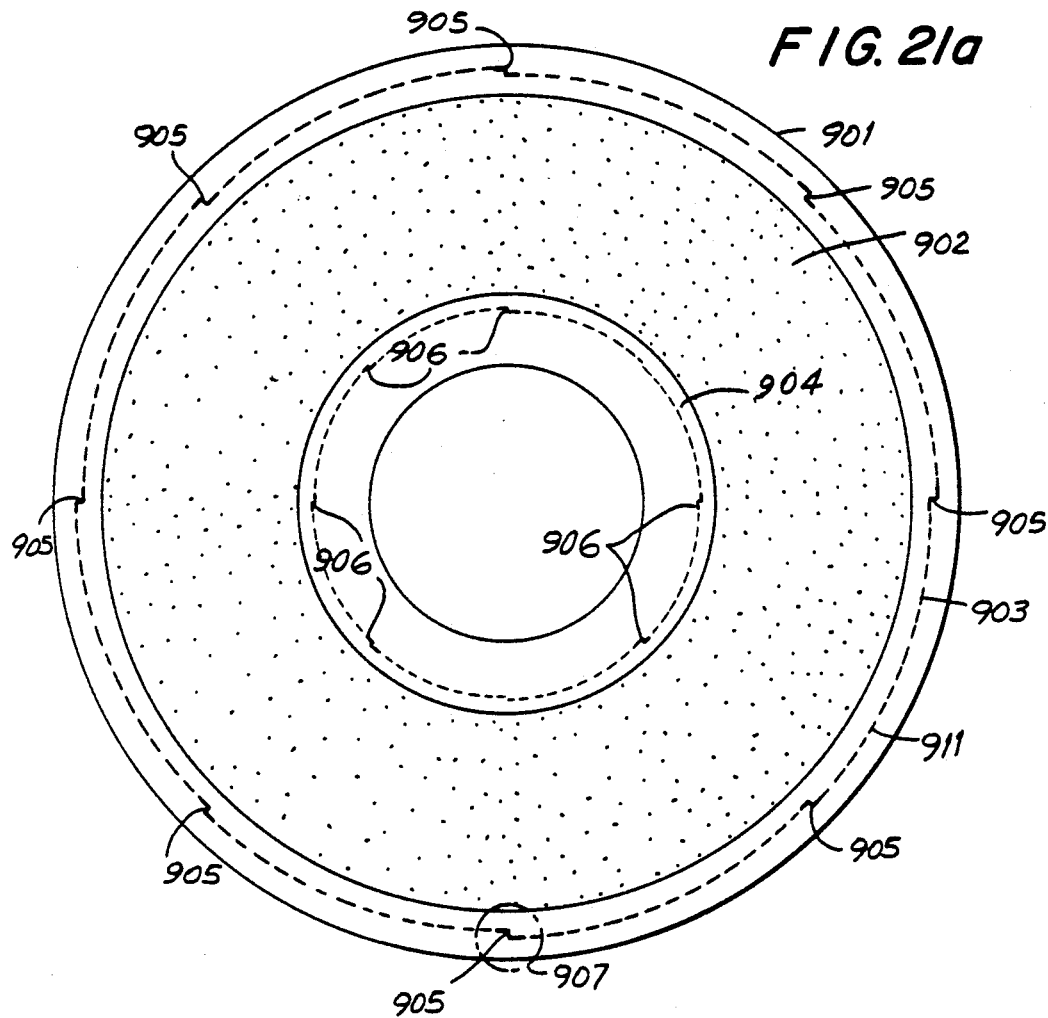
FIG. 21, consisting of 21a and 21b, is a view of the data surface constructed in accordance with the embodiment of the present invention.
Figure 21B:
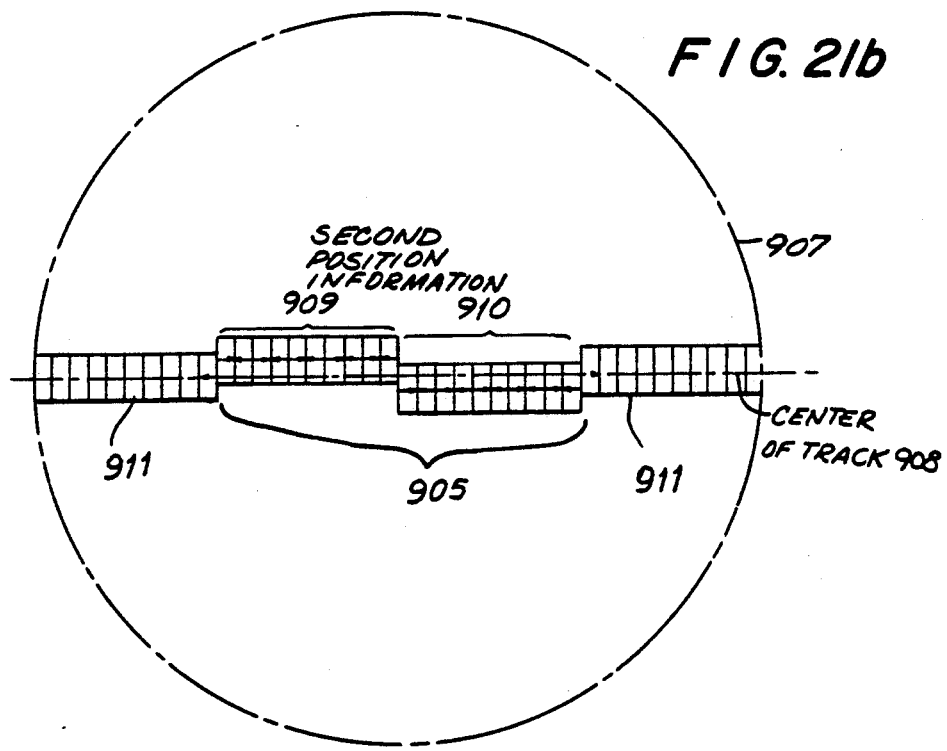

In this embodiment, the mechanism of the magnetic recording device is substantially the same as that of FIG. 11. FIG. 21 shows the condition of the data surface. An assemblage of data tracks, that is, the data area 902 is disposed on the disk 901. The tracks 903 and 904 where the second position information 905 and 906 were recorded are disposed in the outer or inner side of the disk 901. The data tracks of the data area 902 and the tracks 903, 904 including the second position information correspond to the tracks on the servo surface, respectively one by one. The reference numeral 907 indicates a part of the second position information. FIG. 21(b) is the enlarged view thereof. The broken line 908 indicates the center line of the track in which the second position information is recorded. The reference numerals 909 and 910 are burst type magnetic flux reversal chains which are recorded on the positions slightly off center from the center line toward the inner and the outer directions of the disk by one uniform distance, respectively. A small arrow in FIG. 21, shows the direction of the magnetization.

Figure 22:
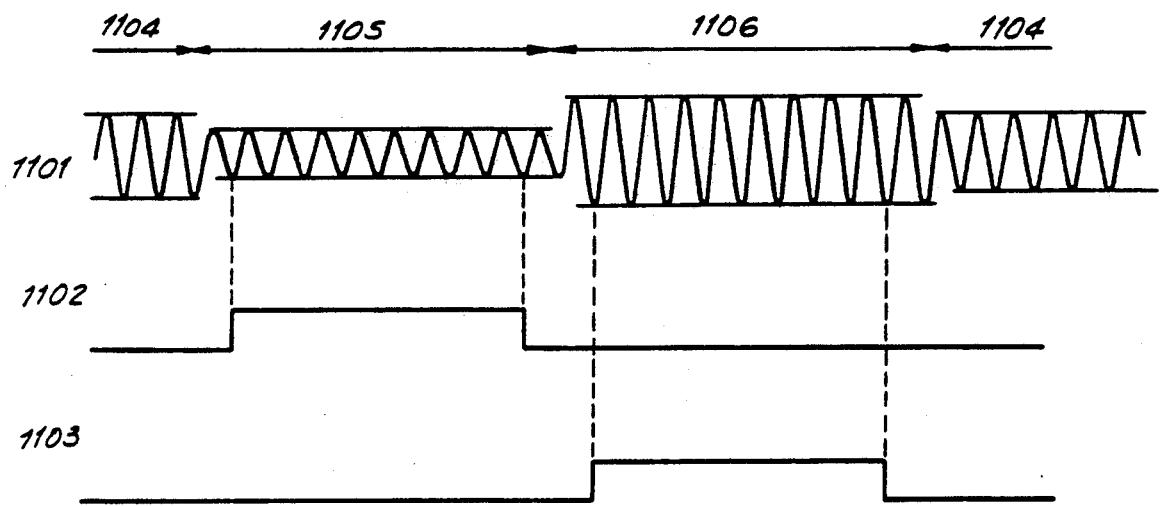
FIG. 22 is a waveform diagram of the second positioning data constructed in accordance with the embodiment of the present invention.

In the embodiment, the second position information comprises a pair of the parts 909 and 910. By way of example, eight second position information 905 are recorded on one positioning track. The reference numeral 911 is a chain of the magnetic flux reverse which is hereinafter referred to as burst signals for filling up the space of the second position data and does not serve as the positioning data. FIG. 22 indicates the waveform 1101 output by a data head, when the data head is slightly off center from the center line 908 toward the outer side and second positioning data is read out. The portions 1105 and 1106 show the waveforms read out from the magnetic reversal chains 909 and 910, respectively. The portion 1104 corresponds to the magnetic reversal chain 911. When the data head is positioned so as to be biased toward the outer side relative to the track in which the second position information is recorded, the output waveform of the data head as shown by the portion 1101 in FIG. 22, includes a small amplitude signal at the magnetic flux reversal chains 909 and large amplitude signal at the magnetic flux reversal chains 910. The data head should be positioned so that the small amplitude be equal to the large amplitude.

The burst signal made up of magnetic flux reversal chains may be utilized to stabilize the operation of the AGC amplifier of the signal reproducing circuit. The AGC amplifier of the information signal reproducing circuit allows changes in gain in accordance with the amplification of the data and also change gain upon receipt of the burst signal. Herein, when the response time of AGC is determined so as to become smaller than the time of generating the burst signal 911, T1 and sufficiently larger than the time T2 of generating the second position information signal 909, 910, the AGC amplifier reads the position information signals while maintaining the gain which was determined by the burst signal 911, thereby making it possible to prevent any change of the amplification ratio between the first position information signal 909 and the second position information signal 910.

Further, it is also possible to make the burst signal region narrower under the method that the response time of AGC is quicker in the burst signal region and slower in the second position information signal region. Furthermore, when the position information signal is input to the data track region, that is, a sector servo track, if the burst signal and the position information signal are recorded therein under the above condition, the same effect can be obtained Next, based on the above description, the circuit construction and the positioning process of the embodiment is explained with reference to FIG. 23. First, the embodiment of the magnetic recording device includes the same positioning data as that of a general magnetic recording device having a servo surface. The first positioning data is read by a servo head 1201 which is operatively disposed with the servo surface. The read out first positioning data is transferred to a peak hold circuit (PHC) 1203 through an amplifier 1202. The first position signal is processed through a subtracting decreasing circuit, subtractor 1204. For example, the first position information is a well known modified dybit pattern (IEEE TRANS. ON MAG., VOL. MAG-14, NO. 4 JULY 1978 P. 176). The process of manufacturing a positioning signal from the first position information is well known and is not an essential feature of the present invention, therefore, the process is not described in detail.

When the servo head 1201 is positioned on the predetermined track of the servo surface, it is necessary to provide speed control means (means for controlling the speed) for moving the servo head 1201 from the present track to the destination track and position control means (means for controlling the position) for following the track accurately after reaching the destination track. When acting as the speed control means, a switch 1208 turns OFF and a switch 1213 turns ON. The number of the tracks traversed and the direction in which the tracks are traversed are transferred to the CPU 1218. The CPU 1218 outputs the signal (which is called as the reference speed signal) through the DA convertor 1216 for indicating the speed at which the servo head 1201 must move. On the contrary, the signal for indicating the speed of the servo head 1201 (the speed signal) is processed from the position signal through the differentiating circuit 1210 and the phase switching circuit 1211. The difference between the reference speed signal and the speed signal is calculated by the subtractor circuit 1212. Since the difference signal is added to the motor 1214 through the motor driving circuit 1209, the speed of the servo head 1201 follows the reference speed generated by the CPU 1218.

The track cross detecting circuit 1215 is constructed so as to output a pulse when the servo head 1201 crosses the track. Upon the receipt of the pulse, the CPU 1218 calculates the number of the remaining tracks to the destination track and outputs the reference speed in correspondence with the number.

Next, positioning control is described. In positioning control, the switch 1208 is ON and the switch 1213 is OFF. The position signal is provided by the phase compensation circuit 1207 for stabilizing the servo loop output by the phase switching circuit 1205 and the adder 1206 (of which the operation is hereinafter described). Since the signal output by the phase compensation circuit 1207 is input to the motor driving circuit 1209 to drive the motor 1214, the servo head 1201 follows the destination track. The CPU 1218 outputs the digital value to the DA convertor 1217 which in turn applies the analog output to the adder 1206 thereby making it possible to offset the servo head 1201 from the destination track of the servo surface.

The process for moving the data head onto the destination track of the data surface is described below. First, the servo head 1201 is positioned on the track of the servo surface in correspondence with the data track where the second position information is recorded. As already explained, the data track is displaced from the track of the servo surface due to several mechanical reasons. When there is no displacement, the amplitude of the portion 1105 (FIG. 22) is the same as that of the portion 1106. However, when there is any displacement, the amplitude of the portion 1105 is not the same as that of the portion 1106.

Figure 23:
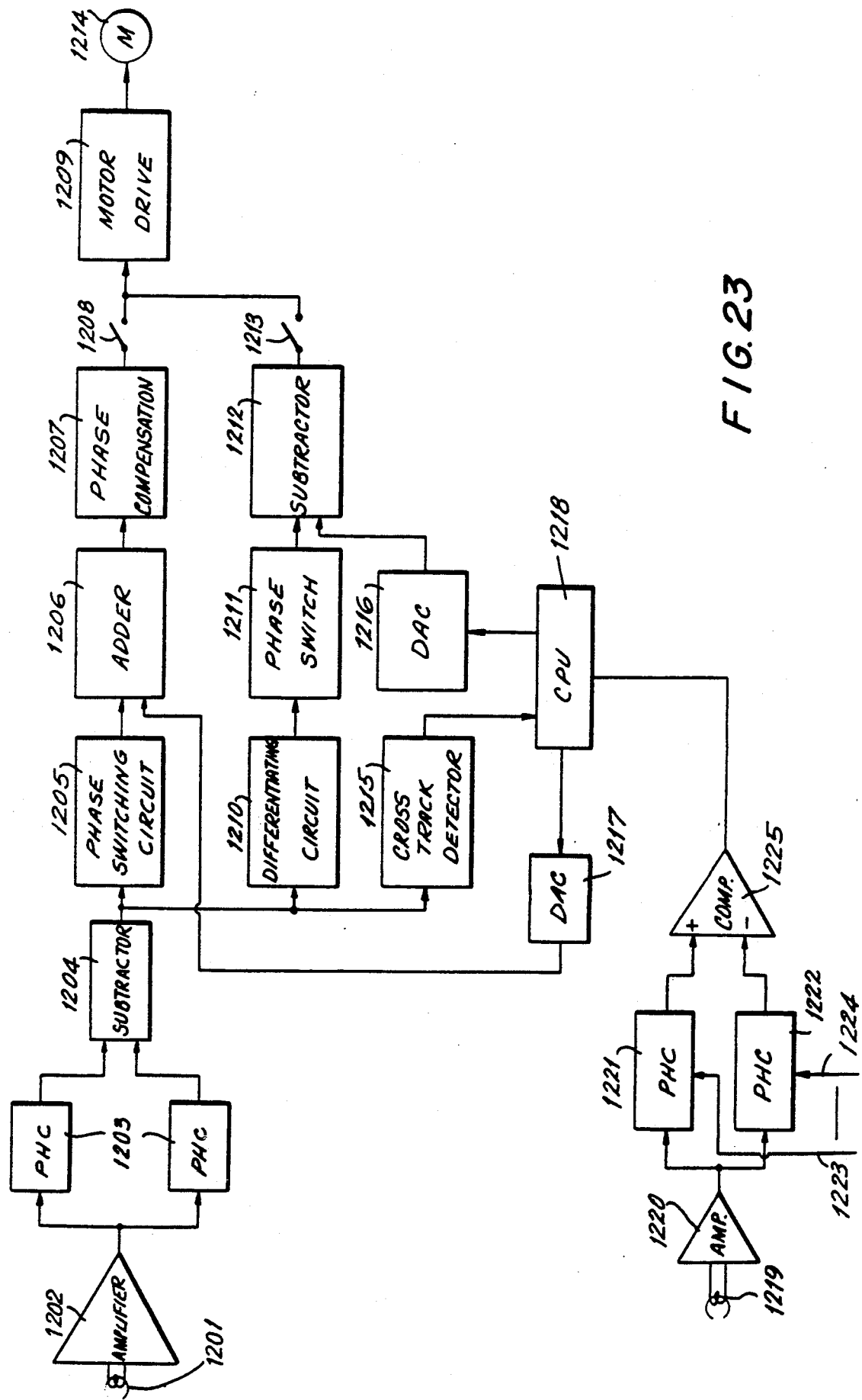
FIG. 23 is schematic diagram of a speed control circuit of an alternative embodiment of the present invention.

Whether there is any displacement or not is also detected by the circuit shown in FIG. 23. Namely, the output signal of the data head 1219 is amplified by the amplifier circuit 1220 and is transferred to the peak hold circuits 1221 and 1222. Sampling timing signals 1223 and 1224 for controlling the peak hold circuits 1221 and 1222 include the pulses 1102 and 1103, respectively as shown in FIG. 22. The peak hold circuit 1221 holds the signal of the portion 1105 and the peak hold circuit 1222 holds the signal of the area 1106, respectively.

In the embodiment, the sampling timing signals are obtained by recording the data on the servo surface for indicating the portion where the second positioning data is recorded. However, it is also possible to record the predetermined pattern prior to the second positioning data and generate the sampling timing signal by detecting that pattern. The outputs of the peak hold circuits 1221 and 1222 are compared by the comparator 1225 to determine which output is larger. When the data head 1219 is displaced toward the outer side relative to the track where the second position information is recorded, the output level of the comparator 1225 becomes low. When the data head 1219 is displaced toward the inner side relative to the track where the second position information is recorded, the output of the comparator 1225 becomes high. Based upon the output of the comparator 1225, the CPU 1218 outputs the value to the DA convertor 1217 so that the data head can approach the center of the track where the second position information is recorded. In the embodiment, the second position information is sampled once. Whenever the displacement direction is detected, the CPU 1218 converts the output value to the DA convertor 1217 so that the data head 1219 moves 0.2μm towards the track where the second position information is recorded. When the output of the comparator 1225 is switched, the data head 1219 is positioned on substantially the center of the track.

Herein, since the second positioning data is recorded in a plurality of portions around a track, a plurality of compensations are conducted during one revolution of the disk and the time required for correcting the position of the data head 1219 can be reduced. Further, there is always error in detecting the center of the track for electric or mechanical reasons, but this error can be eliminated by detecting the second position information for one cycle and defining the output value of the DA convertor 1217 so that the count of the low levels of the comparator 1225 is substantially equal to the count of the high levels of the comparator 1225 as a compensation value for compensating the positioning error. The time for this averaging process is reduced by recording a plurality of the second position information around one track. In addition, the function of the two peak hold circuits 1221, 1222 and the comparator 1225 in FIG. 23 can be substituted by one peak hold circuit and an AD convertor 1225. The peak hold circuit can be substituted by the combination of one rectifying circuit and one integrating circuit. In such a way, the present invention is not restricted to the circuit construction shown in FIG. 23.

As aforementioned, the compensation value detection is conducted at the power on sequence of the magnetic recording device, and in addition, at an appropriate time. The above mentioned compensation value is calculated with respect to each track where the second position information is recorded to store it in RAM of the CPU. In the embodiment, there are two tracks where the second position information are recorded, for each data surface, one is positioned on the inner side of the data area and the other is positioned on the outer sides of the data area. This is because when the head positioning is executed by using the first head positioning error on the servo surface, the positioning difference between the data head and the data track is different between the data track of the inner side and the data track of the outer side. The CPU calculates the compensation value of the data track of the data area in accordance with a linear approximation utilizing the inner side compensation value calculated by utilizing the second position information recorded on the inner side track and the outer side compensation value calculated utilizing in the second position information recorded on the outer side track. At the time of controlling the positioning, the calculated compensation value of the data track of the data area is output from the DA convertor 1217. By adding this compensation value to the positioning signal supplied from the servo surface, the data head is positioned correctly to the data track.

As apparent from the above construction, it is possible to offset the head based on the track of the servo surface. Therefore, such a second position information as shown in FIG. 22, can be recorded by the magnetic recording device itself, being controlled by the CPU provided in the magnetic recording device. As aforementioned, in the embodiment according to the present invention, the data indicating the position of the second position information is in the servo surface, therefore, the timing for recording the second position information is obtained from the servo surface.

Additionally, according to the present invention, the compensation values of all of the data heads are calculated from the second position information on the data surface and are stored. These compensation values are superimposed on the positioning signals obtained from the first position information of the servo surface, thereby making it possible to position any data head at the destination track accurately for a short time.

Since the second position information is recorded at a plurality of portions around one cycle, the above mentioned compensation value is determined promptly. Further in accordance with averaging the plurality of the second position information, it is possible to decrease the position error which may otherwise be caused by electrical or mechanical factors.

Similarly, since the track on which the second position information is recorded is separated from the data track, the data is not separated by the second position information and further, it is possible to change the sector size. Furthermore, the magnetic recording device itself can record the second position information, based on the positioning data obtained from the first position information. The second position information is not recorded on all of the data tracks. Namely, the number of the tracks on which the second position information is recorded may be approximately three tracks per one data surface for practical use. Therefore, the data surface is used efficiently and further, the second position information is recorded for a very short time, thereby making it possible to increase the production of the magnetic recording device.

Figure 37:
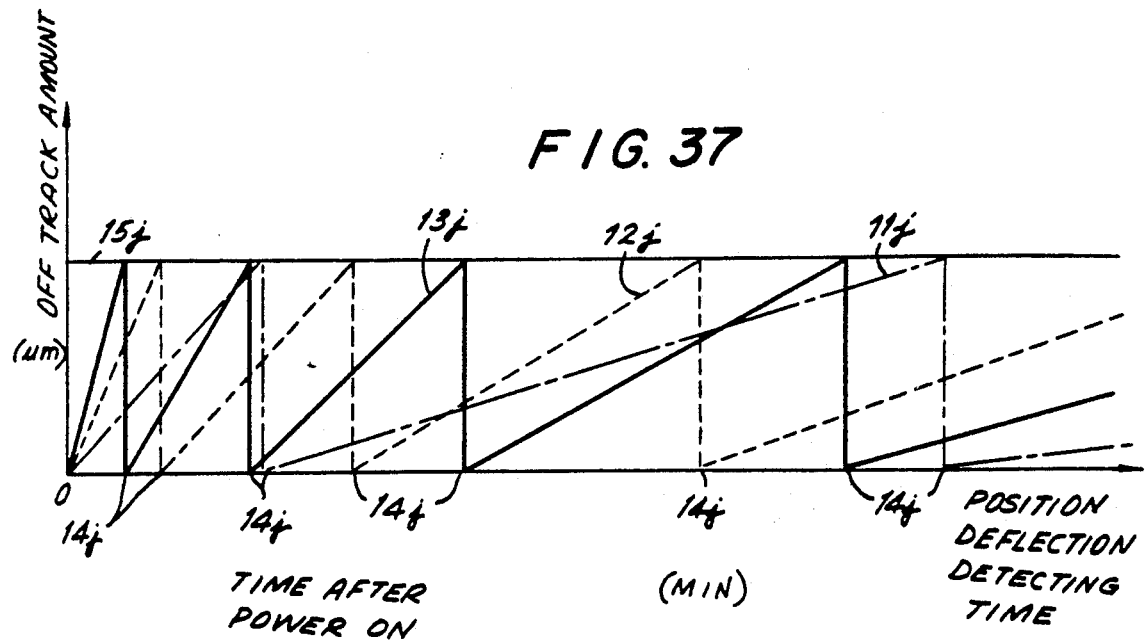
FIG. 37 graphically shows the relationship between deviation from the track amount and position deflection detecting time of each data head according to the present invention.

By changing the frequency of the above mentioned deflection detection for every data head, it is possible to accomplish the data seeking more promptly. The construction is described below. When the position deflection of the data head is detected to position the data head, the deviation from the track amount of each data head is shown in FIG. 37, wherein the axis of abscissa indicates the time after power-on and the axis of ordinates indicates the deviation from the track amount. The reference numeral 11j indicates the deviation from the track amount of the data head on the first data surface, the reference numeral 12j indicates the deviation from the track amount of the data head on the second data surface, the reference numeral 13j indicates the deviation from the track amount of the data head of the third data surface, the reference numeral 14j indicates the time of detecting the position deflection, and the reference numeral 15j indicates a permittable deviation from the track amount.

When the position compensation is accomplished by utilizing the second position information, if the compensation amount is measured every access time, the access time is made too long. Therefore, the compensation amount is measured at a predetermined interval and the previous compensation amount is stored until the compensation amount is remeasured. If the compensation time is changed for each data head so that the compensation amount is measured as frequently as is necessary in view of the deviation from the track amount of that data head relative to the servo head, the time for measuring the compensation amount is reduced, thereby the access time is reduced. (In this case, the compensation amount is measured during access time.)

Figure 38:
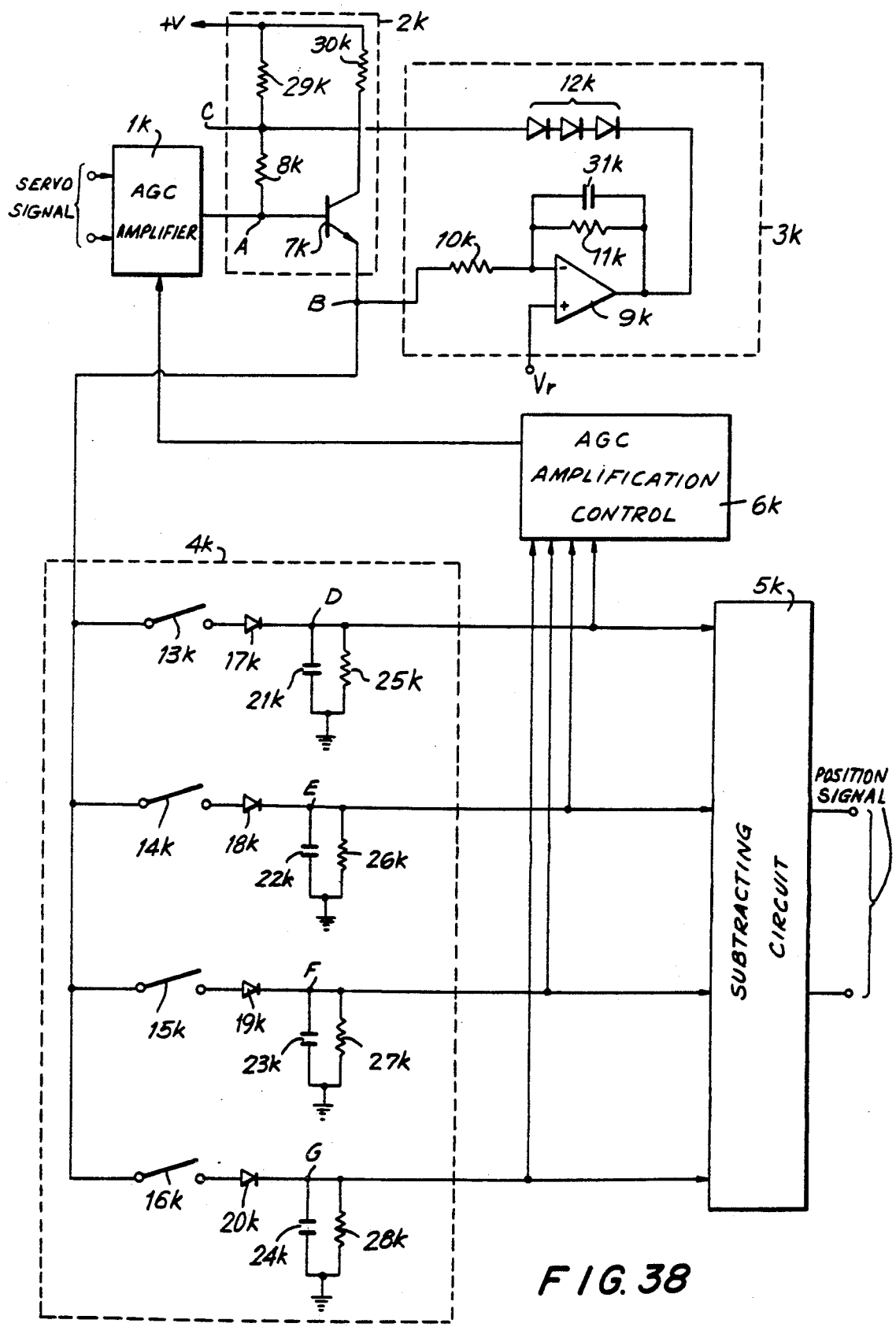
FIG. 38 is a block diagram of the demodulator of the servo signal constructed in accordance with the invention.

A servo signal demodulator circuit of the magnetic disk device in accordance with the invention is shown in FIG. 38 and, comprises AGC amplifier 1k for receiving a servo signal and amplifying it at a predetermined amplification level. A buffer amplifier 2k receives the output signal of the AGC amplifier 1k. A peak hold circuit group 4k including analog switches 13k, 14k, 15k and 16k, diodes 17k, 18k, 19k and 20k, condensers 21k, 22k, 23k and 24k and resistors 25k, 26k, 27k and 28k detects each predetermined peak value in the output signal of buffer amplifier 2k. A subtracting circuit 5k calculates the electric potential difference between respective outputs of the peak hold circuit group 4k. An AGC amplification control circuit 6k receives each output of the peak hold circuit group 4k and controls the amplification of AGC amplifier 1k.

The AGC amplifier 1k amplifies the servo signal to a predetermined amplification level as determined by AGC amplification control 6k and outputs signals to a buffer amplifier 2k. The buffer amplifier includes transistor 7k, the output of AGC amplifier 1k being applied to the base thereof. A voltage V is applied through series connected resistors 29k and 8k to the base at point A, and through resistor 30k to the collector of transistor 7k. The buffer amplifier 2k outputs signals from the emitter of transistor 7k to a demodulator 3k at point B and to the peak hold circuit group 4k at point B.

The feed back circuit of demodulator 3k comprises a reversal amplifier utilizing an operation amplifier 9k and a group of serially connected diodes 12k. One input of amplifier 9k is Vr, the other being the voltage at point B transmitted through resistor 10k. The parallel connection of resistor 11k and capacitor 31k extends between the negative input and the output of amplifier 9k. Diodes 12k are positioned between the output of amplifier 9k and point C between resistors 8k and 29k. When the value of the resistor 10k is equal to that of the resistor 11k, the electric potential Vc of point C is expressed by the following equation (2):

$$V_c = -V_A + 2V_r + 4V_f \quad (2)$$

wherein $V_A$ represents the electric potential of point A, Vc represents the electric potential of point C, Vf represents a voltage between the base and emitter of the transistor 7k and a forward drop voltage of each diode of the diode group 12k, and Vr represents an electric potential applied to the non-inverting input terminal of the operation amplifier 9k.

Since the base current of the transistor 7k and the voltage drop due to the resistor 8k are smaller than the value of Vr, $V_A$ is the same as that of Vc. Therefore, the equation (2) is expressed in the following equation (3):

$$V_A = V_r + 2V_f \quad (3)$$

The peak hold circuit group 4k, comprises four parallel circuits which each include one of the analog switches, diodes, capacitors and resistors. By way of example, each circuit includes a switch 13k in series with diode 17k. A parallel connection of capacitor 21k and resistor 25k being connected between ground and point D at the cathode of diode 17k, detects the predetermined peak value of the output signal of the buffer amplifier 2k, and outputs a signal to a subtracting circuit 5k and the AGC amplification control circuit 6k. The subtracting circuit 5k calculates the voltage difference between each input signal and outputs signals in accordance with the voltage difference as the position signal. The AGC amplification control circuit 6k controls the AGC amplifier 1k so that the value obtained by adding up all of the input voltages is uniform.

Each electric potential of the points D, E, F and G in the outputs of the four circuits of peak hold circuit group 4k is expressed by the following equation:

$$V_o = V_A - 2Vf \quad (4)$$

wherein Vo represents each electric potential of the points D, E, F and G. If the equation (4) is combined with the equation (3), the following equation (5) is obtained:

$$V_o = V_r \quad (5)$$

Thereby, the electric potential at each of points D, E, F and G does not depend on the voltage between the base and emitter of the transistor 7k and on the forward voltage of the diodes 17k, 18k, 19k and 20k.

Therefore, regardless of temperature increases, the amplification of the AGC amplifier 1k is not reduced and the amplification of the servo signal is not made smaller, thereby making it possible to obtain the stabilized position accuracy.

In addition, reference is made to a construction for recording a specific piece of information on the servo surface, whereby the second position information signal on the data surface is written on the servo surface. The construction is explained with reference to one embodiment. FIG. 35a shows a magnetized pattern recorded on the servo surface, which is well known in the art and commonly referred to as a modified dybit. One dotted line indicates the center line of the track. The solid line indicates the magnetic flux reversal. The magnetic flux reversal pattern has a periodicity consisting of four tracks. Namely, when a number is designated on each track in turn, there are four types of magnetic flux patterns n, n+1, n+2, and n+3, where n is an integer number.

Figure 35:
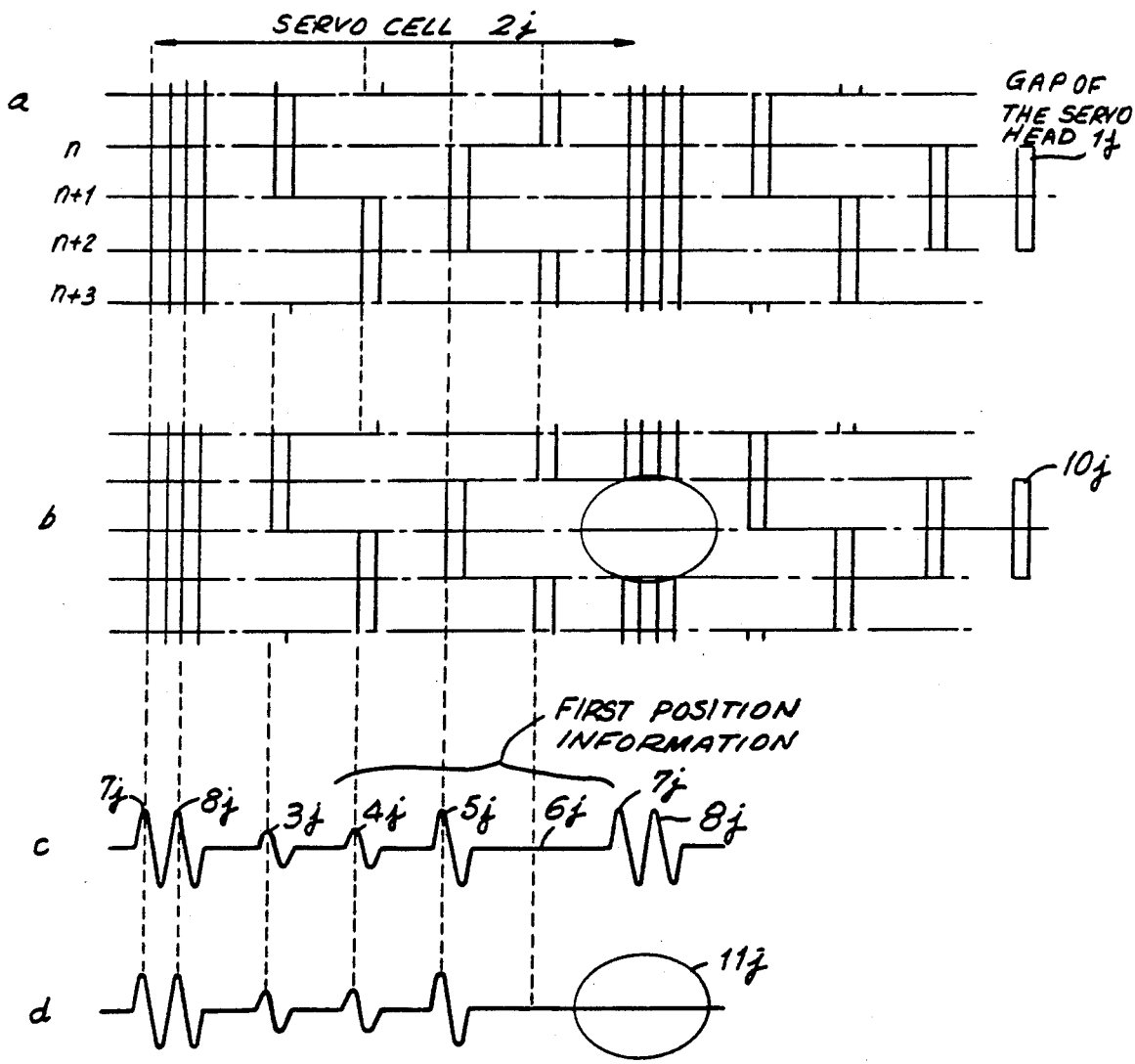
FIG. 35, consisting of a-d, is a magnetized pattern and the reproducing waveform in accordance with one embodiment according to the present invention.

When the gap 1j of the servo head is disposed at the portion shown in FIG. 35a and the track exists below the gap 1j, the reproducing waveform of the magnetic head is shown in FIG. 35c. The magnetic flux pattern has a periodicity relative to the moving direction of the track and the basic cycle consists of signals of a servo cell 2j. Therefore, the reproducing waveform of FIG. 35 (c) is repeated periodically. There are four types of magnetic flux reversals which are shown by the dotted line in the servo cell and are first position information in the present embodiment. The peaks 3j, 4j, 5j and 6j of the reproduced waveform which may be generated from the four magnetic flux reversals have different heights from each other as determined by the position of the gap of the servo head on the tracks. For example, when the gap of the servo head is positioned in the position 1j, the peak of 6j does not occur. It is necessary to control the position of the servo head so that the height of the peak 3j becomes equal to the height of the peak 4j, in order to position the servo head on the (n+1)th track. Since the magnetic flux reversal which may generate the peaks 7j and 8j, is generally recorded on all of the tracks continuously, the peaks 7j and 8j exist in the reproducing waveform of any track. However, since the magnetic flux reversal is not in the position 9j, the peaks 7j and 8j are omitted. Namely, FIG. 35(d) shows the reproducing waveform when the servo head is disposed at the position 10j in FIG. 35(b) and the peak is not at the position 11j. The magnetic flux reversal which may cause the peaks 7j and 8j is called the "synchronous pattern". It is possible to detect whether the servo head is positioned on the track by omitting the synchronous pattern at a predetermined interval on the specific track.

Figure 36A:
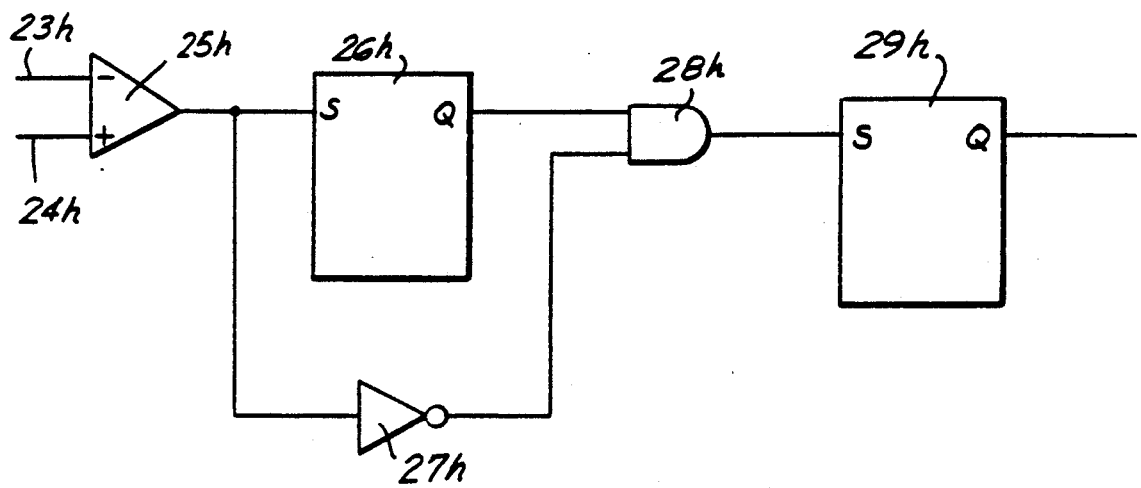
FIG. 36a is a detecting circuit for detecting the magnetized pattern of FIG. 35.
Figure 36B:
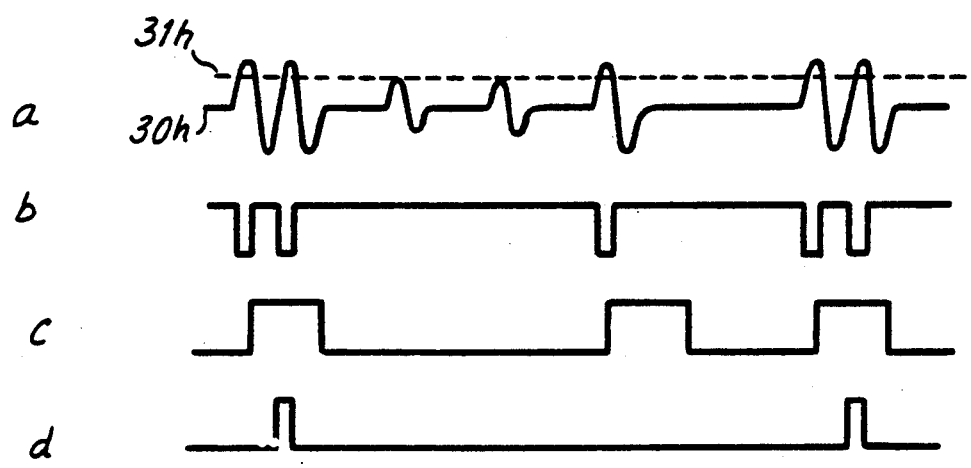
FIG. 36b is a reproducing waveform of the magnetized pattern of FIG. 35.

When the servo head is positioned on the servo track to be specified by the specified data wherein the synchronous pattern is omitted, the magnetic flux pattern of FIG. 21(b) is recorded on the data track of the data surface on which the data head is positioned. Further, the servo circuit includes a circuit for detecting the omission of the sync pulses as shown in FIG. 36(a), thereby making it possible to detect the above mentioned specified information. In FIG. 36(a), the output waveform of the servo head is applied to the signal line 23h. This output waveform is shown in waveform (a) of FIG. 36(b). A voltage having the level 31h as shown in waveform (a) of FIG. 36(b) is applied to the signal line 24h. The comparator 25h outputs the signal as shown in waveform (b). The reference numeral 26h represents a single stabilizing multivibrator and produces an output signal such as waveform (c) of FIG. 36b upon input of the signal of waveform (b). The time during which an output pulse from stabilizing multivibrator 26h is at a high level is longer than the distance between the two pulses of the synchronous pattern and is shorter than the distance between four peaks of the first position information. Therefore, the successive pulses of the synchronous patterns are picked up as the output of the AND circuit 28h as shown in the waveform (d) of FIG. 36b. The inputs to AND circuit 28h consist of the outputs of multivibrator 26h and of inverter 27h in parallel therewith. The output signal of AND circuit 28h is input to the single stabilizing multivibrator 29h. The single stabilizing multivibrator 29h is retriggerable and the time when the output becomes high is set up to become longer than the time of one servo cell 2j (FIG. 35). Therefore, the output of the single stabilizing multivibrator 29h is at a low level only when the synchronous pulses are omitted.

In the magnetic recording device according to this embodiment, the method of positioning the data head is explained below. The head is moved to the track containing the above mentioned specified information by the same process as that of the prior art magnetic recording device utilizing the first position information which is recorded on the servo surface. Next, after reorganizing the specified information by the circuit of FIG. 36a, the second position information is reproduced by each data head. The amplitude of the head output pulses 909 and 910 of the position information (FIG. 21) are changed to digital values by the peak hold circuit and the DA convertor, and further are transmitted to the CPU. The CPU detects the deflection direction of the data head in accordance with the variations in both pulses and detects the deflection position of the data head in accordance with the amplitude ratio of the pulses and stores them in the RAM. In order to position the data head to the data track, the deflection amount stored in the RAM is superimposed to the position signal which is detected from the first position information on the servo surface to compensate the deflection of the data head.

The detection of the deflection amount mentioned above is conducted at a predetermined time interval and the new data is recorded in the RAM. Therefore, the above mentioned deflection which may be caused by the variations in temperature, any displacement of the mechanism and so on, is omitted together by the newly recorded compensation value in the RAM.

In general, since the second position information is disposed on the data surface, there is no fear of carelessly erasing the second position information by the recording function of the data head. However, the magnetic recording device according to the present invention has means for stopping the recording of any information by the data head upon detecting the above mentioned specific information. Therefore, there is no fear of erasing the second position information.

Another embodiment of the invention according to the present embodiment utilizes a servo surface on which the first positioning information is recorded. The data and the second positioning data are recorded on data surfaces. A servo head is operatively disposed with each servo surface. A data head is operatively disposed with each data surface. A controlling member moves and positions the servo head at the destination servo track upon the receipt of the positioning signals detected from the first positioning information. A circuit is provided for detecting the deflection between the data head and the data track by the second positioning information. A memory stores the detected deflection in each data head and an adder adds the signal for compensating the deflection to the position signal. The signals for compensating the deflection which are stored in the memory member are added to the positioning signals, respectively prior to positioning the servo head at the destination servo track by the controlling member when the data head is moved to the destination data track.

Figure 25:
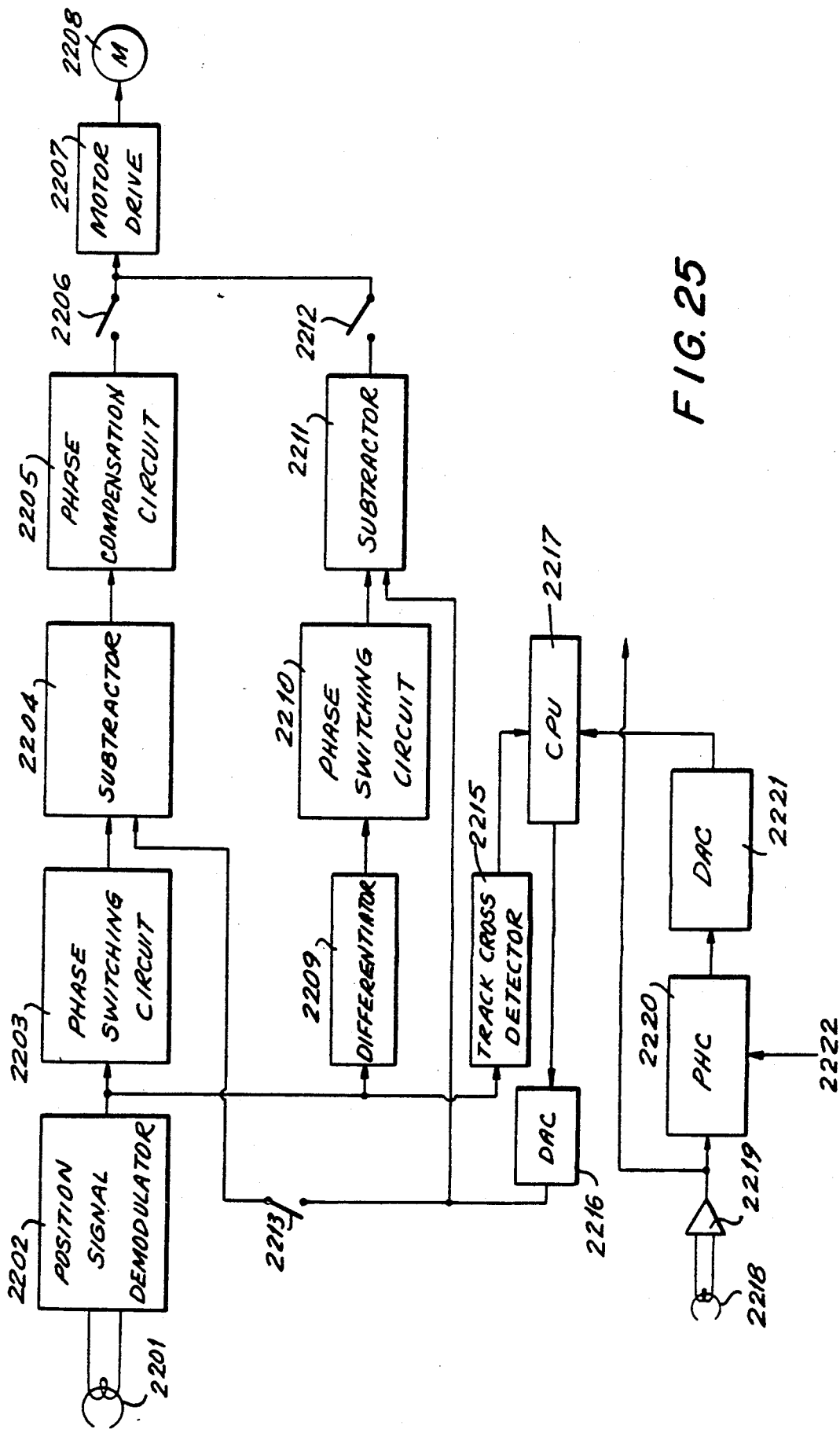
FIG. 25 is a circuit for controlling the positioning of the heads of the recording device of FIG. 11.

In this embodiment, as shown in FIG. 25, the mechanical portion is the same as that in FIG. 11. The positioning signal is generated from the first position information output by a servo head 2201 and read out by a position signal demodulator 2202. The position information recorded on the servo surface and the positioning signal demodulator are well known in the art and are not essential features in the present invention, thus are not described in detail. For example, they are described in U.S. Pat. No. 3,534,344.

When the servo head 2201 is moved for positioning to a specified track on the servo surface, it is necessary to provide speed control (circuit operation for controlling the speed) for moving the servo head from the present track to the destination track and a position control (circuit operation for controlling the position) for positioning the head on the track after reaching the destination track.

For speed control operation, a switch 2212 turns ON and switches 2206 and 2213 turn OFF. The number of the track to which the head is to be moved and its direction are transferred to the CPU 2217 and the CPU 2217 outputs the signal (the reference speed signal) indicating the target speed of the head through the DA convertor 2216. The position signal is processed into the signal for indicating the speed of the servo head (the speed signal) through the differentiator 2209 and the phase switching circuit 2210. The difference between the reference speed signal and the speed signal is calculated by the subtracting circuit 2211. Since the difference signal is provided to the motor 2208 through the motor driving circuit 2207, the speed of the servo head follows the reference speed generated from the CPU 2217. The track cross detecting circuit 2215 is constructed so as to output a pulse when the servo head 2201 crosses each track. The CPU 2217 calculates the number of the remaining tracks to the destination upon the receipt of each pulse.

When the servo head 2201 is at the position where the servo head 2201 may reach the destination by proceeding a further half track, the control mode is switched from speed control to positioning control. More particularly, the switch 2212 turns OFF and the switches 2206 and 2213 turn ON. The positioning signal is input to the phase compensation circuit 2205 through the phase switching circuit 2203 and the subtracting circuit 2204 in order to stabilize the positioning control loop. Since this output is input to the motor driving circuit 2207 for driving the motor 2208, the servo head 2201 follows the destination track. Since the switch 2213 is ON, the output of the subtracting circuit 2207 is changeable by outputting digital data from CPU 2217 to the DA convertor 2216, thereby making it possible to offset the servo head 2201 from the destination servo track. In accordance with this offset function, it is possible to accurately position the data head at the destination data track.

Figure 26:
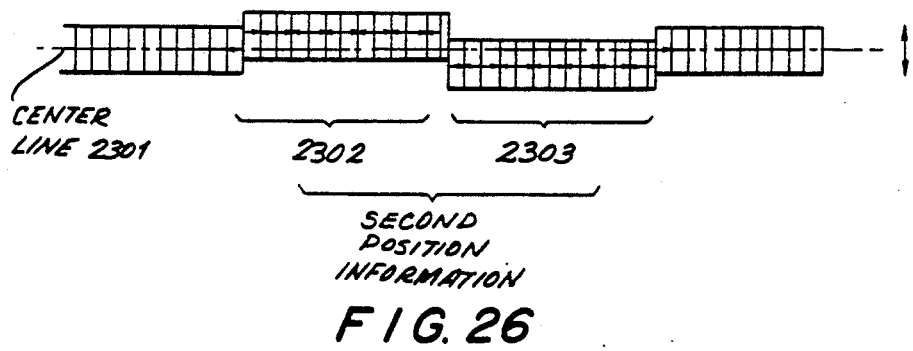
FIG. 26 is a magnetic pattern of the second positioning data according to the first embodiment of the present invention.

In this embodiment, the above mentioned offset quantity is described below. The second position information data are recorded on the specified tracks which are provided on the inner and the outer sides of the data area on each data surface as described above. The second position information comprises the magnetic pattern as shown in FIG. 26. More particularly, it comprises the burst magnetic patterns 2302 and 2303 recorded so as to be displaced toward the inner and the outer sides by a predetermined distance relative to the center 2301 of the specified track. After positioning the servo head at the servo track corresponding to the specified track and reading the magnetic pattern of FIG. 26 from the data head, the relative deflection between the data head and the data track is identified by comparing the amplitude of the burst 2302 with the amplitude of the burst 2303. As shown in FIG. 25, the second positioning data read out from the data head 2218 is transferred to the peak hold circuit 2220 through the amplifier 2219. The data on the servo surface includes the data indicating the portion where the bursts 2302 and 2303 of the second position information are recorded on the specified track. The amplitude of the bursts 2302 and 2303 are held in accordance with the output of the sampling timing signal 2222 generated by the circuit (not shown) and are converted to digital data by the DA convertor 2221 and transmitted to the CPU 2217. The CPU 2217 calculates the deflection between the data head and the data track by the amplitude of the bursts 2302 and 2303 and stores the calculated value in the memory means (RAM). This operation is completed on all data surfaces. The stored deflection is renewed once per 40 minutes under the control of the CPU 2217. When the data is recorded and reproduced, the offset is added by the above mentioned offset function so as to compensate by the stored deflection. The deflection on a certain data track is linearly approximated from the deflection calculated from the specified track for the second position information on the inner side of the data surface and the deflection calculated from the specified track on the outer side. The second position information according to the present embodiment may have the construction described in Japanese Patent Laid-Open Application No. 51-81603 besides the above construction.

Figure 24:
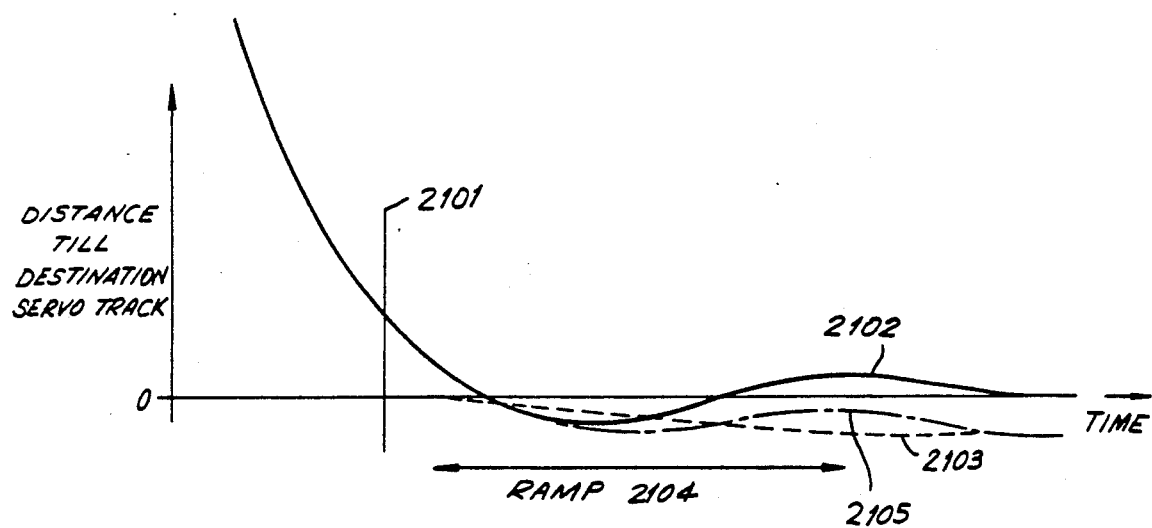
FIG. 24 is a graphical view of a compensating process of the embodiment according to the present invention.

FIG. 24 illustrates the condition for adding the offset in order to compensate the above mentioned stored deflection, when the speed control mode is switched to the positioning control mode. In the graph of FIG. 24, the axis of ordinates indicates the distance between the servo head and the destination servo track and the axis of abscissas indicates the time, in the same way as in FIG. 27. At the point of the line 2101, the control mode is switched from the speed control mode to the positioning control mode. When the above mentioned offset is not added, the servo head is positioned to the destination servo track as shown in the solid line 2102. Even if the servo head is positioned at the destination servo track, when the data head is deflected from the destination data track, the offset compensating the stored deflection is added linearly until it approaches the predetermined value as shown in the dotted line 2103. This stored deflection is the output from the DA convertor 2216.

Figure 27:
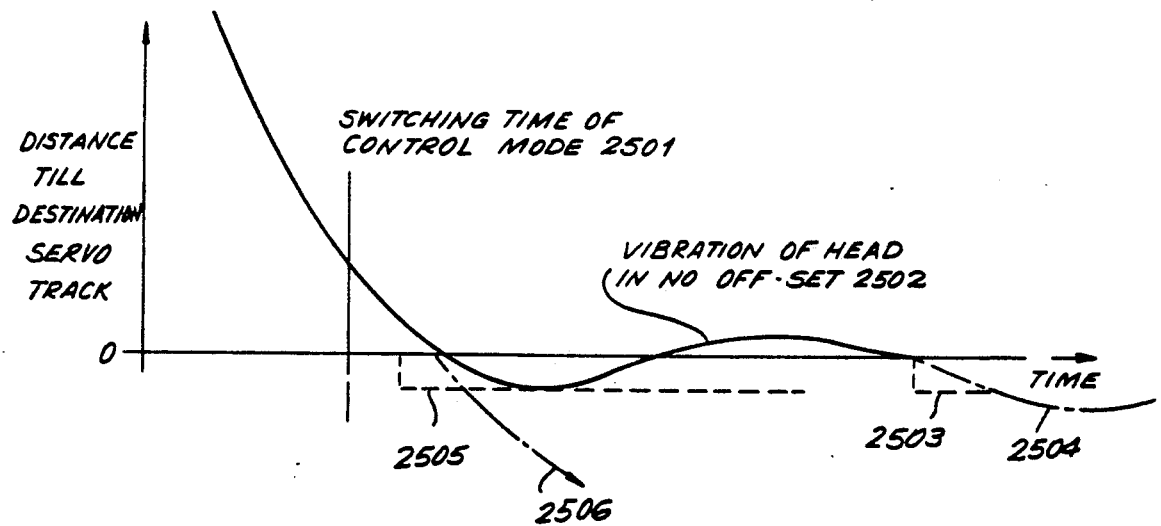
FIG. 27 is a graphical representation of a compensating process of a magnetic recording device according to the prior art.

Similarly, in FIG. 27 at the point of the line 2501, the control mode is switched from the speed control mode to the positioning control mode. When the offset is not added a servo head is positioned to the destination servo track as shown in solid line 2502. Again, if the servo head is positioned at the destination servo track, when the data head is deflected from the destination data track, the offset compensating the stored deflection is added linearly until it approaches the predetermined value as shown in the dotted line 2503 and more particularly, is output from DA back to a regular convertor.

The ramp portion is set up so as to complete the compensation prior to the time of the head alignment, when the offset is not added, thereby the movement of the head is such as shown in the dotted line 2105 and the head is aligned at the offset position without predetermined time expiring. Further, at the maximum point of the overshoot of the head, the offset value is increasing, thus there is very little danger of over shooting until the adjacent track is approached, as compared with adding the offset value in steps.

As aforementioned, according to the present invention, the deflection between the data head and the data track calculated by the second position information on the data surface is stored on all data surfaces, and the offset compensating the above mentioned deflection of the selected data head is added to the head gradually. As a result, it is possible to position the data head at the destination track without moving the data head to the adjacent track by error and exceeding the determined time.

Still another embodiment according to the present invention is described below. The magnetic recording device according to this embodiment, comprises at least one servo head. At least one disk includes a servo surface. At least one voice coil motor is provided for driving the head. A detector detects whether the head passes a certain position A immediately before the desired destination track. The speed control mode is switched to the position control for positioning on the destination track once position A has been passed. A detector detects a certain time interval after the head passes the position A and switches operation to position control after this certain time interval.

Figure 28:
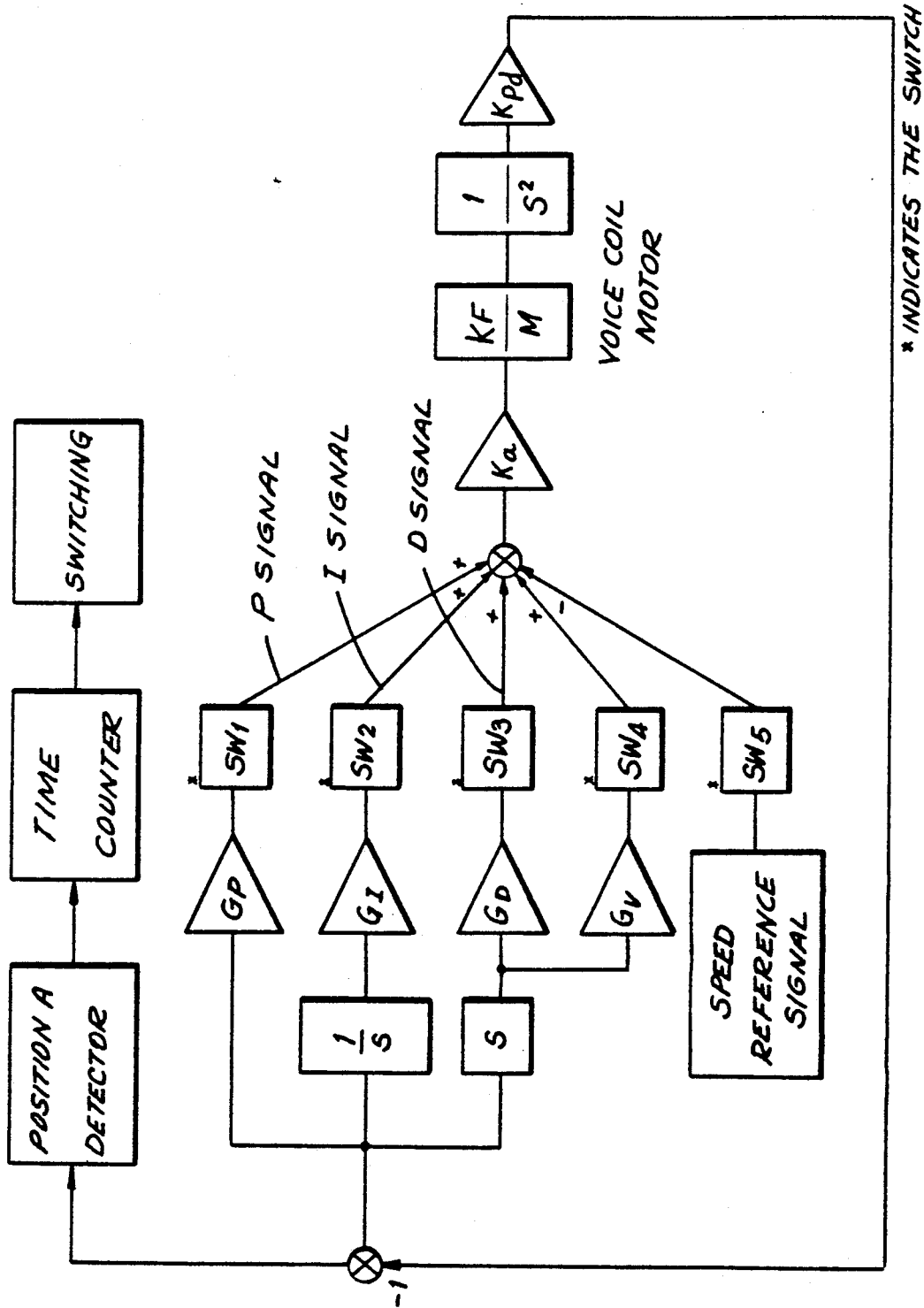
FIG. 28 is a block diagram of the speed switching control of the magnetic recording device constructed in accordance with the invention.

FIG. 28 is a block diagram of the circuit according to this embodiment of the invention. During speed control, switches SW4 and SW5 are ON and switches SW1, SW2, and SW3 are OFF. The gain of the speed signal is Gv and the difference between the speed signal and the speed reference signal is applied as current by the voice coil motor driving circuit (gain Ka), thereby driving the voice coil motor (mechanical constant KF/M). The positioning data recorded on the servo surface is detected (gain Kpd). The speed control receives the speed signal by differentiating the positioning signal and is switched to the position control mode by the steps of detecting the position A from the positioning signals by the position A detector, counting down a predetermined stored time interval after such detection by a time counter in the CPU and changing the state of the switches SW1, SW2, SW3, SW4 and SW5 in accordance with Table 1.

TABLE 1

|  | SW1 | SW2 | SW3 | SW4 | SW5 |
| --- | --- | --- | --- | --- | --- |
| speed follow control | OFF | OFF | OFF | ON | ON |
| position follow control | ON | ON | ON | OFF | OFF |

The position follow control comprises PID control, the proportion (P signal), integral (I signal) and differentiation (D signal) of the positioning signal being indicated as GP, GI, and GD, respectively. The sum of these three signals is supplied to the voice coil motor driving circuit. The speed reference signal is renewed whenever it passes the center of each track and, during the intermediate position between the adjacent tracks, is applied to the servo circuit. From the time when the head reaches the position which is at the interval of ½ track from the center of the destination track, the speed reference signal is decreased to zero continuously by using the original counter function of the CPU. This process takes about 200μsec. (See FIG. 29). The control mode is switched at the time that the speed reference signal becomes zero, therefore, after the head passes the position (position A) which is at intervals of ½ track from the center of the destination track, the control mode is switched after approximately 200μsec which is calculated by the original counter function of the CPU.

Figure 29:
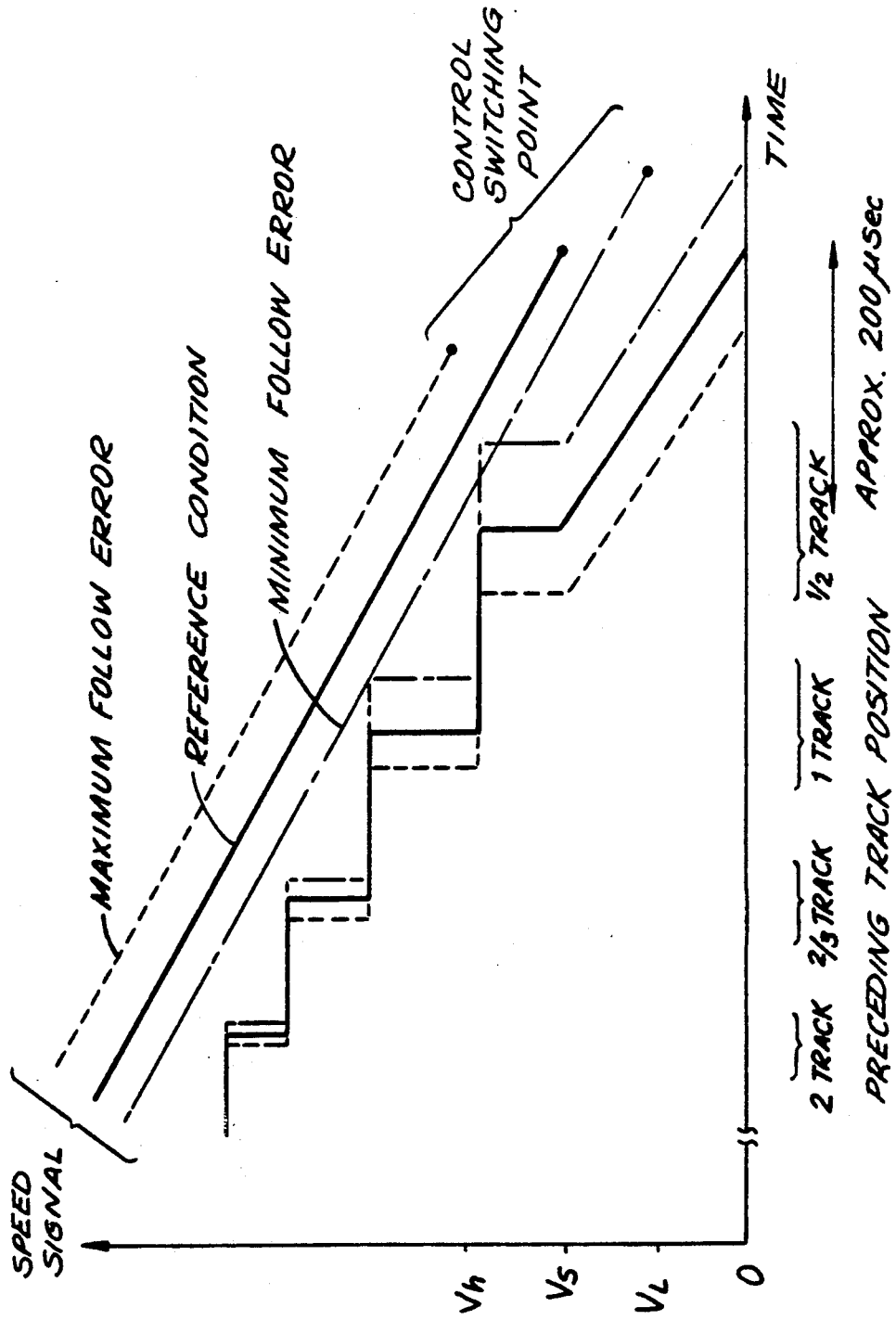
FIG. 29 is a diagram of the speed signal and the speed reference signal of the speed follow control in accordance with the invention.

FIG. 29 shows the functions of the head speed signal and the speed reference signal over time, indicating the function as the head moves to the destination track from the preceding two tracks relative to the destination track. The speed reference signal is not generally supplied to the servo circuits by steps as shown in FIG. 29, but is supplied smoothly by a low pass filter and a compensation signal is processed from the positioning signal. The speed signals do not always decrease linearly. The solid lines of FIG. 29 indicate the speed signal and the speed reference signal under the standard condition (the design condition). At the time of switching the control, the position and the speed is $-XS$, $VS$, respectively. The broken lines indicate the case of the maximum follow error. Since the speed is high, the head crosses between the tracks for a short time and the speed reference signal is renewed for a short time. At the time of switching the control, the position and the speed are $Xh$ and $Vh$, and as a matter of course, the relationship therebetween is as follows:

$$|Xh| < |XS|, VS < Vh$$

The lower dotted line indicates the case of the minimum follow error. At the time of switching the control, the position and the speed are $-SL$, $VL$.

Figure 30:
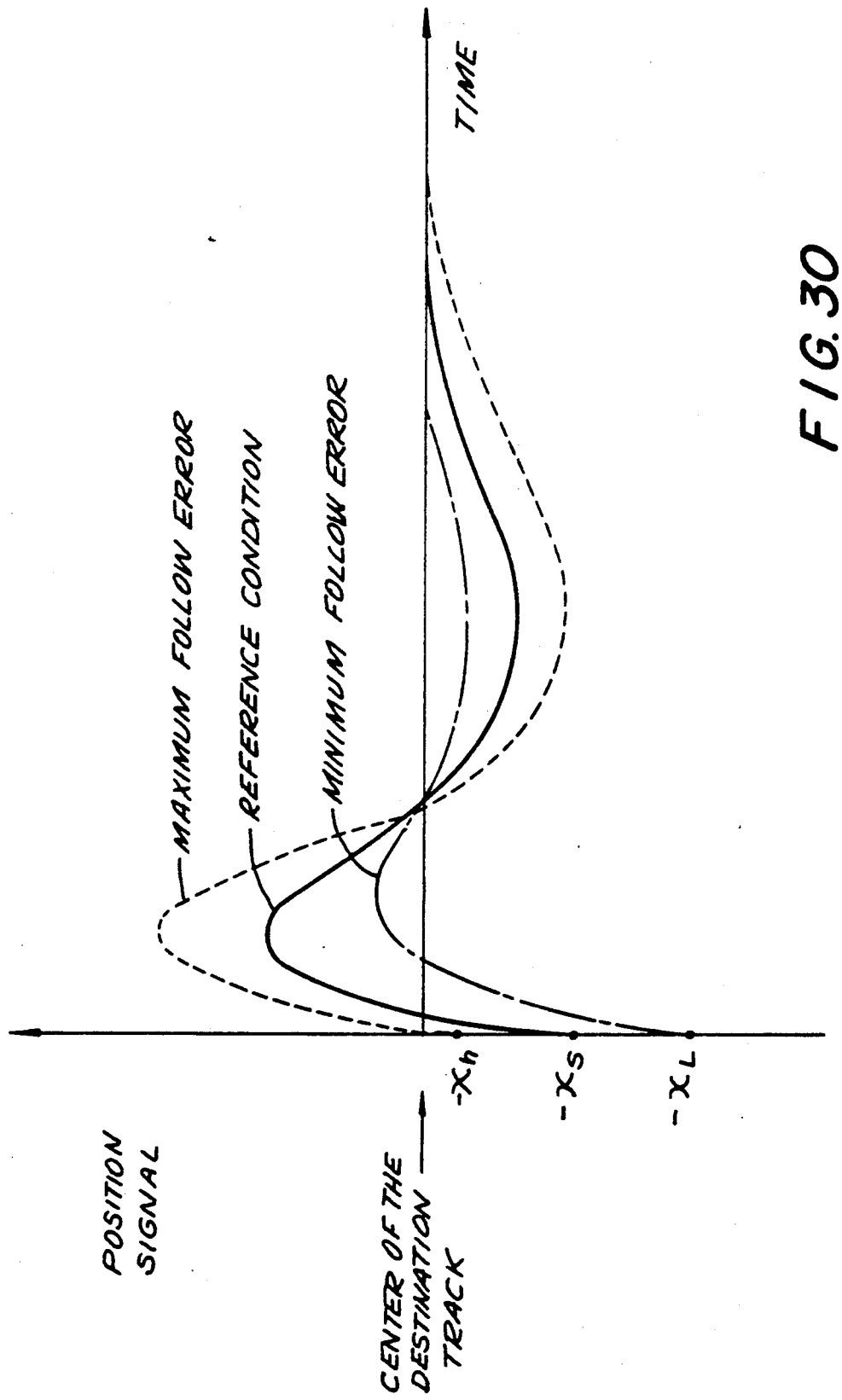
FIG. 30 graphically shows the transient response after switching the control according to the embodiment of the magnetic recording device of, the present invention.

FIG. 30 shows the transient response when the control is switched under the above mentioned three conditions, that is, $(-XS, VS)$, $(-Xh, Vh)$ and $(-XL, VL)$. The axis of abscissa indicates the time, which begins from the time of switching the control, the axis of ordinates indicating the level of the position signal wherein zero is the center of the destination track and indicates the condition of settling with overshoot.

Figure 31:
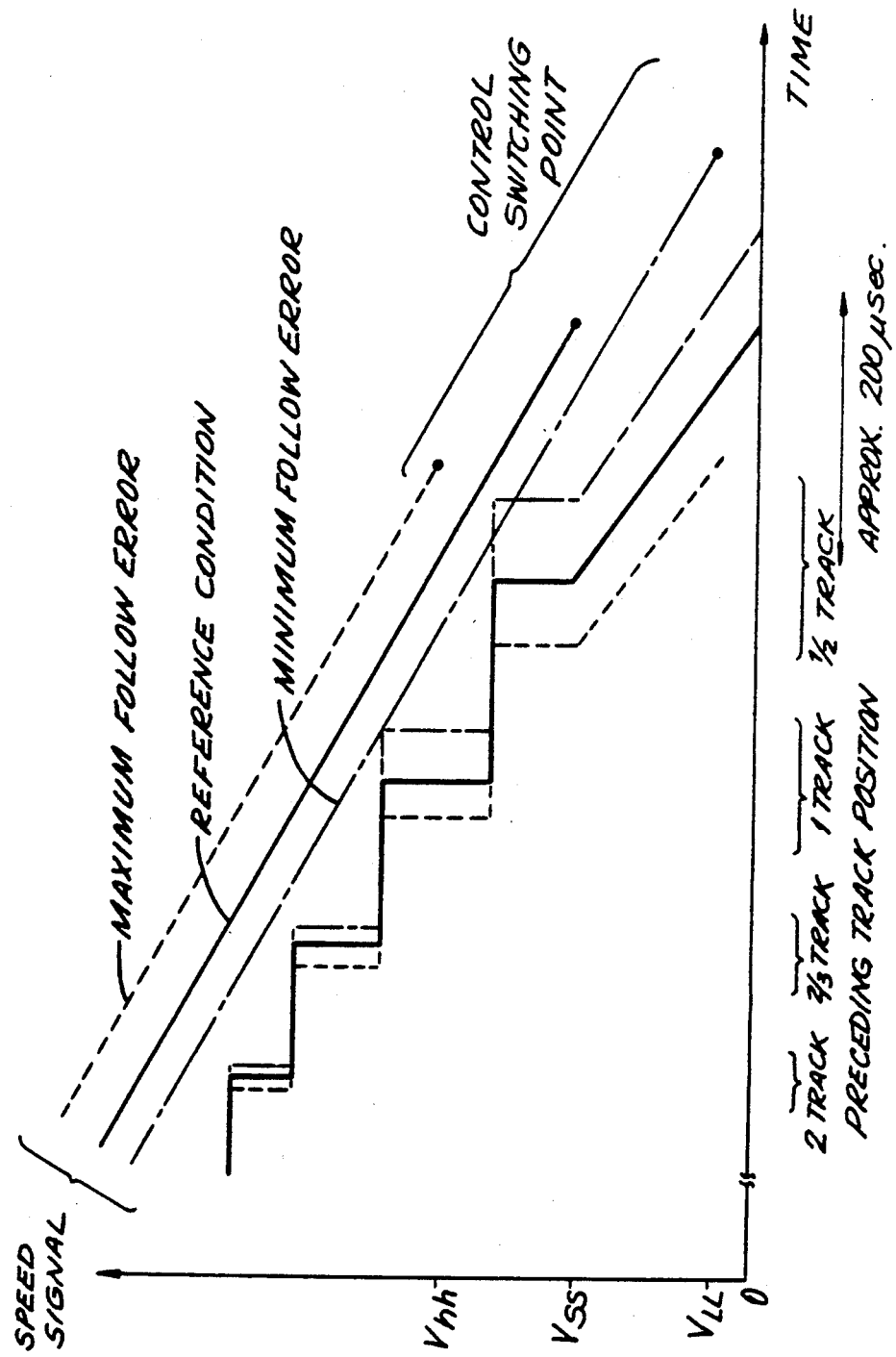
FIG. 31 graphically shows the speed signal and the speed reference signal of the prior art speed follow control system.
Figure 32:
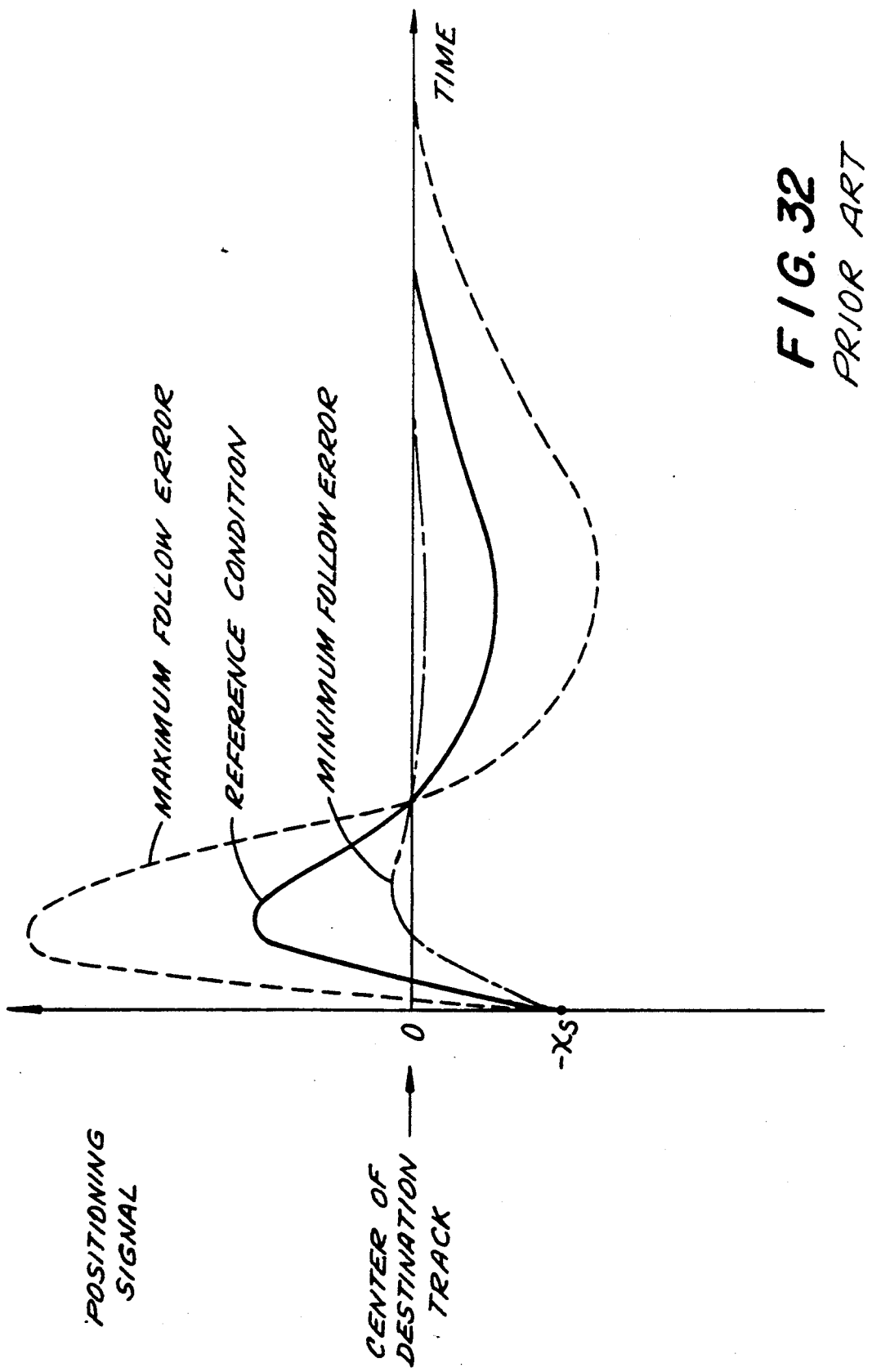
FIG. 32 graphically shows the transient response after switching the control in the prior art.

FIG. 31 shows the time functions of the prior embodiment where the control mode is switched upon passing a slightly earlier position (−XS) from the center of the destination track. In this case under the standard condition the control mode is switched at (−XS, VS) and under the minimum condition, the control is switched at (−XS, VLL). As seen from the comparison between FIG. 29 and FIG. 31, when the follow error is the maximum value, it takes less than 200 μsec for moving the head from the ½ preceding track to the position −XS. Therefore, at the time of switching the control mode, the speed Vhh is larger than Vh of the present embodiment. More particularly, the transient response is improved by the condition that Vh<Vhh, Xh<XS, as is apparent from the comparison between FIGS. 30 (broken line) and 32 (broken line).

When the follow error is a minimum value, the transient response is a little worse than that of the prior art devices. However, the transient response is better than that of the prior art devices under the standard condition. Therefore, there is no problem. Further, in the prior embodiment, when VLL is too small, it takes a long time to reach the control switching position (−XS) and the device is subject to being influenced by outside problems. In the present embodiment, the control is switched in a predetermined time (approximately 200 μsec) after passing the ½ preceding track, therefore, even if VL is small, no problem is caused.

As aforementioned, the present invention has the advantage that when the speed control is switched to the position control, the overshoot of the transient response after switching the control is not made much larger by switching the control after the head passes the position A, which is before the position of the desired destination track, even if the follow error of the speed control is large. Further, the present invention has the advantage that even if the follow error is small and the seek speed of the head is small, the time of seeking is not very long.

Figure 39:
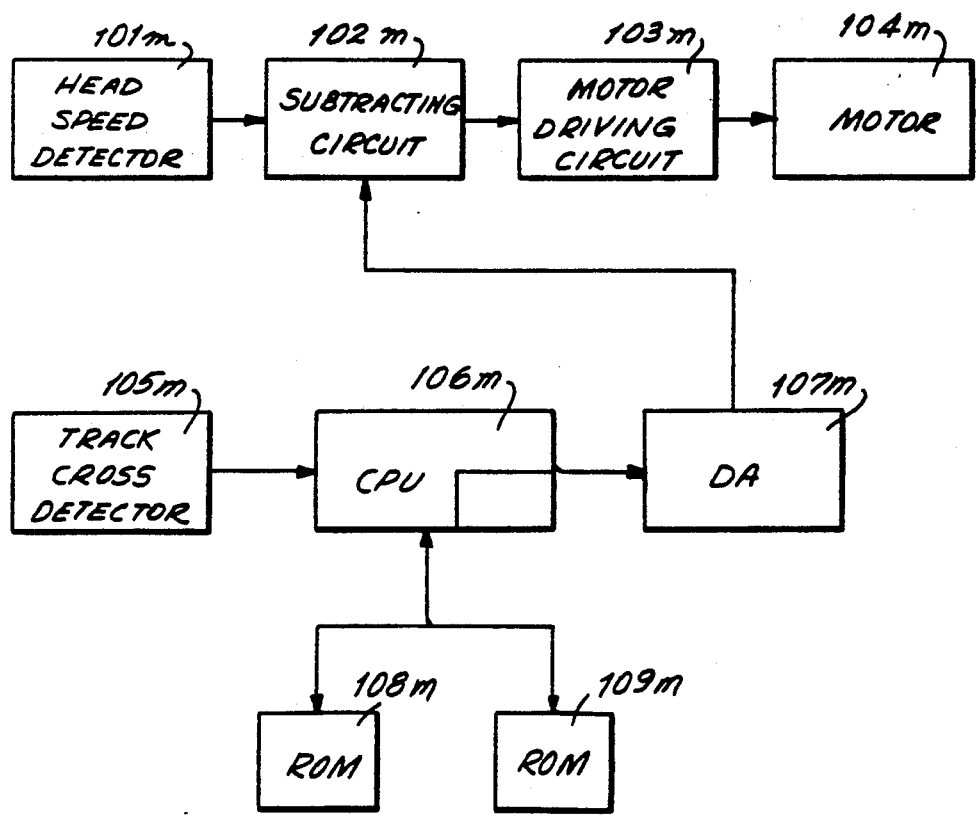
FIG. 39 is a circuit diagram of the head speed control according to the present invention.

Reference is now made to FIG. 39 depicting a block diagram of a construction for making the actual speed of the head close to the destination speed. The head speed detector 101m, the subtracting circuit 102m, the motor driving circuit 103m and the motor 104m are the same as those of the prior art devices. The track cross detector 105m is also the same as that of the prior art devices. The output pulse of track cross detector is input to CPU 106m. The CPU has the data of the destination speed stored in the ROM 108m. The data of the destination speed is stored in the ROM 108m. The speed control is accomplished by outputting the data to the DA convertor 107m in accordance with the output pulse of the track cross detector 105.

In the magnetic recording device according to the present embodiment, the starting process of the device is as follows. The data of the destination speed is output so as to make the speed uniform during the traversing of 500 tracks, so as not to accelerate and decelerate the speed. In the embodiment of the instant device, 1024 tracks are provided per one disk surface. The time required for moving the head during the traverse of 500 tracks is calculated. The above process is conducted by the CPU, utilizing the built-in time counter and the received track cross signals. The actual speed $V_{AC}$ of the head is expressed by the following equation:

$$VAC = \frac{500 \times Tw}{t}$$

wherein Tw represents a track pitch and t represents the measured time.

In this case, when $V_{REF}$ represents the uniform destination speed in accordance with the voltage outputted from the DA convertor, the ratio between the actual speed $V_{AC}$ and the destination speed $V_{REF}$ is expressed by the following equation:

$$VAC = \frac{500 \times Tw}{t \times V_{REF}}$$

The actual speed is determined by multiplying the above ratio by the destination speed indicative of the output of the DA convertor. The value obtained by multiplying the inverse of the actual speed by the data of the destination speed stored in ROM 108m is stored in RAM 109m.

After that, when the head is moved, the compensated destination speed data in RAM 109m is utilized. In this case, the gain error of the head speed detecting means is offset at the side of the destination speed generator. In addition, the track cross detecting means of the present invention is not limited to detecting whether the head crosses the center of the track or not. For example, the track cross detecting means may detect whether the head crosses the border line of the adjacent tracks or may detect both conditions.

Still another embodiment according to the present invention is described below. The magnetic recording device according to this embodiment comprises a servo surface on which the first position information is recorded, the first positioning signal being utilized as the control signal for positioning the data head at the destination data track. A data surface on which the data and the second position information is recorded is provided. A servo head is operatively disposed in cooperation with the servo surface. A data head is operatively disposed in cooperation with the data surface. A control circuit controls the positioning of the data head at the destination data track by the first and second position information, wherein the magnetic recording device itself records the format of the second position information.

Figure 33:
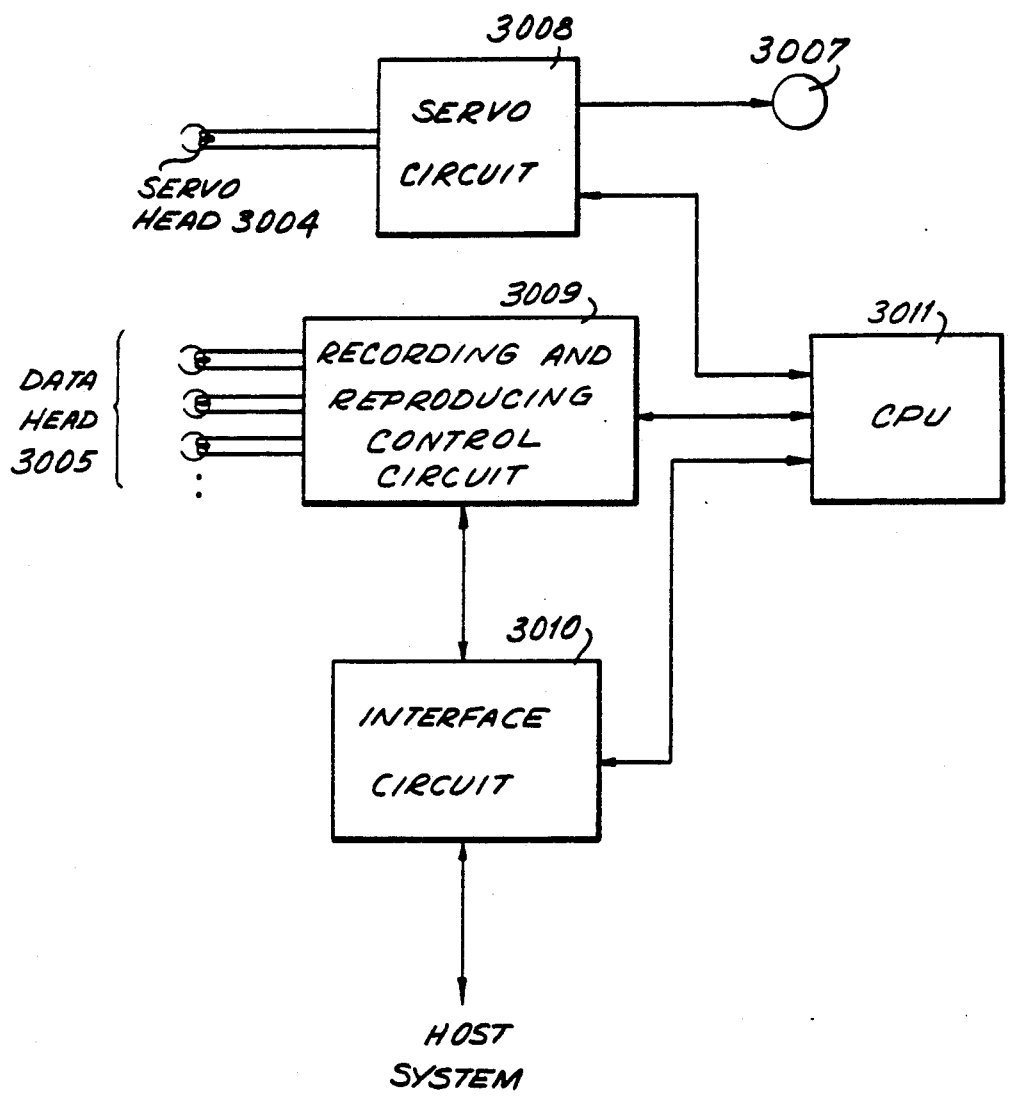
FIG. 33 is a circuit for controlling the data heads and servo head of the magnetic recording device according to the invention of FIG. 11.

FIG. 33 is a circuit diagram of this embodiment and can be applied to the mechanical embodiment of FIG. 11. The servo circuit 3008 is a circuit for controlling the voice coil motor 3007 so as to position the servo head 3004 at the destination servo track, based on the first positioning data read out from the servo head 3004, and is also used in the prior magnetic recording device. However, upon the receipt of the digital signal output from the CPU 3011, the servo circuit according to the present embodiment can offset the servo head from the destination servo track by the amount corresponding to this digital signal. Since the servo circuit already has a function for following the servo head at the destination position, the above function may be added by an adder comprising a DA convertor and an operation amplifier, offsetting the destination position. The recording and reproducing control circuit 3009 changes the output of the data head 3005 to digital data, transfers it to the interface circuit 3010, and transfers the output data from the host system received from the interface circuit 3010 to the data head. The recording and reproducing control circuit records the second position in data (described later) on the data surface and receives that data to detect the deflection between the data head and the data track.

Figure 34:
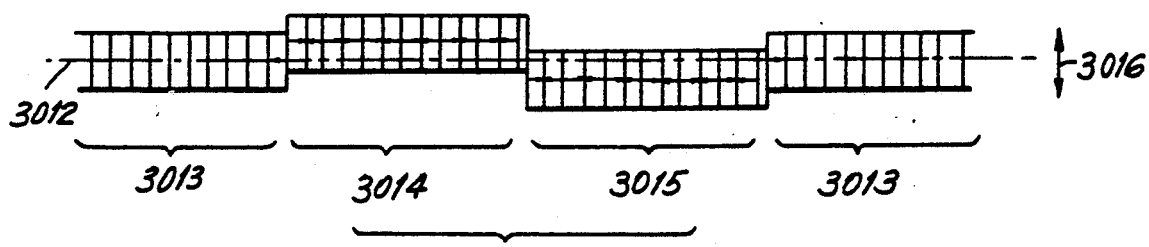
FIG. 34 is a magnetic pattern of the second positioning data constructed in accordance with, the invention.

The interface circuit 3010, besides transferring the data from or to the host system, controls the format. The formatting separates all of the data tracks by sector divisions and records identifying data including the data representative of the track numbers, the head number, the sector numbers and the like on the data track. The format is controlled by the format control circuit in the interface circuit under the control of the CPU 3011, upon the receipt of the format command from the host system. At the same time, in the magnetic recording device according to the present invention, the second positioning data as shown in FIG. 34 is recorded.

According to the magnetic recording device of the present embodiment, upon the receipt of the format command, prior to operating the format, the servo head is positioned at a position more outside by two tracks than the position of the servo track corresponding to the most outwardly positioned data track. Referring to FIG. 34, the one dotted line 3012 shows the locus of the center of the data head on the data surface. The region of the one dotted line 3012 is cleared for a width of 25 $\mu$m by a DC field. Then, the patterns 3013, 3014, and 3015 depicted in FIG. 34 are recorded in the form of magnetic flux reversals. The recording frequencies of the patterns 3013, 3014, and 3015 are uniform and are generated by dividing the output of the crystal oscillator in the magnetic recording device. At first, the data head is positioned on the one dotted line 3012 to record the pattern 3013. In the magnetic recording device according to the present embodiment, the width of the data head is 15$\mu$m and the width 3016 of the pattern is approximately 15$\mu$m. The pattern is recorded by offsetting the mechanical position of the data 3014 head towards the inner side of the disk by 5 $\mu$m utilizing the offset function in the above mentioned servo circuit 3008. In the same way, the pattern 3015 is recorded by offsetting the mechanical position of the data head toward the outer side of the disk by 5 $\mu$m. The recording operation is conducted for all of the data heads. The second positioning data of the present invention comprises a pair of patterns 3014 and 3015.

When the data is recorded and reproduced, the positioning of the data head is controlled based on the track on which the second positioning data is recorded. More particularly, if the data head is positioned at the track on which the second positioning data is recorded by the positioning data received from the servo surface, the center of the data may be displaced from the center line 3012 due to a change in the ambient temperature. At this time, the pulse amplitude of the pattern 3014 reproduced from the data head does not equal that of the pattern 3015. The displacement direction of the data head is detected according to which pattern has the greater pulse amplitude. The displacement amount is detected according to the ratio of the pulse amplitude. This detection is conducted by the peak hold circuit, convertor and the CPU as described above. In such a manner, the difference between the servo head and the data head is detected at this time. This difference for each data head is stored in the RAM and whenever each data head is accessed, the difference is compensated utilizing the offset function in the above mentioned servo circuit 3008. As a result, the data head can be positioned accurately on the data track by compensating this difference.

When the servo head is positioned at the servo track, the process of detecting and storing the distance the data head is away from the predetermined position is conducted after a proper time interval. In the present embodiment, immediately after starting the operation of the magnetic recording device, the process is conducted at intervals of five minutes and after two hours after starting the operation, the process is conducted at intervals of one hour. During the intervening period, the process may be conducted at intervals of 10 or 20 minutes. The predetermined position of the data head is displaced by changes in the ambient temperature. Therefore, the second positioning information in the RAM should be renewed at an interval corresponding to the change in temperature which may cause the problem.

When the servo head is positioned at the servo track, if the displacement amount is the same for all of the data tracks, only one track on which the second position information is recorded may be required on one data surface. If the displacement amount is not the same, it is necessary to provide further tracks on which the second position information is recorded. In the instant embodiment, it is necessary to provide one track on which the second position information is recorded per one data surface and it takes only two seconds to record the patterns of FIG. 34 on the five data surfaces one by one, therefore the time is much shorter, compared with the time for the format.

As mentioned, according to the present invention, the second position information is recorded after the assembly of the magnetic recording device to position the data head at the destination data track accurately. In this manner, the displacement amount which may be generated by displacement of the head during transmitting the device does not become a problem. Further, it is possible to lower the frequency in the compensation of the positioning mechanism and possible to improve the response speed of the magnetic recording device.

When the format is rewritten by the users, after using the magnetic recording device for a long time, the second position information also can be recorded, therefore the ordinary deflection which may be caused by the displacement of the mechanism over a long time can be cancelled at the same time.

Still another embodiment of the present invention is described below. The magnetic recording device of the present embodiment includes self-calibration mechanisms for detecting the regular external force pressed upon the head carriage and the value of the circuit offset and for compensating for such force. The device achieves excellent setting at the desired track after seeking such tracks, thereby making it possible to provide a magnetic disk device of a small size, a high capacity and a high speed.

Figure 40:
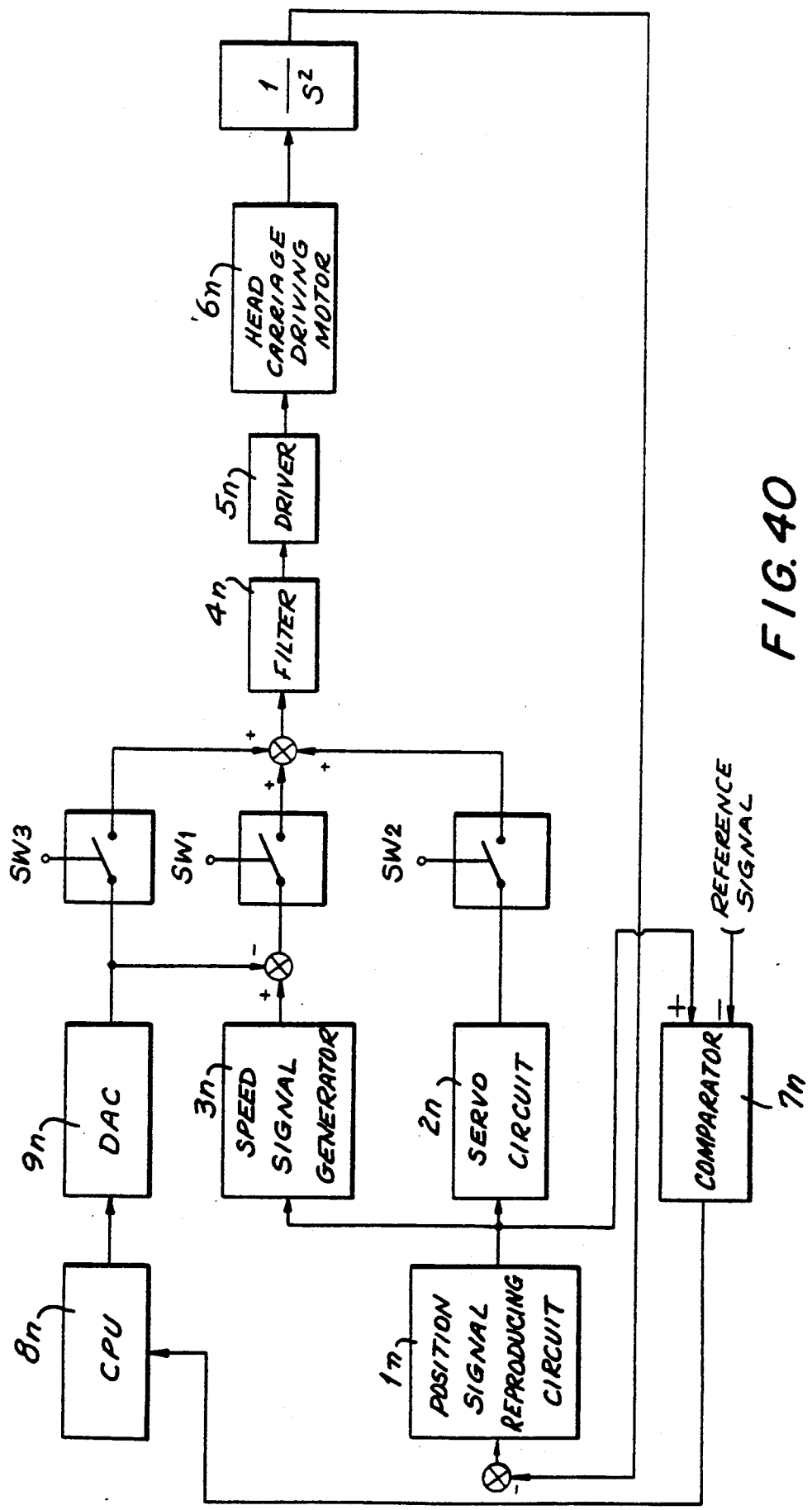
FIG. 40 is a block diagram of a calibrating circuit of the magnetic disk apparatus constructed in accordance with the invention.

FIG. 40 is a block diagram of the magnetic disk device according to this embodiment. At the time of moving the head to the desired track, the analog switch SW1 is ON and analog switch SW2 and analog switch SW3 are OFF. The speed signal is reproduced by the speed signal generator 3n, and further the reference speed signal is controlled by the CPU 8n and is output from the DAC (digital analog convertor) 9n. The difference in signal between the above two signals is input to a driver circuit 5n after passing the notch filter 4n and is converted into the force by a head carriage driving motor 6n to accomplish the seek operation and is changed to the position information signal after double integration of the force by double integrator 10n. The position information signal is reproduced by the position signal reproducing circuit and applied as a feed back loop.

At the time of controlling the position of the head on the destination track, switch SW1 is OFF and switches SW2 and SW3 are ON. The position signal reproduced from the position signal reproducing circuit 1n goes through a servo circuit 2n and is added to the compensation signal output by the DAC 9n. The compensation signal is obtained from CPU 8n and is generated based on the difference signal from comparator 7n, which compares the position signal with a reference signal to detect crossover. The output of the adder is filtered by notch filter 4n, is input to the driver circuit 5n, is converted to the force at the head carriage driving motor 6n, is converted to the position information signal by the double integrator 10n and is fed back to form the servo loop. The notch filter 4n is provided for controlling the vibration of the mechanical resonance point. A secondary LPF (low pass filter) may be utilized or the notch filter may be utilized in series in order to eliminate the mechanical resonance and any noise in a high region.

The compensation signal permits compensation of the regular external force supplied to the head carriage and compensation of the direct offset voltages of the position signal reproducing circuit 1n, the servo circuit 2n, the notch filter 4n (which may also include a secondary LPF or the like) and the driver circuit 5n. The value of the compensation signal, which is determined by the self-calibration means described below, is controlled and memorized by the CPU 8n, and is output through the DAC 9n. The servo circuit 2n comprises a differentiating circuit for reducing the effect of the regular external force, the circuit offset and so on by increasing the gain in the lower region and improving the stiffness. In this manner, a signal which is in proportion to the position signal and the sum of the output signals of a differentiating circuit and an integrating circuit are output from the servo circuit 2n.

Figure 41:
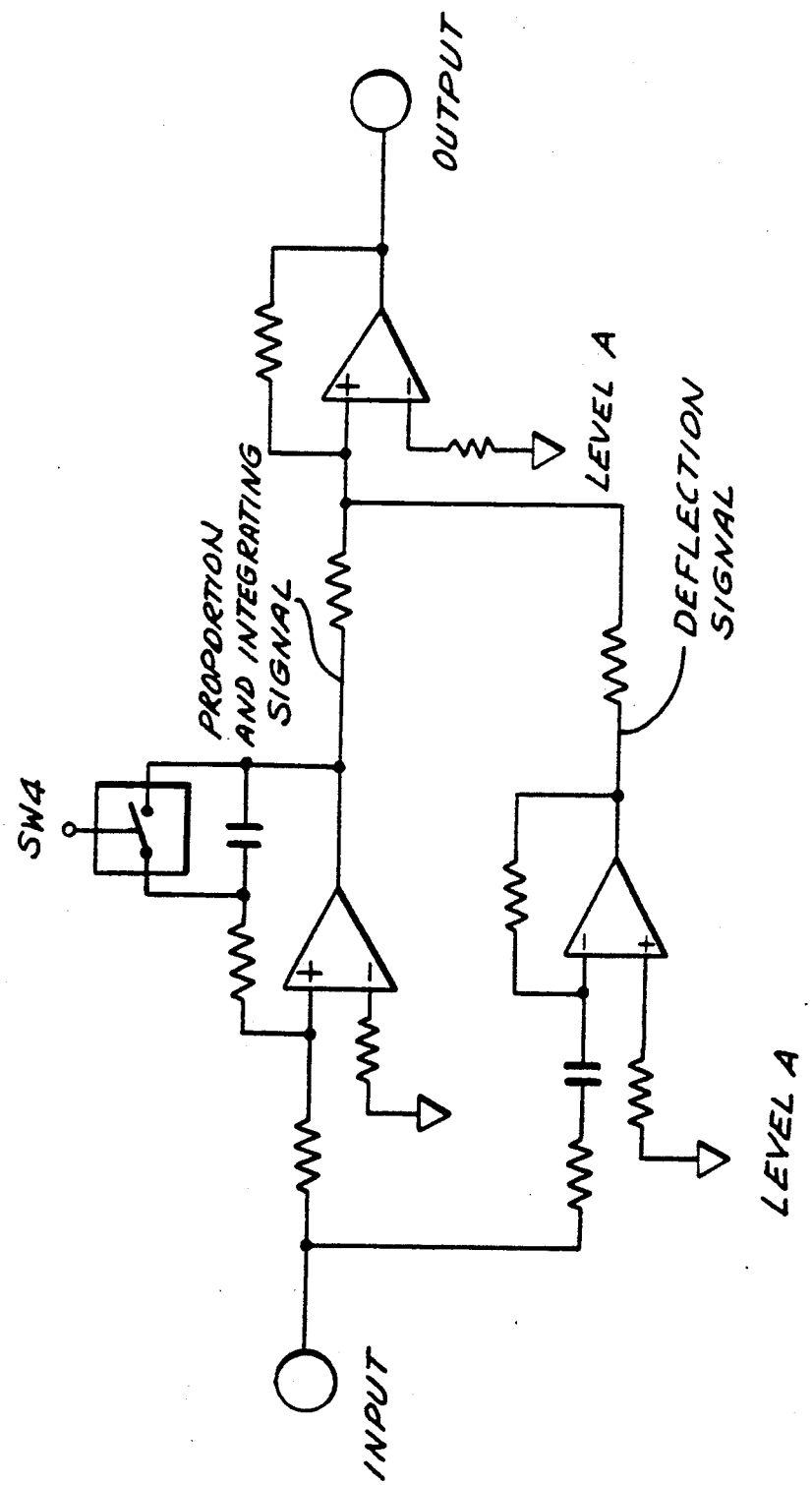
FIG. 41 is a circuit diagram of the servo circuit of the magnetic disk apparatus according to the present invention.

FIG. 41 shows the servo circuit 2n according to one embodiment of the present invention. Since two-phase position signals are utilized, the servo circuit 2n includes an analog multiplexer for switching the signal and an LPF for omitting the noise at the high region. They are omitted from the description because they are unnecessary for an understanding of the invention. Analog switch SW 4 is OFF at the time of controlling the position of the head, and is ON at the time of seeking or self-calibration. The reason that switch SW 4 is ON is to avoid the needless charge-up to the capacitor.

At the time of the self-calibration, switch SW1 is OFF and switches SW 2 and SW 3 are ON, in the same state as that for controlling the position. Further, switch SW 4 (FIG. 41) is ON. Therefore, the positioning of the head is completed by omitting the integrating circuit portion of servo circuit 2n. Specifically, the head is displaced from the center position of the destination track until generating the level signal for omitting the regular external force added to the head carriage and circuit offset. The circuit offset is the offset of the position signal reproducing circuit 1n, the servo circuit 2n, the notch filter 4n and the driver circuit 5n. One input of the comparator 7n, that is, the reference level, is determined at a level A indicative of the center level of the servo loop, i.e., at level A the input of the driver circuit 5n is zero and no force is added to the motor 6n. When the plus terminal of the operation amplifier is at this level (level A), the output of the comparator 7n is determined by the effect of the regular external force and the circuit offset. When the value of the compensation signal is changed in turn, the head is moved in response to the compensation signal. Therefore, when the value of the compensation signal is read out at the time of reversing the output of the comparator 7n (namely, at the time of going through the center position of the destination track of the head), the sum of the regular external force and the circuit offset can be calculated.

In general, since the track cross signal is required at the time of the seeking operation, the position signal and the level A are compared by the comparator 7n. As a result, it is unnecessary to add an additional comparator for the self-calibration operation and such a circuit element is not added.

When the head approaches the center position of the destination track with a changing value for the compensation signal, the mark of the changed value is determined by the mark of the output from the comparator 7n. Further, if the value of the last self-calibration is utilized as the initial value of the compensation signal and is changed as needed, it is possible to complete the self-calibration earlier and to reduce the moving amount of the head.

When the above self-calibration is conducted for several tracks and the value of the compensation signal is approached relative to the track by lines or like, the compensation signal according to the destination track can be obtained.

Figure 42:
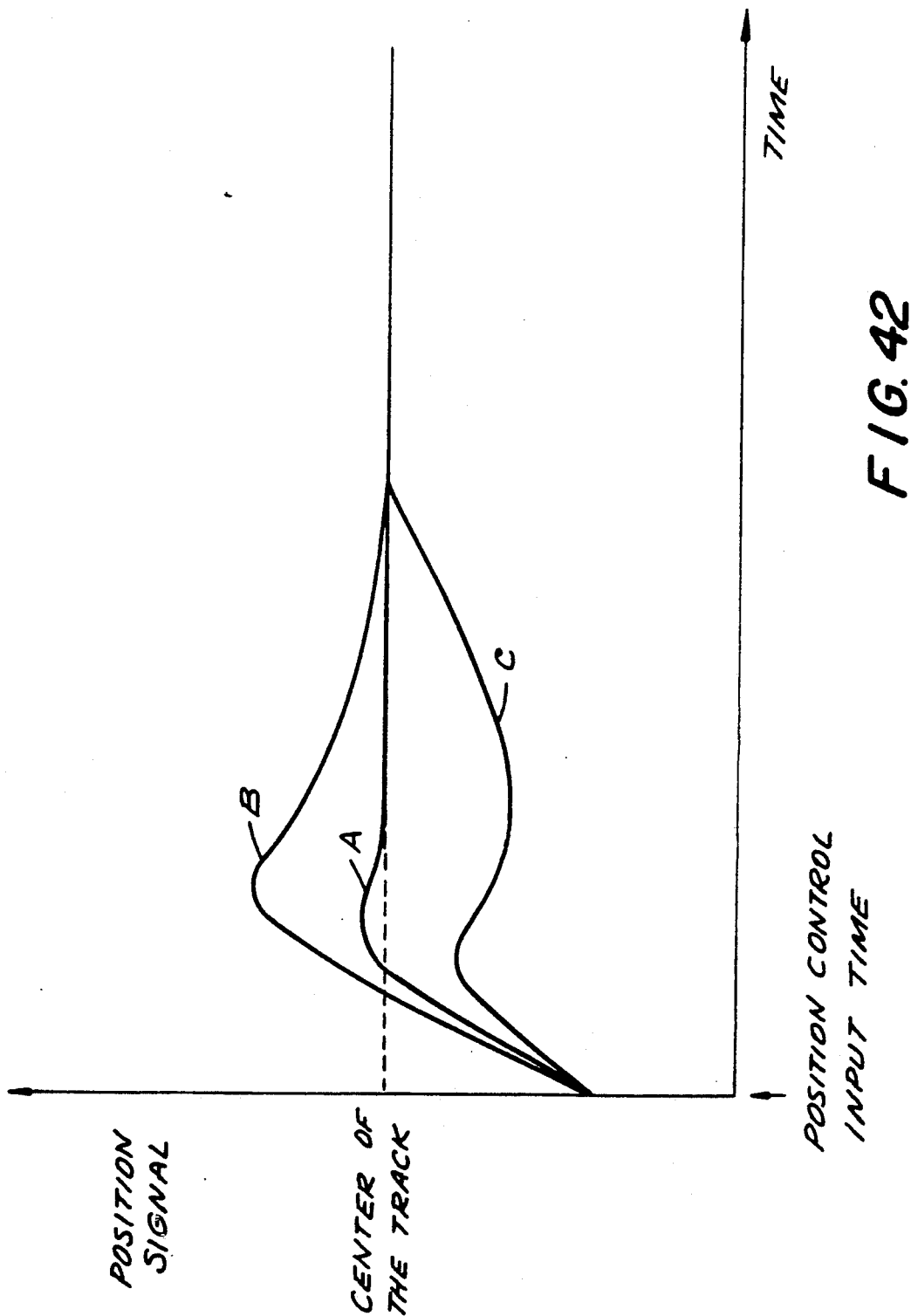
FIG. 42 graphically shows the settling of the head after seeking over time of an alternative embodiment of the magnetic disk apparatus according to the present invention.

FIG. 42 shows the waveforms of the settling of the head after seeking. Waveform A shows the case of compensating the regular external force and the circuit offset. Waveforms B and C show the cases where there is no compensation. Waveform B is the case of adding the external force to the seek direction. Waveform C is the case of adding the external force in the reverse of the seek direction.

In addition, in the construction of FIG. 40, an ADC (analog digital convertor) may be utilized in place of the comparator 7n.

It will thus be seen that the objects set forth above, among those made apparent from the preceding description are efficiently obtained and since certain changes may be made to the above construction without departing from the spirit and the scope of the invention, it is intended that all matter contained in the above description or shown in the accompanying drawings shall be interpreted as illustrative and not in a limiting sense.

It is also to be understood that the following claims are intended to cover all the generic and specific features of the invention herein described in all statements of the scope of the invention which, as a matter of language, might be said to fall therebetween.

What is claimed is:

1. A magnetic recording device for recording data on at least one and no more than four disks wherein each disk has an outer diameter no greater than 3.5 inches and an inner diameter no greater than 40 mm, the device comprising:
a base, a spindle supported on a portion of the base, at least one of the disks being mounted in a spaced relationship along the spindle from the other disks;

bearing means for rotatably supporting said spindle, said spindle having a bottom end and top end, the bearing means having a bearing located at the bottom end of said spindle and a second bearing located intermediate said bottom end and said top end;

a spindle motor comprising:

stator means mounted to extend circumferentially about the axis of the spindle for sequentially providing a magnetic field about the axis of the spindle; and rotor magnet means coupled to the spindle and mounted within the stator means for rotating the spindle in cooperation with the stator means when the stator means provides an magnetic field, whereby the disks mounted on the spindle are caused to rotate at a predetermined speed;

head means for recording and reproducing data on the disks;

head actuator means mounted on the base for moving the head means to a predetermined data track on said disks, said actuator means including arm means for supporting said head means at one end thereof and being pivotably mounted in a central region thereof;

a pivot shaft mounted on the base in a cantilevered manner for supporting the arm means at the central region thereof, and actuator motor means positioned radially relative to the disks for pivotably displacing said arm means to move said head means, said actuator motor means comprising actuator coil means on the arm means including an air coil mounted on the arm means on the opposed sides of the head relative to the pivot shaft and securing magnet means disposed in facing relationship with the actuator coil means so that said air core is disposed therebetween and being shaped so that the area of the securing magnet means in facing relationship with the air core coil is enlarged as the air core coil moves towards an edge of said securing magnet means; and a cover member for covering the disk and the actuator means, said cover member being supported on the base.

2. The magnetic recording device of claim 1, wherein said disks have an inner diameter of 40mm or less for coupling to said spindle.

3. The magnetic recording device of claim 2, wherein the magnetic recording device is a half height device.

4. The magnetic recording device of claim 1, wherein the rotor magnet means is magnetized divisionally in a plurality of poles, said stator means including a stator core having a plurality of slots on the inner side thereof and a stator coil wound around said stator core.

5. The magnetic recording device of claim 4, and including a rotor yoke coupled to the spindle and supporting the rotor magnet means in facing relation to the stator means, said rotor yoke including projecting wing means for dissipating heat developed therein.

6. The magnetic recording device of claim 4, and including an essentially annular circuit board means supported in facing relation to the stator means and carrying at least the leads for connection to the stator coil.

7. The magnetic recording device of claim 1, wherein said arm means extends substantially circumferentially relative to the disks.

8. The magnetic recording device of claim 7, wherein the axis of the actuator motor means is radially displaced from and extends in essentially the same direction as the axis of the spindle.

9. The magnetic recording device of claim 7, and including frame means for fixedly supporting the spindle motor stator means and the actuator motor means securing magnet means and for rotatably supporting the spindle and the pivotable support for the arm means, said frame means enclosing said magnetic recording device and including a removable cover portion to provide access to the interior thereof and a wall defined by a circuit board carrying circuit means for the magnetic recording device.

10. The magnetic recording device of claim 7, wherein the magnetic recording device is a half height device.

11. The magnetic recording device of claim 1, further including first positioning means for providing first position data for positioning the head means.

12. The magnetic recording device of claim 11, wherein at least one surface of the disks is a servo surface wherein first positioning data for positioning the head means is recorded, said head means including a servo head associated with said servo surface.

13. The magnetic recording device of claim 12, wherein at least one of the surfaces of the disks is a data surface, said head means including a data head associated with each data surface, at least one of the tracks on said data surface being adapted to record second positioning data for the associated data head.

14. The magnetic recording device of claim 13, wherein at least one of the tracks on said data surface is adapted to record second positioning data for the associated data head.

15. The magnetic recording device of claim 14, wherein said at least one track is a positioning track nd not a data track.

16. The magnetic recording device of claim 15, including said second positioning data on at least one positioning track of each data surface.

17. The magnetic recording device of claim 14, and including second positioning data on at least two positioning tracks on each data surface.

18. The magnetic recording device of claim 17, including control means coupled to said actuator means for controlling the positioning of the head means, said control means including memory means for storing second positioning signals derived from said second positioning data representative of the displacement of the associated data head from each of said at least two positioning tracks when the first positioning means is positioned at the corresponding track, said control means being adapted to determine the second positioning signal associated with each data track intermediate two adjacent positioning tracks substantially in proportion to the second positioning signals of the two adjacent positioning tracks and the distance of the destination data track from each of the two adjacent positioning tracks.

19. The magnetic recording device of claim 18, wherein said control means is adapted to receive first positioning information from the first positioning means and to position a data head to a destination data track in response to the first positioning information and the second positioning signal associated with the destination data track.

20. The magnetic recording device of claim 18, wherein said control means periodically updates the stored second positioning signals.

21. The magnetic recording device of claim 14, wherein said at least two positioning tracks bearing said second positioning data are at least the innermost and outermost of the tracks on each data surface.

22. The magnetic recording device of claim 13, including control means coupled to said actuator means for controlling the positioning of the head means, said control means including memory means for storing a second positioning signal derived from said second positioning data representative of the displacement of the associated data head from said positioning track when the first positioning means is positioned at the corresponding track.

23. The magnetic recording device of claim 22, wherein said control means is adapted to receive first positioning information from the first positioning means and to position a data head to a destination data track in response to the first positioning information and the stored second positioning signal associated with the destination data track.

24. The magnetic recording device of claim 23, wherein said control means is adapted to position each data head by superimposing the second positioning signal on the first positioning signal detected from the first positioning means.

25. The magnetic recording device of claim 24, wherein said control means includes adding means for superimposing the second positioning signal on the first positioning information.

26. The magnetic recording device of claim 24, wherein the control means does not detect the second positioning signal at a starting condition.

27. The magnetic recording device of claim 22, wherein said control means periodically updates the stored second positioning signals.

28. The magnetic recording device of claim 13, wherein said second positioning data is a burst-type magnetic flux reversal chain recorded in a plurality of portions around said positioning track on said data surface.

29. The magnetic recording device of claim 28, wherein said burst-type magnetic flux reversal chains comprise a first chain portion having a center line displaced on one side of the center line of said positioning track and a second chain portion having a center line dispersed on the opposed side of the center line of said positioning track, the displacement of the associated data head from the center line of said positioning track being represented by the difference in amplitude of the data detected from the two burst chains.

30. The magnetic recording device of claim 13, and including control means for positioning the head means in response to first and second positioning data.

31. The magnetic recording device of claim 30, wherein the control means is adapted to position each data head by superimposing second positioning information derived from the second positioning data on first positioning information from said first positioning data.

32. The magnetic recording device of claim 31, wherein said control means includes adding means for superimposing the second positioning information on the first positioning information.

33. The magnetic recording device of claim 32, wherein the control means is adapted to add the second positioning information gradually to the first positioning information prior to the settling of the first positioning means to the destination tracks.

34. The magnetic recording device of claim 1, wherein said head means includes one head associated with each surface of the disks to be read or written upon, aid actuator means moving the heads of said head means as a unit.

35. The magnetic recording device of claim 1, further comprising first positioning means for producing first positioning data for positioning the head means.

36. The magnetic recording device of claim 35, wherein at least one of the surfaces of the disks is a data surface, said head means including a data head associated with each data surface, said data surfacer being adapted to record positioning data for the associated data head.

37. The magnetic recording device of claim 36, and including second positioning data on at least two positioning tracks on each data surface.

38. The magnetic recording device of claim 37, wherein said at least two positioning tracks bearing said second positioning data are at least the innermost and outermost of the tracks on each data surface.

39. The magnetic recording device of claim 37, including control means coupled to said actuator means for controlling the positioning of the head means, said control means including memory means for storing second positioning signals derived from said second positioning data representative of the displacement of the associated data head from each of said at least two positioning tracks when the first positioning means is positioned at the corresponding track said control means being adapted to determine the second positioning signal associated with each data track intermediate two adjacent positioning tracks substantially in proportion to the second positioning signals of the two adjacent positioning tracks and the distance of the destination data track from each of the two adjacent positioning tracks.

40. The magnetic recording device of claim 39, wherein said control means is adapted to receive first positioning information from the first positioning means and to position a data head to a destination data track in response to the first positioning information and the second positioning signal associated with the destination data track.

41. The magnetic recording device of claim 39, wherein said control means periodically updates the stored second positioning signals.

42. The magnetic recording device of claim 36, including control means coupled to said actuator means for controlling the positioning of the head means, said control means including memory means for storing a second positioning signal derived from said second positioning data representative of the displacement of the associated data head from said positioning track when the servo head is positioned at the corresponding track on the servo surface.

43. The magnetic recording device of claim 42, wherein said control means is adapted to receive first positioning information from the first positioning means and to position a data head to a destination data track in response to the first positioning information and the stored second positioning signal associated with the destination data track.

44. The magnetic recording device of claim 43, wherein said control means is adapted to position each data head by superimposing the second positioning signal on the first positioning signal detected from the first positioning means.

45. The magnetic recording device of claim 44, wherein said control means includes adding means for superimposing the second positioning signal on the first positioning information.

46. The magnetic recording device of claim 44, wherein the control means does not detect the second positioning signal at a starting condition.

47. The magnetic recording device of claim 42, wherein said control means periodically updates the stored second positioning signals.

48. The magnetic recording device of claim 36, wherein said second positioning data is a burst-type magnetic flux reversal chain recorded in a plurality of portions around said positioning track on said data surface.

49. The magnetic recording device of claim 48, wherein said burst-type magnetic flux reversal chains comprise a first chain portion having a center line displaced on one side of the center line of said positioning track and a second chain portion having a center line displaced on the opposed side of the center line of said positioning track, the displacement of the associated data head from the center line of said positioning track being represented by the difference in amplitude of the data detected from the two burst chains.

50. The magnetic recording device of claim 36, including said second positioning data on at least one positioning track of each data surface.

51. The magnetic recording device of claim 36, and including control means for positioning the head means in response to first and second positioning data.

52. The magnetic recording device of claim 51, wherein the control means is adapted to position each data head by superimposing second positioning information derived from the second positioning data on first positioning information from said first positioning data.

53. The magnetic recording device of claim 52, wherein said control means includes adding means for superimposing the second positioning information on the first positioning information.

54. The magnetic recording device of claim 53, wherein the control means is adapted to add the second positioning information gradually to the first positioning information prior to the settling of the first positioning means to the destination tracks.

55. The magnetic recording device of claim 36, wherein at least one of the tracks on said data surface is adapted to record second positioning data for the associated data head.

56. The magnetic recording device of claim 55, wherein said at least one track is positioning track and not a data track.

57. The magnetic recording device of claim 35, wherein said first positioning means includes at least one surface of the disk being a servo surface, said first positioning data for positioning the head means being recorded thereon, and said head means including a servo head associated with said servo surface.

* * * * *